(12) United States Patent
Miyazawa et al.

(10) Patent No.: US 7,841,722 B2
(45) Date of Patent: Nov. 30, 2010

(54) PROJECTION SYSTEM, PROJECTOR, IMAGE PROCESSING PROGRAM AND RECORDING MEDIUM RECORDING IMAGE PROCESSING PROGRAM

(75) Inventors: Yasunaga Miyazawa, Okaya (JP); Mitsuhiro Inazumi, Shiojiri (JP); Toshiki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 967 days.

(21) Appl. No.: 11/672,399

(22) Filed: Feb. 7, 2007

(65) Prior Publication Data

US 2007/0195208 A1 Aug. 23, 2007

(30) Foreign Application Priority Data

Feb. 9, 2006 (JP) .............................. 2006-031987

(51) Int. Cl.
*G03B 21/14* (2006.01)
*H04N 7/00* (2006.01)
*G06K 9/40* (2006.01)
*G06K 9/03* (2006.01)

(52) U.S. Cl. ......................... 353/69; 348/466; 382/167; 382/274; 382/275; 382/309

(58) Field of Classification Search ................... 353/69; 348/746, 466; 382/167, 274, 275, 309
See application file for complete search history.

(56) References Cited

U.S. PATENT DOCUMENTS

2006/0013478 A1 * 1/2006 Ito et al. ..................... 382/167

FOREIGN PATENT DOCUMENTS

| JP | A 2004-069996 | 3/2004 |
| JP | A 2004-069997 | 3/2004 |
| JP | A 2004-086227 | 3/2004 |
| JP | A 2004-088194 | 3/2004 |

\* cited by examiner

*Primary Examiner*—Georgia Y Epps
*Assistant Examiner*—Magda Cruz
(74) *Attorney, Agent, or Firm*—Oliff & Berridge PLC

(57) ABSTRACT

A projection system includes an image processing apparatus, a projector having an optical modulation element and a projection optical apparatus, and a digital communication unit. The image processing apparatus performs a projector correction process to generate first correction processed image data and an original display correction process to generate a second correction processed image data and generates difference data for a difference between the first correction processed image data and the second correction processed image data, and transmits the difference data to the projector through the digital communication unit. The projector performs the projector correction process on the image data to generate the first correction processed image data and a correction process based on the difference data on the first correction processed image data to generate the second correction processed image data, and controls the optical modulation element based on the second correction processed image data.

20 Claims, 29 Drawing Sheets

PROJECTION SYSTEM, PROJECTOR, IMAGE PROCESSING PROGRAM AND RECORDING MEDIUM RECORDING IMAGE PROCESSING PROGRAM

BACKGROUND

1. Technical Field

The present invention relates to a projection system, a projector, an image processing program, and a recording medium recording image processing program.

2. Related Art

In the past, a configuration in which an image processing apparatus such as a personal computer and a projector are included and an image based on image data which is transmitted from the image processing apparatus is displayed by the projector is well known.

In this configuration, the projector receives the image data which is transmitted from the image processing apparatus. Thereafter, processes such as a resolution conversion, a trapezoid shape distortion correction, a correction process for color shading or brightness shading due to the characteristics of an optical system of the projector or a display device, and γ correction or a color conversion appropriate to the characteristics of the display device are performed on the image data by the projector. A configuration in which an image is displayed based on the image data on which the various processes have been performed is used.

However, since the above-described various processes such as color shading correction and γ correction are performed by the projector in this configuration, there is a problem in making the circuit of the projector complex, thereby increasing the production cost of the projector. In addition, in order to realize a high-quality image, the process in the circuit becomes complex, thereby further increasing the production cost and increasing the power consumption of the projector. In addition, since the processes for resolution conversion or the like are performed by the projector, the image quality becomes deteriorated.

Configurations to solve the above-mentioned problems are known (see JP-A-2004-69996, JP-A-2004-69997, JP-A-2004-86227, and JP-A-2004-88194).

According to the patent documents JP-A-2004-69996, JP-A-2004-69997, JP-A-2004-86227, and JP-A-2004-88194, processes such as a color shading correction and γ correction are performed on the image data by the image processing apparatus. Thereafter, the image data on which the various processes are performed is transmitted to the projector. The projector receives the image data on which the various processes have been performed from the image processing apparatus and displays the image based on the received image data, under the configurations.

However, in the above-described configurations disclosed in the patent documents JP-A-2004-69996, JP-A-2004-69997, JP-A-2004-86227, and JP-A-2004-88194, the image processing apparatus should transmit digital data of 10 bits or more for each of RGB (Red, Green, and Blue) signals for transmitting the above-described correction processed image data to the projector for being displayed, and accordingly, there is a possibility to lower the transmission speed of the image data, compared to a configuration in which image data on which any correction process has not been performed is transmitted.

SUMMARY

An advantage of some aspects of the invention is to provide a projection system, a projector, an image processing program, and a recording medium recording an image processing program which are capable of suppressing the decrease in the speed of data transmission and reception and displaying an image having excellent image quality.

According to an aspect of the invention, there is provided a projection system which includes an image processing apparatus for processing image data, an optical modulation element for modulating light beams irradiated from a light source device based on the image data to form an optical image, a projector having a projection optical apparatus for projecting the optical image on an enlarged scale to display an image, and a digital communication unit which connects the image processing apparatus and the projector for enabling the image processing apparatus and the projector to perform digital communication therebetween. The image processing apparatus includes a first processing apparatus correction unit that performs a projector correction process, which can be performed in the projector, on the image data to generate first correction processed image data, a second processing apparatus correction unit that performs an original display correction process for displaying an image desired to be displayed in the projector on the image data to generate a second correction processed image data, a difference data generation unit that generates difference data for a difference between the first correction processed image data and the second correction processed image data, and a difference data transmission unit that transmits the difference data to the projector through the digital communication unit. The projector includes a projector correction unit that performs the projector correction process on the image data to generate the first correction processed image data, a difference correction unit that acquires the difference data transmitted from the image processing apparatus and performs a correction process based on the difference data on the first correction processed image data to generate the second correction processed image data, and a display controller which controls the optical modulation element to display an image based on the second correction processed image data.

In the aspect of the invention, the image processing apparatus performs a projector correction process which can be performed on the projector on the image data to generate first correction processed image data. In addition, the image processing apparatus performs an original display correction process for displaying an image desired to be displayed in the projector to generate second correction processed image data. Here, an example of the projector correction process is a correction process for displaying an image adequately for a presentation. An example of the original display correction process is a correction process for displaying the image adequately for a movie or a sport, that is, a correction process more complicated than the projector correction process. The image processing apparatus calculates a difference between the first correction processed image data and the second correction processed image data, generates difference data for the difference, and transmits the difference data to the projector through a digital communication unit. Here, for example, the difference between the first correction processed image data and second correction processed image data is relatively small, when the image data is a 10-bit data, the difference data has the number of bits smaller than that of the image data, for example, 2-bit data.

In the aspect of the invention, the projector performs a projector correction process on the image data to generate a first correction processed image data. In addition, the projector acquires the difference data from the image processing apparatus and performs a correction process on the first correction processed image data based on the difference data to generate a second correction processed image data. In addition, the projector controls an optical modulation element to display an image based on the second correction processed image data.

Accordingly, the projector acquires the difference data having the number of bits smaller than that of the second correction processed image data, and only performs the correction process based on the difference data to be able to display an originally desired image based on the second correction processed image data. Thus, it becomes possible to display an image originally desired to be displayed without receiving the second correction processed image data from the image processing apparatus. As a result, it becomes possible to display an excellent image while the decrease in the data transmission and receiving speed is suppressed.

In this case, the projection system may further comprise an image data transmission unit that connects the image processing apparatus and the projector for enabling the image processing apparatus and the projector to transmit and receive the image data therebetween in addition to the digital communication unit. The image processing apparatus may further include a processing apparatus image data storage unit that stores the image data, an image data acquisition unit that acquires the image data stored in the processing apparatus image data storage unit, and an image data transmission unit that transmits the image data to the projector. The first processing apparatus correction unit and the second processing apparatus correction unit may acquire the image data from the processing apparatus image data storage unit, and the projector correction unit may acquire the image data transmitted from the image processing apparatus.

In the case, the image processing apparatus transmits image data stored in the processing apparatus image data storage unit to the projector through an image data transmission unit. In addition, the image processing apparatus acquires image data from the processing apparatus image data storage unit and generates a first correction processed image data and a second correction processed image data. In addition, the projector acquires image data transmitted from the image processing apparatus and generates a first correction processed image data.

Accordingly, the configuration of the projection system can be simplified without arranging a configuration only for outputting the image data to the image processing apparatus or the projector.

In this case, the projection system may further comprise an image reproduction apparatus that reproduces the image data, a first image data transmission unit that connects the image reproduction apparatus and the image processing apparatus for enabling the image reproduction apparatus and the image processing apparatus to transmit and receive the image data therebetween and a second image data transmission unit that connects the image reproduction apparatus and the projector for enabling the image reproduction apparatus and the projector to transmit and receive the image data therebetween. The image reproduction apparatus may transmit the image data to the image processing apparatus and the projector through the first image data transmission unit and the second image data transmission unit. The first processing apparatus correction unit, the second processing apparatus correction unit, and the projector correction unit may acquire the image data transmitted from the image reproduction apparatus.

In the case, in the projection system, an image reproduction apparatus which reproduces and transmits image data is provided. In addition, the image processing apparatus and the projector acquire the image data transmitted from the image reproduction apparatus and generates first correction processed image data and second correction processed image data.

Accordingly, the projection system can display an excellent image based on the image data which can be reproduced by the image reproduction apparatus while the decrease in the speed of the data transmission and receiving is suppressed. In addition, since it is not necessary to output the image data from the image processing apparatus, the processing load of the image processing apparatus can be reduced.

In this case, the projection system may further comprise an image reproduction apparatus that reproduces the image data, a first image data transmission unit that connects the image reproduction apparatus and the projector for enabling the image reproduction apparatus and the projector to transmit and receive the image data therebetween, and a second image data transmission unit that connects the image reproduction apparatus and the projector for enabling the image reproduction apparatus and the projector to transmit and receive the image data therebetween. The projector correction process may include a plurality of correction processes, and the image reproduction apparatus may transmit the image data to the projector through the first image data transmission unit. The projector may further include a partial correction processed image data generation unit that acquires the image data transmitted from the image reproduction apparatus, performs a plurality of correction processes included in the projector correction process except for at least one correction process to generate partial correction processed image data, and a partial correction processed image data transmission unit that transmits the partial correction processed image data to the image processing apparatus through the second image data transmission unit. The first processing apparatus correction unit may acquire the partial correction processed image data transmitted from the projector and perform an undone correction process among the plurality of correction processes included in the projector correction process on the partial correction processed image data to generate the first correction processed image data, and the second processing apparatus correction unit may acquire the partial correction processed image data transmitted from the projector and perform the original display correction process on the partial correction processed image data to generate the second correction processed image data.

In the case, the projector performs a plurality of correction processes included in the projector correction process except for at least one correction process on the image data acquired from the image reproduction apparatus to generate partial correction processed image data. In addition, the projector transmits the partial correction processed image data to the image processing apparatus through a second image data transmission unit. In addition, the image processing apparatus performs an undone correction process among the plurality of correction processes included in the projector correction process on the partial correction processed image data to generate the first correction processed image data. In addition, the image processing apparatus performs the original display correction process on the partial correction processed image data to generate the second correction processed image data.

Accordingly, when the image processing apparatus generates first correction processed image data, it is not necessary to perform the already-performed correction processes on the partial correction processed image data. As a result, the processing load of the image processing apparatus can be reduced.

In this case, in the projection system, the digital communication unit may be capable of performing two-way communication, and the projector may further include a projector correction data storage unit that stores projector correction data for the projector correction process, a projector correction data acquisition unit that acquires the projector correction data from the projector correction data storage unit, and a projector correction data transmission unit that transmits the projector correction data to the image processing apparatus through the digital communication unit. The first processing apparatus correction unit may acquire the projector correction data transmitted from the projector and performs the projector correction process based on the projector correction data, and the projector correction unit may perform the projector correction process based on the projector correction data which is stored in the projector correction data storage unit.

In the case, the projector acquires the projector correction data from the projector correction data storage unit and transmits the projector correction data to the image processing apparatus through the digital communication unit. In addition, the image processing apparatus performs the projector correction process based on the projector correction data acquired from the projector.

Accordingly, the image processing apparatus can appropriately generate difference data corresponding to the performance of the projector which is connected to the image processing apparatus through the digital communication unit. In addition, since the digital communication unit which is used for the transmission of the difference data is also used for the transmission and receiving of the projector correction data, the difference data can be generated appropriately without causing complication of the configuration of the projection system.

In this case, in the projection system, the original display correction process may include a plurality of correction processes, and the image processing apparatus may further include a processing apparatus correction data storage unit that stores the original display correction data for the original display correction process, a partial correction data generation unit that generates a partial correction data for the plurality of correction processes included in the original display correction process except for at least one correction process, and a partial correction data transmission unit that transmits the partial correction data to the projector through the digital communication unit. The projector may further include a projector correction data storage unit that stores projector correction data for the projector correction process, a partial correction data storage processor that acquires the partial correction data transmitted from the image processing apparatus and stores the acquired data in the projector correction data storage unit. The first processing apparatus correction unit may perform the projector correction process and the correction process based on the partial correction data on the image data to generate the first correction processed image data, and the projector correction unit may perform the projector correction process based on the projector correction data which is stored in the projector correction data storage unit and the correction process based on the partial correction data to generate the first correction processed image data.

In the case, the image processing apparatus transmits the partial correction data based on the original display correction data which is stored in the processing apparatus correction data storage unit for the plurality of correction processes included in the original display correction process except for at least one correction process to the projector through the digital communication unit. In addition, the image processing apparatus performs the projector correction process and the correction process based on the partial correction data on the image data to generate the first correction processed image data. In addition, the projector acquires the partial correction data transmitted from the image processing apparatus and stores the acquired data in the projector correction data storage unit in which projector correction data is stored. In addition, the projector performs the projector correction process based on the projector correction data and the correction process based on the partial correction data on the image data to generate the first correction processed image data.

Accordingly, the image processing apparatus can calculate a difference between the first correction processed image data on which a partial correction process of the original display correction process has been performed and the second correction processed image data on which all the correction processes of the original display correction process has been performed, it becomes possible to decrease the difference compared to a configuration that a difference from a first correction processed image data on which any original display correction process has not been performed is calculated. Accordingly, the number of bits of the difference data can be decreased to be able to further suppress the decrease in the speed of data transmission and receiving.

In this case, in the projection system, the original display correction process may include at least one among a color conversion process, a γ correction process, and a black and white enhancement process.

In the case, the original display correction process includes at least one among a color conversion process, a 7 correction process, and a black and white enhancement process.

Accordingly, the projector can display an image of which color has been corrected into a color desired to be displayed.

In this case, in the projection system, the original display correction process may include a process or correcting the deterioration of an image due to the characteristics of the optical modulation element.

In the case, a process for correcting the deterioration of an image due to the characteristics of the optical modulation element of the projector is included in the original display correction process. Examples of the deterioration of an image due to the characteristics of the optical modulation element are a color shading and a brightness shading.

Accordingly, the projector can display an image of which deterioration due to the characteristics of the optical modulation element has been corrected for displaying an image originally desired to be displayed. In addition, since the image processing apparatus performs a correction process in units of images which cause a heavy processing load, an image desired to be displayed can be displayed while the load of the projector for processing is suppressed.

In this case, in the projection system, the image processing apparatus may further include a light intensity data generation unit that sets the intensity of light incident on the optical modulation element for properly displaying an image based on the image data and generates light intensity data for the set light intensity, and a light intensity transmission unit that transmits the light intensity data to the projector through the digital communication unit. In addition, the projector may further include a light intensity controller that acquires the light intensity data transmitted from the image processing apparatus and controls the intensity of the light incident on the optical modulation element based on the light intensity data.

In the case, the image processing apparatus sets the intensity of light incident on the optical modulation element for properly displaying an image based on the image data and transmits light intensity data for the set light intensity to the projector through the digital communication unit. In addition, the projector controls the intensity of the light incident on the optical modulation element based on the light intensity data transmitted from the image processing apparatus.

Accordingly, the projector can display a dark image with enhancing its resolution by adjusting the light intensity. In addition, by lowering the light intensity, a dark part can be displayed without any floatation. As a result, the projector can display an image having more excellent quality.

In this case, in the projection system, the light source device may include a plurality of predetermined color light source units which irradiate different predetermined colors of light, and the light intensity controller may perform a process of independently controlling the light intensity irradiated from each of the predetermined color light source units by controlling the intensity of light incident on the optical modulation element.

In the case, a plurality of predetermined color light source units which irradiate different predetermined colors of light are included in the light source device. In addition, the light intensity controller performs a process of independently controlling the light intensity irradiated from each of the predetermined color light source units.

Accordingly, the projector can adjust the color delicately and display an excellent image.

In this case, the light source device of the projection system may include a red light source unit, a green light source unit, and a blue light source unit as the predetermined color light source units.

In the case, the light source device of the projection system includes a red light source unit, a green light source unit, and a blue light source unit as the predetermined color light source units.

Accordingly, the color can be easily controlled only by controlling the irradiated light of three primary colors.

According to an aspect of the invention, there is provided a projector which includes an optical modulation element for modulating light beams irradiated from a light source device to form an optical image, a projection optical device for displaying an image by projecting the optical image on an enlarged scale, a projector correction unit that is connected through a digital communication unit to an image processing apparatus for processing the image data and generates a first correction processed image data by performing a projector correction process which can be applied to the image data, a difference correction unit that acquires difference data for a difference between a second correction processed image data generated by performing an original display correction process on the image data for displaying an image originally desired to be displayed and the first correction processed image data from the image processing apparatus through the digital communication unit and generates the second correction processed image data by performing a correction process based on the difference data on the first correction processed image data, and a display controller that controls the optical modulation element to display an image based on the second correction processed image data.

In this case, the projector may further comprise a partial correction processed image data generation unit that is connected to the image processing apparatus through the image data transmission unit for transmitting and receiving the image data, includes a plurality of the projector correction processes, and performs the plurality of correction processes included in the projector correction process except for at least one correction process to generate a partial correction processed image data, a partial correction processed image data transmission unit that transmits the partial correction processed image data to the image processing apparatus through the image data transmission unit. In addition, the difference correction unit may acquire the difference data for a difference between the first correction processed image data which is generated by performing the undone correction process among the plurality of correction processes included in the projector correction process on the partial correction processed image data and the second correction processed image data which is generated by performing the original display correction process on the partial correction processed image data.

In this case, the original display correction process may include a plurality of correction processes. In addition, the projector may further comprise a projector correction data storage unit that stores the projector correction data for the projector correction process, and a partial correction data storage unit that acquires partial correction data for the plurality of correction processes included in the original display correction process except for at least one correction process from the image processing apparatus through the digital communication unit and stores the partial correction data in the projector correction data storage unit. In addition, the projector correction unit may perform the projector correction process cased on the projector correction data which is stored in the projector correction data storage unit on the image data and the correction process based on the partial correction data to generate the first correction processed image data.

In this case, the project or may further comprise a light intensity controller that acquires the light intensity data of the light incident on the optical modulation element for properly displaying an image based on the image data from the image processing apparatus through the digital communication unit and controls the intensity of the light incident on the optical modulation element based on the light intensity data.

In this case, the light source device may include a plurality of predetermined color light source units which irradiate different predetermined colors of light, and the light intensity controller may perform a process of independently controlling the light intensity irradiated from each of the predetermined color light source units by controlling the intensity of light incident on the optical modulation element.

In the case, the light source device may include a red light source unit, a green light source unit, and a blue light source unit as the predetermined color light source units.

The above-described projector can be appropriately used for the above-described projection system.

According to an aspect of the invention, there is provided an image processing program, which is executed in an image processing apparatus connected to a projector through a digital communication unit, the image processing program allowing the image processing apparatus to execute the steps of performing a projector correction process which can be performed in the projector on the image data using the image processing apparatus to generate a first correction processed image data, performing an original display correction process on the image data for displaying an image originally desired to be displayed in the projector to generate a second correction processed image data, generating difference data for a difference between the first correction processed image data and the second correction processed image data, and transmitting the difference data to the projector through the digital communication unit.

According to an aspect of the invention, there is provided a computer readable recording medium storing the above-described image processing program.

Since the above-described image display program and the recording medium are used for performing the above-described process in the projection system, advantage the same as the advantage of the projection system can be acquired.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the present invention will be described with reference to the accompanying drawings.

Configuration of Projection System

Figure 1:
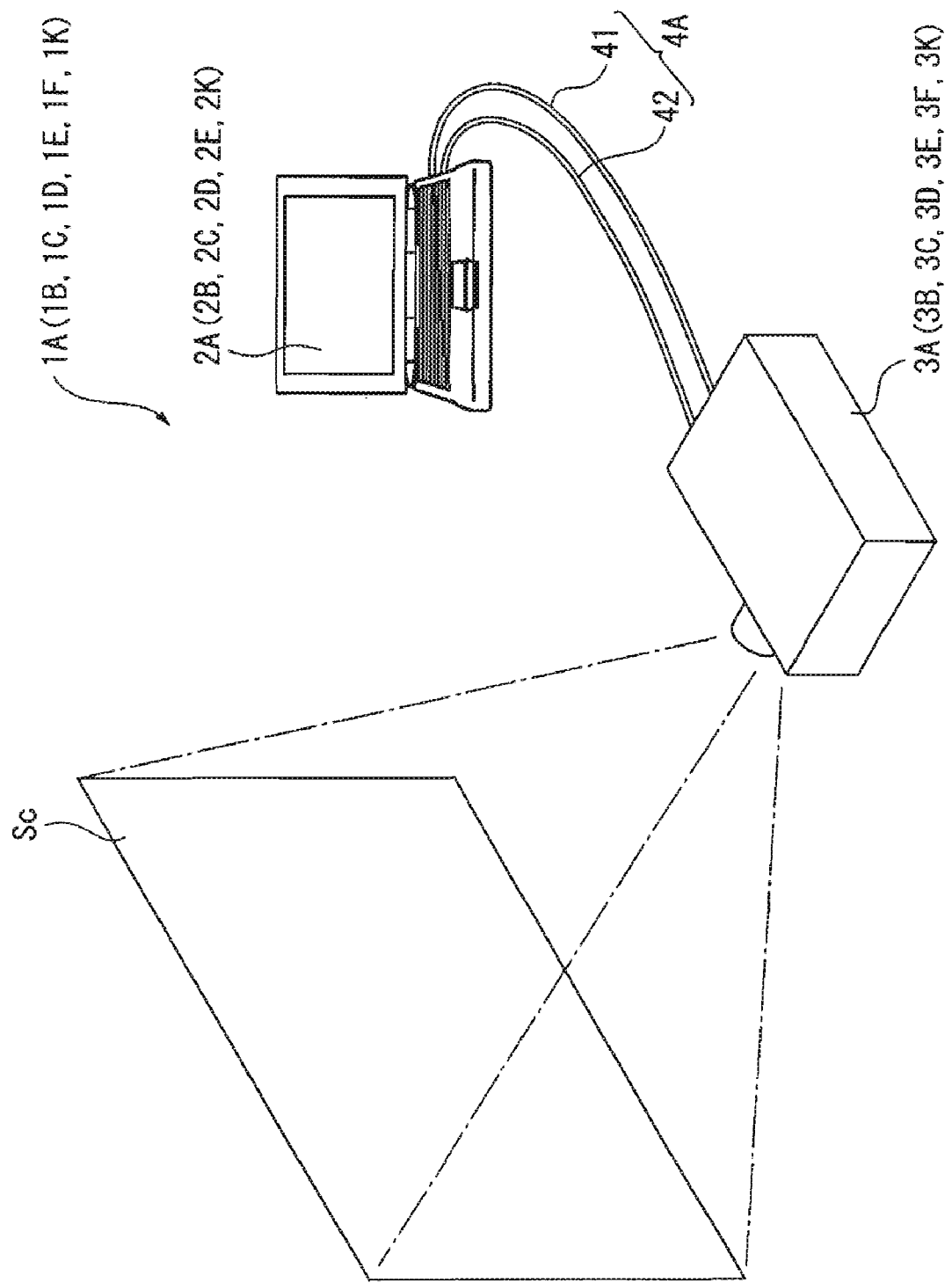
FIG. 1 is a diagram showing the appearance of a projection system according to first to sixth and ninth embodiments of the invention.

FIG. 1 is a diagram showing the appearance of a projection system 1A according to a first embodiment of the invention. The projection system 1A performs a predetermined correction process on image data and displays an image based on the corrected image data. The projection system 1A includes a PC (image processing apparatus) 2A, a projector 3A, and a data transmission unit 4A.

Hereinafter, image correction process which can be performed in the projector 3A is referred to as a common correction process, and correction process which is of higher-order correction than the common correction process and cannot be performed in the projector 3A at a high speed is referred to as a high-quality correction process. Here, an example of the common correction process is a correction method using linear interpolation which is relatively simple. An example of the high-quality correction process is a correction method using Lagrange interpolation, Newton interpolation, or Spline interpolation which is more complicated than the correction method using the linear interpolation.

In addition, a resolution conversion process, a shape conversion process, a sharpness enhancement process, and a noise removal process are collectively referred to as an image-quality conversion process. In addition, a color conversion process, a γ correction process, a VT-γ correction process, and a black and white enhancement process are collectively referred to as a color correction process. In addition, a color shading correction process which corrects color shading formed due to characteristics of the image projector 33A to be described later of the projector 3A under the Influence of other pixels, a ghost correction process, a crosstalk correction process are collectively referred to as a shading correction process.

Configuration of Data Transmission Unit

The data transmission unit 4A connects the PC 2A and the projector 3A to enable the PC 2A and the projector 3A to send and receive various data. The data transmission unit 4A may include both of an image data cable 41 (image data transmission unit) and a correction data cable 42 (digital communication unit) or the image data cable 41 only.

The image data cable 41 is a D-Sub cable which connects the PC 2A and the projector 3A to enable the PC 2A and the projector 3A to send and receive analog image data. Alternatively, a DVI (Digital Visual Interface) cable, a LAN (Local Area Network) cable, a USB (Universal Serial Bus) cable, or the like may be used as the image data cable 41.

The correction data cable 42 is a USB cable which connects the PC 2A and the projector 3A to enable the PC 2A and the projector 3A to send and receive digital first difference data having a data amount smaller than the image data and an output parameter to be described later. The correction data cable 42 includes cable connectors (not shown) which can be attachable/detachable to/from the PC 2A and the projector 3A, respectively. Alternatively, as the correction data cable 42, a serial bus cable capable of sending and receiving digital data may be used.

Configuration of PC

Figure 2:
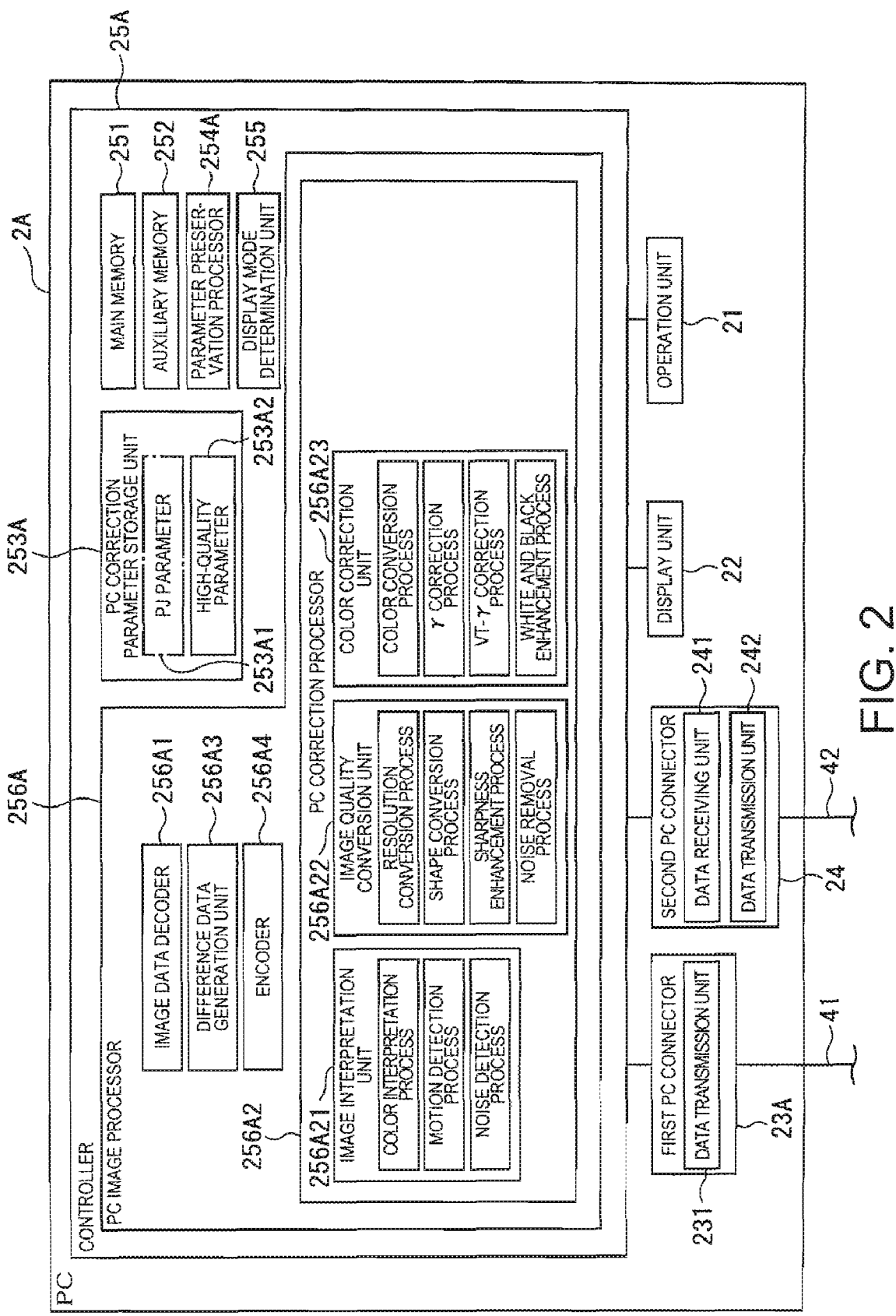
FIG. 2 is a schematic block diagram showing a configuration of the PC according to the first embodiment.

FIG. 2 is a schematic block diagram showing a configuration of the PC 2A.

The PC 2A includes a storage space in which various parameters used in a common correction process and a high-quality correction process can be stored and a function of processing the high-quality correction process at a high speed. The PC 2A calculates a difference between image data on which the common correction process is performed and image data on which the high-quality correction process is performed. The PC 2A transmits first difference data representing the difference together with image data on which the common and high-quality correction processes are not performed to the projector 3A. The PC 2A includes an operation unit 21, a display unit 22, a first PC connector 23A, a second PC connector 24, and a controller 25A.

The operation unit 21, for example, includes various operation buttons which can be operated by a keyboard, a mouse, and the like for input. According to an input operation performed by a user for the operation unit 21, the operation unit 21 appropriately transmits a predetermined operation signal to the controller 25A.

The display unit 22 is controlled by the controller 25A and displays predetermined information.

The image data cable 41 is connected to the first PC connector 23A. The first PC connector 23A transmits image data from the controller 25A through the image data cable 41 to the projector 3A using a data transmission unit 231 (image data transmission unit) which is connected to the controller 25A.

A cable connector of the correction data cable 42 is connected to the second PC connector 24 attachably and detachably. The second PC connector 24 receives an output parameter to be described later from the projector 3A through the correction data cable 42 using a data receiving unit 241 which is connected to the controller 25A and outputs the output parameters to the controller 25A. In addition, the second PC connector 24 transmits the first difference data from the controller 25A to the projector 3A through the correction data cable 42 using the data transmission unit 242 (difference data transmission unit) which is connected to the controller 25A.

The controller 25A executes a predetermined program according to input of an operation signal from the operation unit 21 to control the overall PC 2. The controller 25A includes a main memory 251, an auxiliary memory 252 (processing apparatus image data storage unit), a PC correction parameter storage unit 253A, a parameter preservation processing unit 254A, a display mode determination unit 255, and a PC image processor 256A which are connected with one another through a bus (not shown) to be able to transmit various data.

The main memory 251 stores data to be processed in the PC image processor 256A or the like. Various media for image sources can be used as the auxiliary memory 252, and an example of the auxiliary memory 252 is a DVD (Digital Versatile Disc) which stores images and voice as digital data.

The PC correction parameter storage unit 253A stores PJ parameter 253A1 and a high-quality parameter 253A2 for the correction of image data.

The PJ parameter 253A1 is appropriately stored in the PC correction parameter storage unit 253A by the parameter preservation processing unit 254A. The PJ parameter 253A1 is used when a common correction process is performed in the PC image processor 256A. In the PJ parameter 253A1, a parameter for processes performed in one mode, for example, in a mode which is used for presentation (hereinafter referred to as a presentation mode), parameters for a resolution conversion process, a form conversion process, and a color correction process are recorded.

The high-quality parameter 253A2 is used when a high-quality correction process like a correction process for displaying an image having a quality higher than an image on which a common correction process is performed in the PC image processor 256A. In the high-quality parameter 253A2, parameters for processes performed. In a plurality of modes, for example, parameters for an image quality conversion process and a color correction process which are performed in a movie mode, a sports mode, and the like are stored. Alternatively, the high-quality parameter 253A2 may have a configuration in which parameters for one mode may be recorded.

When the parameter preservation processing unit 254A recognizes that the PC 2A is connected to the projector 3A through the correction data cable 42 and the PJ parameter 253A1 is not stored in the PC correction parameter storage unit 253A, the parameter preservation processing unit 254A transmits a parameter request signal requesting for the transmission of the output parameters to the projector 3A through the correction data cable 4. Then, the parameter preservation processing unit 254A acquires the output parameters from the projector 3A and stores the output parameter in the PC correction parameter storage unit 253A as the PJ parameter 253A1.

When the display mode determination unit 255 recognizes that the PC 2A is connected to the projector 3A through the correction data cable 42, and that the PJ parameter 253A1 is stored in the PC correction parameter storage unit 253A, the display mode determination unit 255 determines that a process (high-quality display process) of displaying a high-quality image which has been corrected in the PC image processor 256A on the projector 3A is to be performed. To the contrary, when the display mode determination unit 255 recognizes that the PC 2A is not connected to the projector 3A through the correction data cable 42, or that the PJ parameter 253A1 is not stored, the display mode determination unit 255 determines that a process (common display process) of displaying an common image which has not been corrected in the PC image processor 256A on the projector 3A is to be performed.

The PC image processor 256A, for example, includes a GPU (graphics Processor Unit) and performs an image correction process described above. The PC Image processor 256A includes an image data decoder 256A1 (image data acquisition unit), a PC correction processor 256A2 (first and second processing apparatus correction unit), a difference data generation unit 256A3, and an encoder 256A4.

The image data decoder 256A1 decodes image data for each frame by performing decompressing an image source from the auxiliary memory 252 according to the recording mode. When it is determined that the high-quality display process is to be performed by the display mode determination unit 255, the image data decoder 256A1 outputs the image data to the PC correction processor 256A2 and transmits the image data to the projector 3A through the image data cable 41. On the other hand, when it is determined that the common display process is to be performed, the image data decoder 256A1 transmits the image data only to the projector 3A without outputting the image data to the PC correction processor 256A2. Here, the image data decoded by the Image data decoder 256A1 has a configuration in which a color tone for each pixel can be represented in 256 greyscales based on eight bit data. Alternatively, the image data may be configured to include the number of bits greater or smaller than eight bits.

The PC correction processor 256A2 performs the high-quality correction process on the image data which has been decoded by the image data decoder 256A1 based on the high-quality parameter 253A2 to generate high-quality correction image intermediate data (second corrected image data). The PC correction processor 256A2 performs a common correction process on image data based on the PJ parameter 253A1 to generate common correction image intermediate data (first corrected image data). The PC correction processor 256A2 includes an image interpretation unit 256A21, an image quality converter 256A22, and a color correction section 256A23.

The image interpretation unit 256A21 acquires the image data from the image data decoder 256A1 and performs an image analysis process such as a color analysis process, a motion detection process, and a noise detection process. In addition, the image interpretation unit 256A21 outputs various data which can be used for the image quality conversion process to the image quality converter 256A22 as image quality conversion data. In addition, the image interpretation unit 256A21 outputs various data which can be used for the color correction process to the color correction section 256A23 as color correction data.

When the image quality converter 256A22 acquires the image data from the image data decoder 256A1, the image quality converter 256A22 reads from the high-quality parameter 253A2 a parameter for the image quality conversion process, for example, which is performed in a mode (hereinafter, referred to as a user selection mode) selected by a user. Then, the image quality converter 256A22 performs the high-quality correction process based on this parameter and the image quality conversion data from the image interpretation unit 256A21 (hereinafter, referred to as a high-quality image quality conversion process) on the image data and outputs the corrected image data to the color correction section 256A23. In addition, the image quality converter 256A22 reads a parameter for a resolution conversion process and a shape conversion process performed in the presentation mode from the PJ parameter 253A1. Then, the image quality converter 256A22 performs a common correction process based on the parameter (hereinafter, referred to as a common image quality conversion process) on the image data and outputs the image data to the color correction unit 256A23. Here, the image data which has been processed by the image quality converter 256A22 is data of eight bits which is the same as the acquired data from the image data decoder 256A1.

When the color correction section 256A23 acquires the image data which has been performed with the high-quality image quality conversion process from the image quality converter 2156A22, the color correction section 256A23 reads a parameter for the color correction process of the user selection mode from the high-quality parameter 253A2. Then, the color correction section 256A23 performs the high-quality correction process based on this parameter and the color correction data from the image interpretation unit 256A21 (hereinafter, referred to as a high-quality color correction process) on the image data and preserves as the high-quality intermediate data, for example, in the main memory 251. In addition, when the color correction section 256A23 acquires the image data on which a common image quality conversion process has been performed from the image quality converter 256A22, the color correction section 256A23 reads a parameter for the color correction process of the presentation mode from the PJ parameter 253A1. Then, the color correction section 256A23 performs the common correction process (hereinafter, referred to as a common color correction process) on the image data based on the parameter and stores the corrected image data as common intermediate data, for example, in the main memory 251. Here, in this embodiment and a seventh embodiment to be described later, an image analysis process, a high-quality image quality conversion process, and a high-quality color correction process correspond to the original display correction process in the present invention, and an common image quality conversion process and an common color correction process correspond to the projector correction process in the present invention. The image data which has been processed by the color correction section 256A23 becomes data of ten bits, which is greater than the number of bits of the image data acquired from the image quality converter 256A22.

The difference data generation unit 256A3 acquires the high-quality intermediate data and the common intermediate data which are stored in the main memory 251 and calculates the difference therebetween. The difference data generation unit 256A3 generates a first difference data for the difference and outputs the first difference data to the encoder 256A4. The first difference data becomes data for correcting the image data on which the common image quality conversion process and the common color correction process are performed into a status that the high-quality image quality conversion process and the high-quality color correction process are performed. Here, the only difference between the high-quality intermediate data and the common intermediate data is mainly whether a correction process for displaying a high-quality image corresponding to a user selection mode is performed or not. Accordingly, the difference between the high-quality intermediate data and the common intermediate data is relatively small and can be represented in the number of bits less then the number of bits of the high-quality intermediate data, for example, two bits. In other words, the first difference data generated by the difference data generation unit 256A3 becomes data having the number of bits less than that of the high-quality intermediate data.

Encoder 256A4 encodes the first difference data generated by the difference data generation unit 256A3 and transmits the encoded first difference data to the projector 3A through the correction data cable 42.

Configuration of Projector

Figure 3:
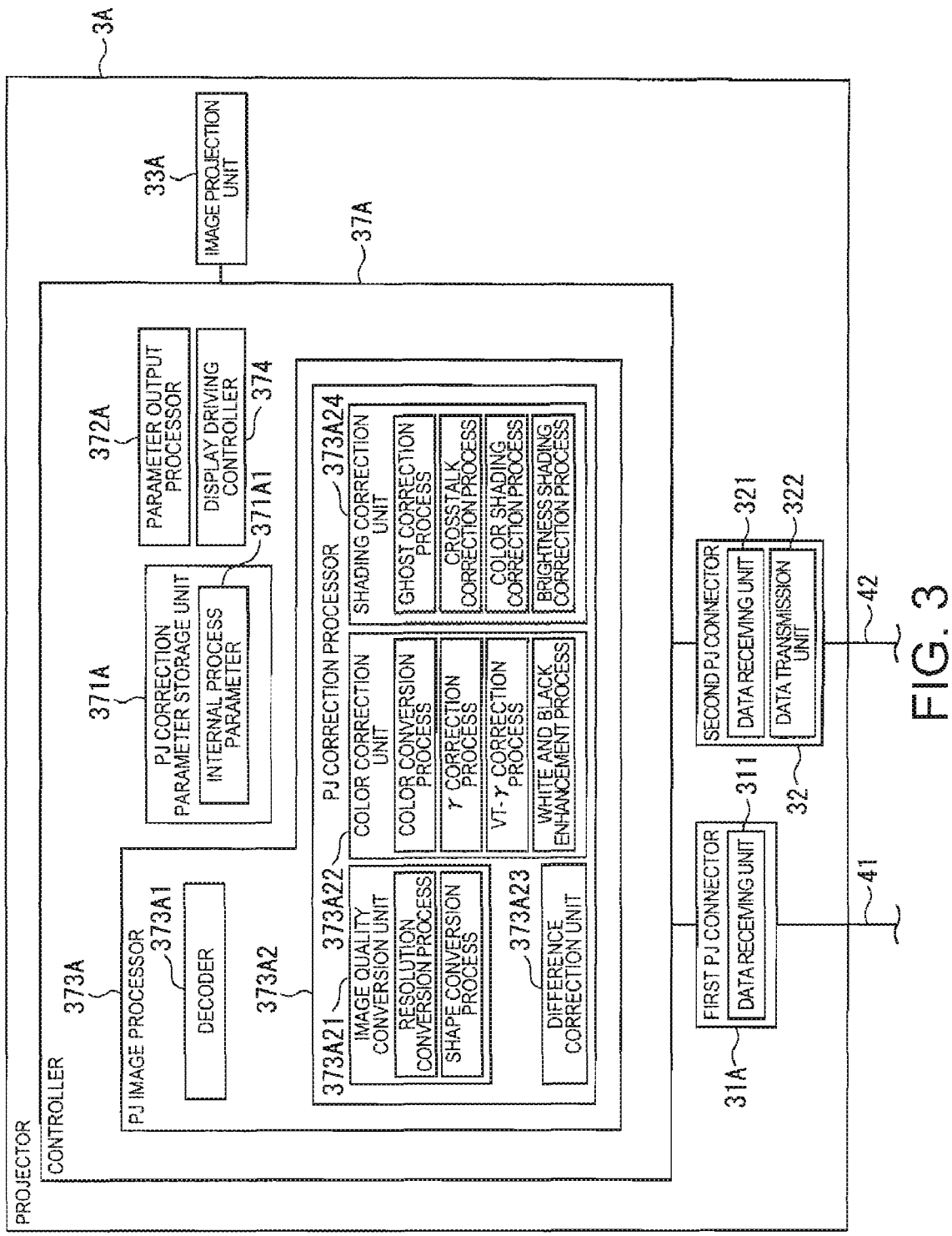
FIG. 3 is a schematic block diagram showing a configuration of the projector according to the first embodiment.
Figure 4:
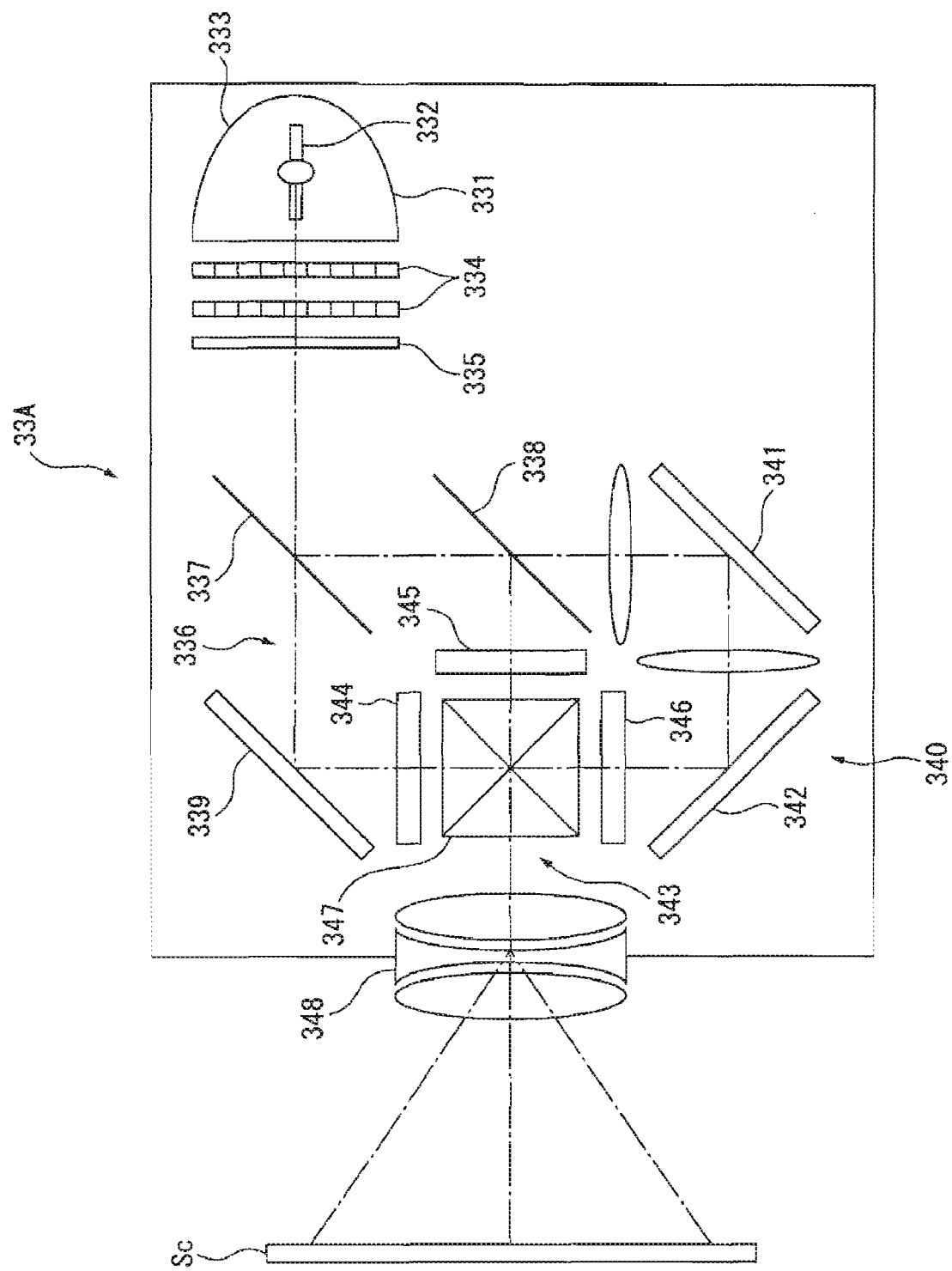
FIG. 4 is a schematic diagram showing a configuration of an image projector of the projector according to the first to fourth and seventh to ninth embodiments of the invention.

FIG. 3 is a schematic block diagram showing a configuration of the projector 3A. FIG. 4 is a schematic diagram showing a configuration of an image projector 33A of the projector 3A.

The projector 3A has memory capacity which can cover only parameters for the common correction process among various parameters for the common and high-quality correction processes and has a configuration in which the high-quality correction process cannot be performed at a high speed. The projector 3A receives the first difference data and the image data from the PC 2A. Then, the projector 3A performs the common correction process on the image data and performs the correction process on the data based on the first difference data (hereinafter, referred to as a difference correction process) to display a high-quality image on which the high-quality correction process corresponding to the user selection mode is performed on a screen Sc. In other words, a high-quality image is displayed without performing a complex high-quality correction process. The projector 3A also receives only the image data from the PC 2A and displays the common image on which a common correction process corresponding to the presentation mode has been performed on the screen Sc. The projector 3A includes a first PJ connector 31A, a second PJ connector 32, an image projector 33A, and a controller 37A.

The image data cable 41 is connected to the first PJ connector 31A. The first PJ connect or 31A receives the image data which is transmitted from the PC 2A by the data receiving unit 311 connected to the controller 37A and outputs the received image data to the controller 37A.

The cable connector of the correction data cable 42 is connected to the second PJ connector 32 attachably and detachably. The second PJ connector 32 receives the first difference data transmitted from the PC 2A through the correction data cable 42 by using the data receiving unit 421 which is connected to the controller 37A and outputs the received first difference data to the controller 37A. In addition, the second PJ connector 32 transmits the output parameter transmitted from the controller 37A by using the data transmission unit 322 (data transmission unit for projector correction) which is connected to the controller 37A to the PC 2A through the data cable 42.

The image projector 33A, as shown in FIG. 4, includes a light source unit 331 (light source device). The light from the light source 332 becomes parallel light beams by the reflexer 333, goes through two integrator lenses 334 and a polarization conversion element 335, and progresses to a color separation optical system 336. The color separation optical system 336 includes a dichroic mirror 337 which reflects a blue light and a green light and passes a red light and a dichroic mirror 338 which reflects a green light and passes a blue light. The color separation optical system 336 separates light into a red light, a green light, and a blue light. The red light is reflected in a reflection mirror 339, the green light is reflected in the dichroic mirror 338, and the blue light is attracted by a relay optical system 340 having two reflection mirrors 341 and 342. The red light, the green light, and the blue light are incident on a red light liquid crystal light valve 344 (light modulation element), a green light liquid crystal light valve 345 (light modulation element), and the blue light liquid crystal light valve 346 (light modulation element) of an electric optical device 343, respectively. The color lights are modulated by corresponding liquid crystal light valves 344 to 346, respectively under the control of the controller 37A to synthesize an image in a prism 347. The synthesized image is eradiated from a projection optical system 348 (projection optical device) to be projected on the screen Sc on an enlarged scale.

The controller 37A controls the whole projector 3A in accordance with a control direction transferred from the PC 2A side. The controller 37A, as shown in FIG. 3, includes a PJ correction parameter storage unit 371A (projector correction data storage unit), a parameter output processor 372A (projector correct on data acquisition unit), a PJ image processor 373A, and a display driving controller 374 (display controller) which are connected with one another through a bus (not shown) to be able to transmit various data.

The PJ correction parameter storage unit 371A stores an internal process parameter 371A1 (projector correction data) for performing a correction process on the image data.

In the internal process parameter 371A1, parameters for an image quality conversion process, a color correction process, and a shading correction process which are performed as common correction processes in the presentation mode are recorded. Each parameter which is recorded in the internal process parameter 371A1 is processed by a parameter output processing unit 372A to be appropriately and selectively transmitted to the PC 2A as an output parameter.

When the parameter output processing unit 372A acquires a parameter request signal through the correction data cable 42, the parameter output processing unit 372A reads each parameter which is output from the internal process parameter 371A1 as the PJ parameter 253A1 as the output parameter. The parameter output processing unit 372A transmits the output parameter to the PC 2A through the correction data cable 42.

The PJ image processor 373A performs a common correction process which is based on the internal process parameter 371A1 and a difference correction process on the image data which is transmitted from the PC 2A. The PJ image processor 373A includes a decoder 373A1 and a PJ correction processor 373A2.

The decoder 373A1 acquires the first difference data which is transmitted from the PC 2A through the correction data cable 42. The decoder 373A1 decodes the first difference data and outputs the decoded first difference data to the PJ correction processor 373A2.

When the PJ correction processor 373A2 acquires the image data from the PC 2A and the first difference data from the decoder 373A1, the PJ correction processor 373A2 performs common correction process based on the internal process parameter 371A1 and a difference correction process on the image data to generate a high-quality image data. On the other hand, when the PJ correction processor 373A2 acquires only the image data from the PC 2A, the PJ correction processor 373A2 performs only the common correction process based on the internal process parameter 371A1 to generate a common image data. The PJ correction processor 373A2 includes an image quality conversion unit 373A21 (projector correction unit), a color correction unit 373A22 (projector correction unit) a difference correction unit 373A23, and a shading correction unit 373A24.

When the image quality conversion unit 373A21 acquires image data transmitted from the PC 2A through the image data cable 41, the image quality conversion unit 373A21 reads parameters for resolution conversion and form conversion processes of the presentation mode from the internal process parameter 371A1. Then, the image quality conversion unit 373A21 performs a common image quality conversion process based on the parameters on the image data and outputs the converted image data to the color correction unit 373A22. Here, the image data processed by the image quality conversion unit 373A21 becomes an eight bit data.

When the color correction unit 373A22 acquires the image data on which the common image quality conversion process has been performed, the color correction unit 373A22 reads a parameter for a color correction process of the presentation mode from the internal process parameter 371A1 and performs the common color correction process based on the parameter on the image data. When the first difference data is output from the decoder 373A1, that is, when the color correction unit 373A22 is connected to the PC 2A through the correction data cable 42, the color correction unit 373A22 outputs the image data to the difference correction unit 373A23. On the other hand, when the first difference data is not output from the decoder 373A1, that is, when the color correction unit 373A22 is not connected to the PC 2A through the correction data cable 42, the color correction unit 373A22 outputs the image data to the shading correction unit 373A24. Here, the image data which has been processed by the color correction unit 373A22 is the same as a common intermediate data generated in the PC 2A and is data of ten bits.

When the difference correction unit 373A23 acquires image data on which a common color correction process has been performed from the color correction unit 373A22 and the first difference data from the decoder 373A1, the difference correction unit 373A23 performs a difference correction process. To be more specific, the difference correction unit 373A23 performs to add several bit data constructing the first difference data to the several lower bits of 10-bit data constructing the image data. For example, when the first difference data is 2-bit data, a process of adding the 2-bit data constructing the first difference data to the lower two bits of the image data is performed. By performing the process of adding the first difference data, the color tone of the image data for each pixel is changed from a status in which a common image quality conversion process and a common color correction process have been processed to a status in which a high-quality image quality conversion process and a high-quality color correction process have been processed. In addition, the difference correction unit 373A23 outputs the image data on which the difference correction process has been performed to the shading correction unit 373A24.

When the shading correct Ion unit 373A24 acquires the image data on which the difference correction process has been performed from the difference correction unit 373A23, the shading correction unit 373A24 reads a parameter for the shading correction process of the presentation mode from the internal process parameter 371A1. The shading correction unit 373A24 performs the common shading correction process based on the parameter on the image data and outputs the corrected image data to the display driving controller 374 as the first high-quality image data. In addition, when the shading correction unit 373A24 acquires the image data on which the common color correction process is performed from the color correction unit 373A22, the shading correction unit 373A24 performs the above-described common shading correction process to the image data and outputs the corrected image data to the display driving controller 374 as the common image data.

When the display driving controller 374 acquires the first high-quality image data from the PJ image processor 373A, the display driving controller 374 outputs a control signal for driving the liquid crystal light valves 344 to 346 with the first high-quality image based on the first high-quality image data displayed. The first high-quality image is an image on which the high-quality image quality conversion process, the high-quality color correction process, and the common shading correction process have been performed. In addition, when the display driving controller 374 acquires the common image data from the PJ image processor 373A, the display driving controller 374 outputs a control signal for driving the liquid crystal light valves 344 to 346 with the common image based on the common image data displayed.

Operation of Projection System

Figure 5:
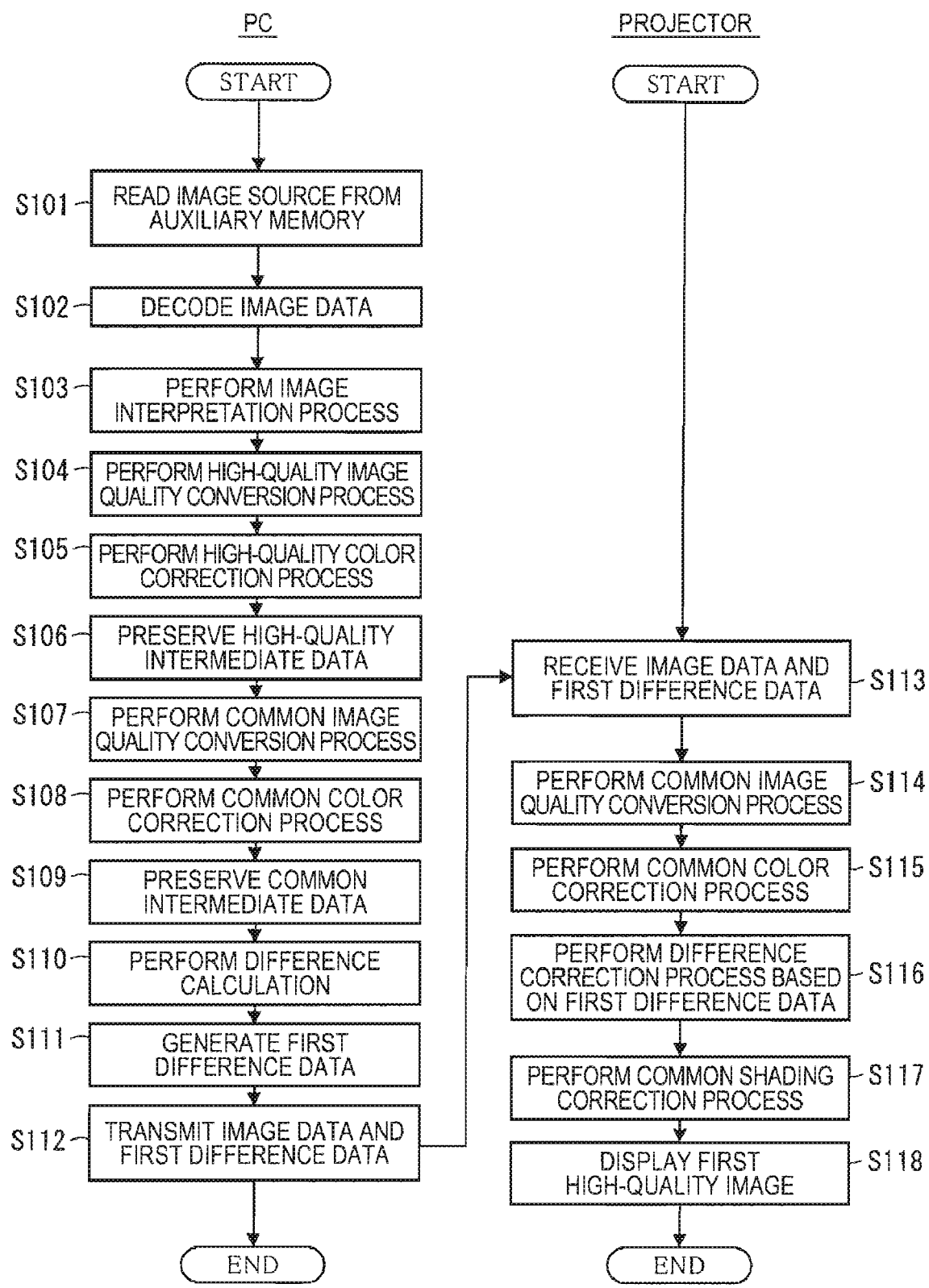
FIG. 5 is a flowchart showing a high-quality display process according to the first embodiment.

As an operation of the above-described projection system 1A, a high-quality display process will now be described. FIG. 5 is a flowchart showing the high-quality display process.

At first, the PC 2A, as shown in FIG. 5, reads, for example, an image source selected by a user from the auxiliary memory 252 (step S101) and decodes the image data (step S102). Thereafter, the PC 2A performs an image interpretation (step S103: second processing apparatus correction step), a high-quality image quality conversion process (step S104: second processing apparatus correction step), and high-quality color correction process (step S105: second processing apparatus correction step) on the decoded image data and preserves the processed decoded image data as high-quality intermediate data (step S106).

In addition, the PC 2A performs a common image quality conversion process (step S107: first processing apparatus correction step) and a common color correction process (step 108: first processing apparatus correction step) on the image data which has been decoded in step S102 and stores the processed data as a common intermediate data (step S109). Next, the PC 2A performs a process of calculating a difference between the high-quality intermediate data and the common intermediate data (step S110) to generate first difference data (step S111: difference data generation step). Next, the PC 2A transmits image data on which any correction process has not been performed to the projector 3A through the image data cable 41 and transmits the first difference data to the projector 3A through the correction data cable 42 (step S112: difference data transmission step).

When the projector 3A receives the image data and the first difference data (step S113), the projector 3A performs a common image quality conversion process (step S114) and a common color correction process (step S115) on the image data. Then, the projector 3A performs a difference correction process (step S116 and a common shading correction process (step S117) based on the first difference data to display a first high-quality image (step S118).

Advantage of First Embodiment

In the above-described first embodiment, following advantages can be acquired.

(1) The PC 2A of the projection system 1A performs a common image quality conversion process and a common color correction process which can be performed by the projector 3A, that is, a relatively simple correction process using a linear interpolation, on the image data to generate a common intermediate data. In addition, the PC 2A performs a high-quality image quality conversion process and a high-quality color correction process for displaying a high-quality image which is originally desired to be displayed in a projector 3A, that is, for example, a correction process using Lagrange interpolation, on the image data to generate a high-quality intermediate data. In addition, the PC 2A calculates a difference between the common intermediate data and the high-quality intermediate data, generates first difference data representing the calculated difference, and outputs the first difference data to the projector 3A through the correction data cable 42.

The projector 3A performs a common image quality conversion process and a common color correction process on the image data and performs a difference correction process which is based on the first difference data on the processed image data. The display driving controller 374 displays a first high-quality image based on the image data on which the difference correction process has been performed.

Accordingly, the projector 3A can display an image that is originally desired to be displayed based on the image on which a high-quality correction process has been processed only by acquiring a difference data represented in smaller number of bits than the 10-bit image data on which a high-quality correction process is performed and performing a correction process based on the difference data. Thus, it is possible to display an image that is originally desired to be displayed without receiving image data on which a high-quality correction process is performed from the PC 2A. As a result, an excellent image can be displayed while lowering of the data transmission speed is suppressed.

(2) The PC 2A outputs the image data stored in the auxiliary memory 252 to the projector 3A through the image data cable 41. Next, the projector 3A acquires the image data from the PC 2A and displays the first high-quality image.

Accordingly, the configuration of the projection system 1A can be simplified without arranging a configuration only for outputting the image data to the PC 2A or the projector 3A.

(3) The projector 3A reads an output parameter from an internal process parameter 371A1 which is stored in the PJ correction parameter storage unit 371A and outputs the read output parameter to the PC 2A through the correction data cable 42. The PC 2A performs a common correction process based on the output parameter transmitted from the projector 3A, that is, the PJ parameter 253A1.

Accordingly, the PC 2A can appropriately generate difference data corresponding to the performance of the projector 3A which is connected to the PC 2A through the correction data cable 42. In addition, since the correction data cable 42 which is used for the transmission of the difference data is also used for the transmission of the output parameter, the difference data can be generated appropriately without causing complication of the configuration of the protection system 1A.

(4) In the high-quality correction process, processes for color conversion, γ correction, and black and white enhancement are included. Accordingly, the projector 3A can display a first high-quality image in a color which is originally desired to be displayed.

Second Embodiment

Hereinafter, a second embodiment of the present invention will be described with reference to the accompanying drawings.

In this second embodiment and third to ninth embodiments to be described later, for a same configuration as a configuration which has been described in the first embodiment or the other embodiments, the description is omitted and a same numeral is designated, and for an approximately the same configuration, the description is abbreviated and a same name is designated to the configuration.

Configuration of Projection System

FIG. 1 is a diagram showing an appearance of a projection system 1B according to a second embodiment of the present invention.

The projection system 1B includes a PC 2B (image processing apparatus), a projector 3B, and a data transmission unit 4A.

Configuration of PC

Figure 6:
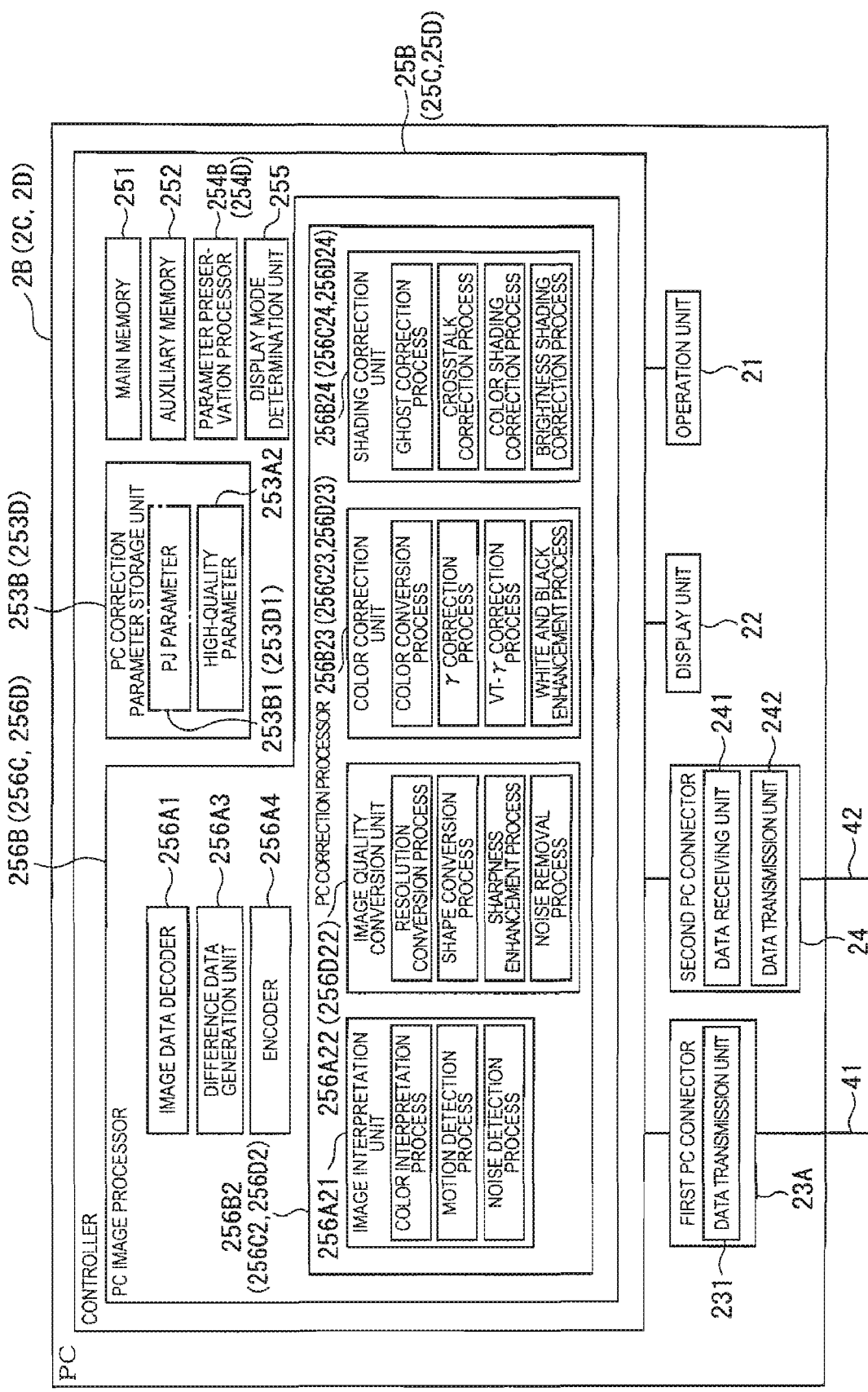
FIG. 6 is a schematic block diagram of the according to the second to fourth embodiments.

FIG. 6 is a schematic block diagram of the PC 2B.

In the PC 2B, a PC correction parameter storage unit 253B, a parameter preservation processor 254B, and a PC image processor 256B of the controller 25B are different from the first embodiment. In addition, in the PC image processor 256B, a color correction unit 256B23 and a shading correction unit 256B24 of the PC correction processor 256B2 (first and second processing apparatus correction units) are different from the first embodiment.

The PC correction parameter storage unit 253B stores a PJ parameter 253B1 and a high-quality parameter 253A2. In the PJ parameter 253B1, a parameter for a shading correction process which is performed in the presentation mode is stored in addition to the same parameter as the PJ parameter 253A1 of the first embodiment.

The parameter preservation processor 254B acquires an output parameter from the projector 3B and preserves the output parameter in the correction parameter storage unit 253B as the PJ parameter 253B1.

The color correction unit 256B23 performs high-quality color correction process on the image data on which a high-quality image quality conversion process has been performed by the image quality conversion unit 256A22. On the other hand, the color correction unit 256B23 performs a common color correction process on the image data on which a common image quality conversion process is performed by the image quality conversion unit 256A22.

When the shading correction unit 256B24 acquires the image data on which the high-quality color correction process is performed from the color correct on unit 256B23, the shading correction unit 256B24 reads a parameter for the shading correction process from the high-quality parameter 253A2. Then, the shading correction unit 256B24 performs a high-quality correction process based on this parameter (hereinafter, referred to as a high-quality shading correction process) on the image data and preserves the processed image data as a high-quality intermediate data. On the other hand, when the shading correction unit 256B24 acquires the image data on which the common color correction process is performed from the color correction unit 256B23, the shading correction unit 256B24 performs a common correction process based on a parameter of the PJ parameter 253B1 for the shading correction process (hereinafter, referred to as a common shading correction process) on the image data and preserves the processed image data as common intermediate data. Here, in the second embodiment, an image interpretation process, a high-quality image quality conversion process, a high-quality color correction process, and a high-quality shading correction process correspond to the display correction process of the present invention, and a common image quality conversion process, a common color correction process, and a common shading correction process correspond to the projector correction process of the invention.

The difference data generation unit 256A3 calculates a difference between the high-quality intermediate data and the common intermediate data, generates a second difference data, and outputs the second difference data to the encoder 256A4. The second difference data becomes data for correcting the data or which the common image quality conversion process, the common color correction process, and a common shading correction process are performed into a status that the high-quality image quality conversion process, the high-quality color correction process, and the high-quality shading correction process are performed.

Configuration of Projector

Figure 7:
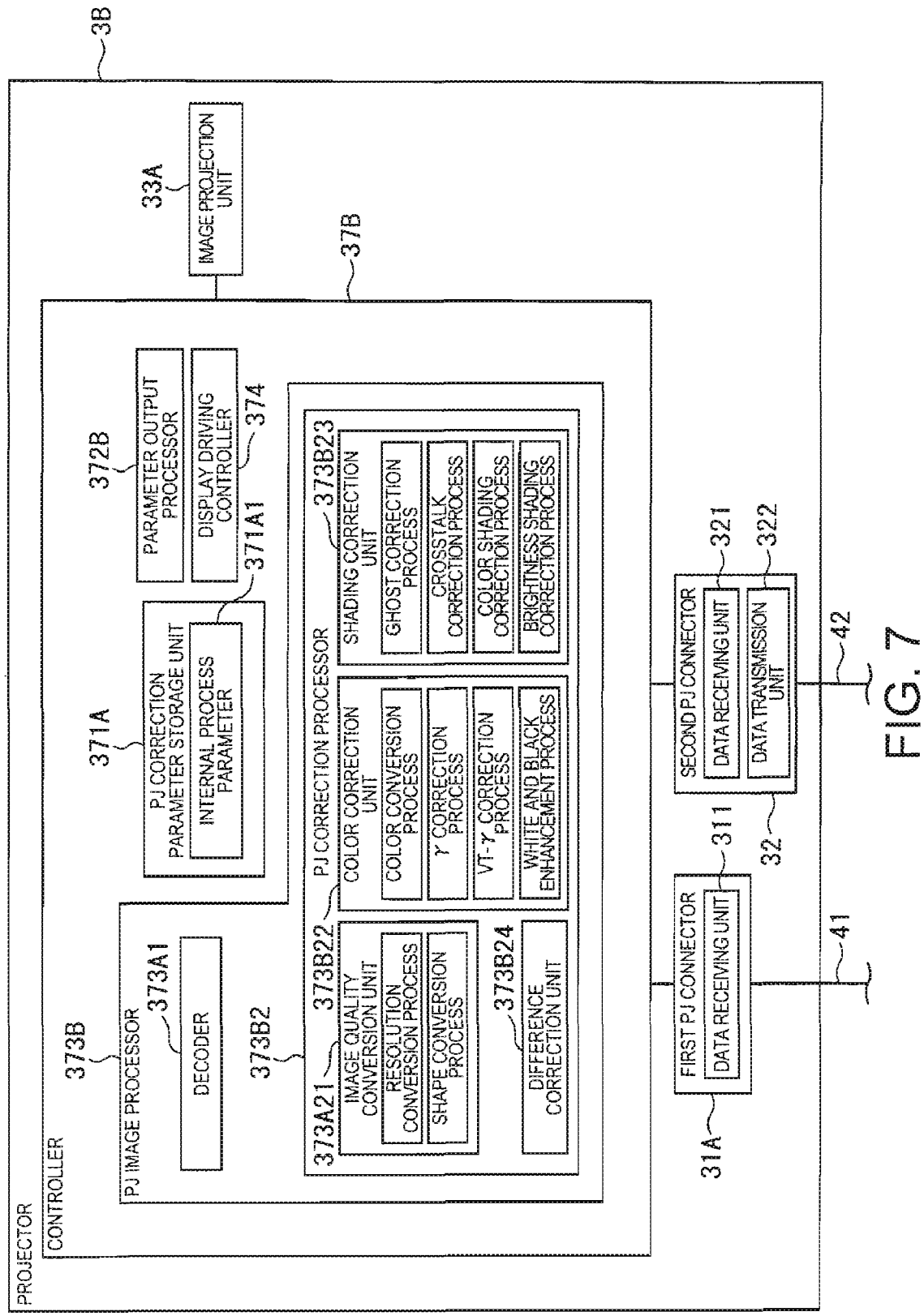
FIG. 7 is a schematic block diagram showing a configuration of a projector according to the second embodiment.

FIG. 7 is a schematic block diagram showing a configuration of the projector 3B.

In the projector 3B, a parameter output processor 372B (projector correction data acquisition unit) and a PJ image processor 373B of the controller 37B is different from the first embodiment. In the PC image processor 373B, a color correction unit 373B22 (projector correction unit), a shading correction unit 373B23 (projector correction unit) and a difference correction unit 373B24 of the PJ correction processor 373B2 are different from the first embodiment.

When the parameter output processor 372B acquires a parameter request signal, the parameter output processor 372B reads each parameter which is output as a PJ parameter 253B1 as an output parameter and transmits each parameter to the PC 2B.

When the color correction unit 373B22 acquires image data on which a common image quality conversion process has been performed from the image quality conversion unit 373A21, the color correction unit 373B22 performs a common color correction process on the image data and outputs the processed image data to the shading correction unit 373B23.

When the shading correction unit 373B23 acquires the image data on which a common color correction process has been performed from the color correction unit 373B22, the shading correction unit 373B23 performs a common shading correction process. In addition, when the shading correction unit 373B23 is connected to the PC 2B through the correction data cable 42, the shading correction unit 373B23 outputs the image data to the difference correction unit 373B24. On the other hand, when the shading correction unit 373B23 is not connected through the correction data cable 42 to the PC 2B, the shading correction unit 373B23 outputs the Image data to the display driving controller 374 as common image data. Here, the image data which has been processed by the shading correction unit 373B23 becomes the same as the common intermediate data generated in the PC 2B.

When the difference correction unit 373B24 acquires the image data on which the common shading correction process has been performed from the shading correction unit 373B23 and a second difference data from the decoder 373A1, the difference correction unit 373B24 performs a difference correction process based on the second difference data and outputs the processed image data to the display driving controller 374 as second high-quality image data. By performing the difference correction process based on the second difference data, the color tone of the image data for each pixel is corrected from a status in which a common image quality conversion process, a common color correction process, a common shading correction process are performed to a status in which a high-quality image quality conversion process, a high-quality color correction process, and a high-quality shading correction process are performed.

When the display driving controller 374 acquires the second high-quality image data from the PJ image processor 373B, the display driving controller 374 outputs a control signal for displaying the second high-quality image based on the second high-quality image data. The second high-quality image becomes an image on which a high-quality image quality conversion process, a high-quality color correction process, and a common shading correction process are performed.

Operation of Projection System

Figure 8:
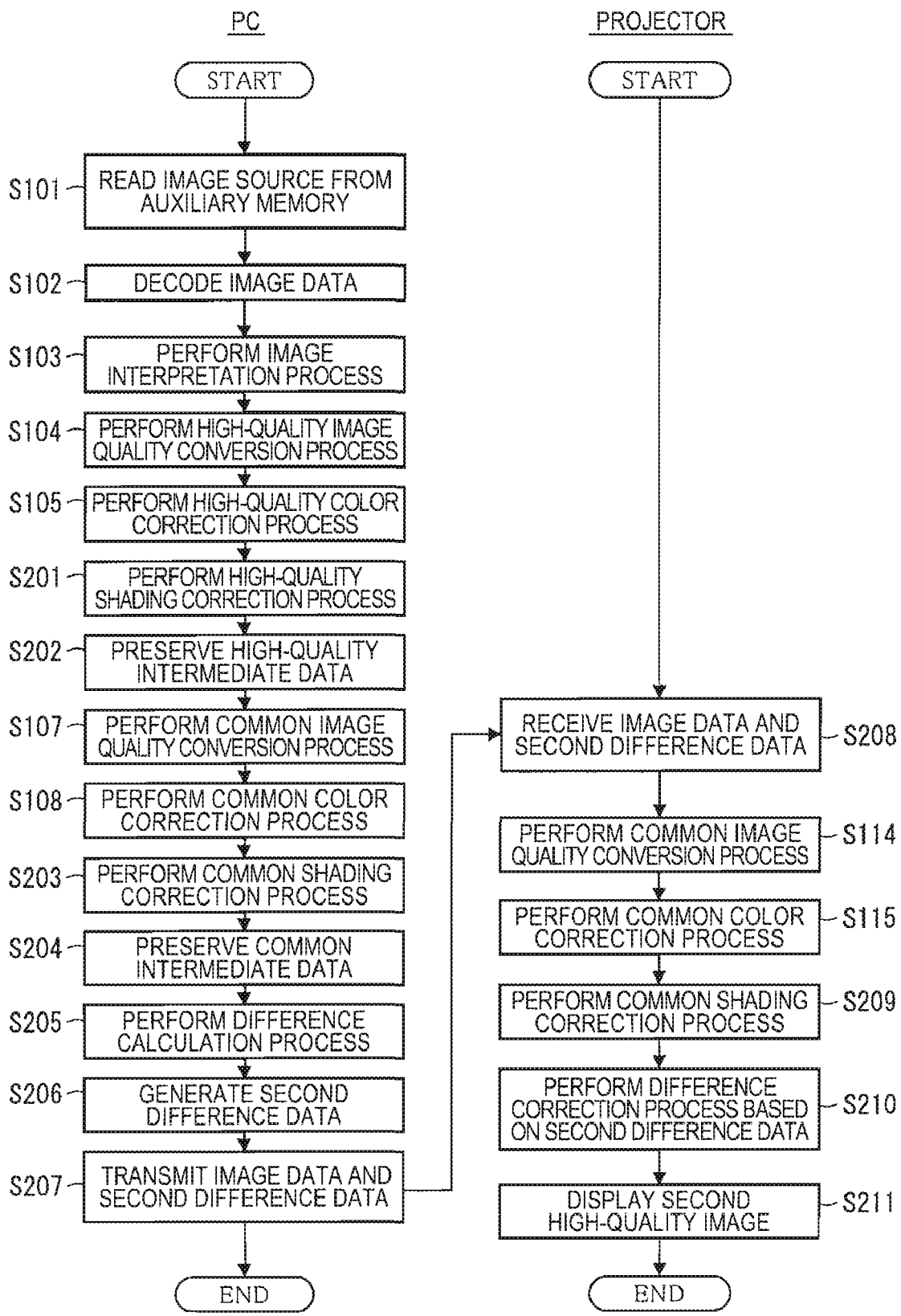
FIG. 8 is a flowchart showing a high-quality display process according to the second embodiment.

As an operation of the above-mentioned projection system 15, a high-quality display process will now be described. FIG. 8 is a flowchart showing the high-quality display process.

At first, the PC 2B, as shown in FIG. 8, performs a high-quality shading correction process (step S201: second processing apparatus correction step) and preserves the processed data as high-quality intermediate data (step 202) after the above-mentioned processes of the steps S101 to S105 are performed. In addition, when the above-mentioned processes of the steps S107 and S108 are performed, the PC 2B performs a common shading correction process (step S203: first processing apparatus correction step) and preserves the processed data as common intermediate data (step S204). Next, the PC 2B performs a difference calculation process (step S205), a generation process of a second difference data (step S206: difference data generation step), and a transmission process of the image data and the second difference data to the projector 3B (step S207: difference data transmission step).

When the projector 3B receives the image data and the second difference data (step S208), the projector 3B performs the above-mentioned processes of the steps S114 and S115 and a common shading correction process (step S209). Then, the projector performs a difference correction process based on the second difference data (step S210) to display a second high-quality image (step S211).

Advantage of Second Embodiment

In the above-described second embodiment, the following advantages can be acquired in addition to the same operations and advantages as (1) to (4) in the first embodiment.

(5) In the high-quality correction process, a process for correcting deterioration of an image, that is, color shading and brightness shading due to a characteristic of each liquid crystal light valve 344 to 346 of the projector 3B is included. Accordingly, the projector 3B can display a first high-quality image to which the color shading and the brightness shading are corrected. In addition, since the PC 2B performs a correction process in units of images which has a heavy processing load, a second high-quality image can be displayed while the load of the projector 3B for processing is suppressed.

Third Embodiment

Hereinafter, a third embodiment of the invention will be described with reference to the accompanying drawings.

Configuration of Projection System

FIG. 1 is a diagram showing an appearance of a protection system IC according to a third embodiment of the invention.

The protection system IC includes a PC 2C (image processing apparatus) a projector 3C, and a data transmission unit 4A.

Configuration of PC

FIG. 6 is a schematic block diagram showing a configuration of the PC 2C.

In the PC 2C, a PC image processor 256C of a controller 25C is different from the first and second embodiments of the invention. In addition, in the PC image processor 256C, a color correction unit 256C23 and a shading correction unit 256C24 of the PC correction processor 256C2 (first and second processing apparatus correction units) are different from the first and second embodiments.

When the color correction unit 256C23 acquires the image data on which a high-quality image quality conversion process has been performed from the image quality conversion unit 256A22, the color correction unit 256C23 performs a high-quality color correction process on the acquired image data. On the other hand, when the color correction unit 256C23 acquires the image data on which a canon image quality conversion process has been performed from the image quality conversion unit 256A22, the color correction unit 256C23 preserves the acquired image data as common intermediate data.

When the shading correction unit 256C24 acquires the image data on which a high-quality color correction process is performed from the color correction unit 256C23, the shading correction unit 256C24 performs a high-quality shading correction process and preserves the processed image data as high-quality intermediate data. Here, in the third embodiment, an image interpretation process, a high-quality image quality conversion process, a high-quality color correction process, and a high-quality shading correction process correspond to the original display correction process of the invention, and a common image quality conversion process and a common color correction process correspond to the projector correction process of the invention.

The difference data generation unit 256A3 calculates a difference between the high-quality intermediate data and the common intermediate data, generates a third difference data, and outputs the third difference data to the encoder 256A4. The third difference data becomes data for correcting the image data on which a common image quality conversion process and a common color correction process are performed into a status that a high-quality image quality conversion process, a high-quality color correction process, and a high-quality shading correction process are performed.

Configuration of Projector

Figure 9:
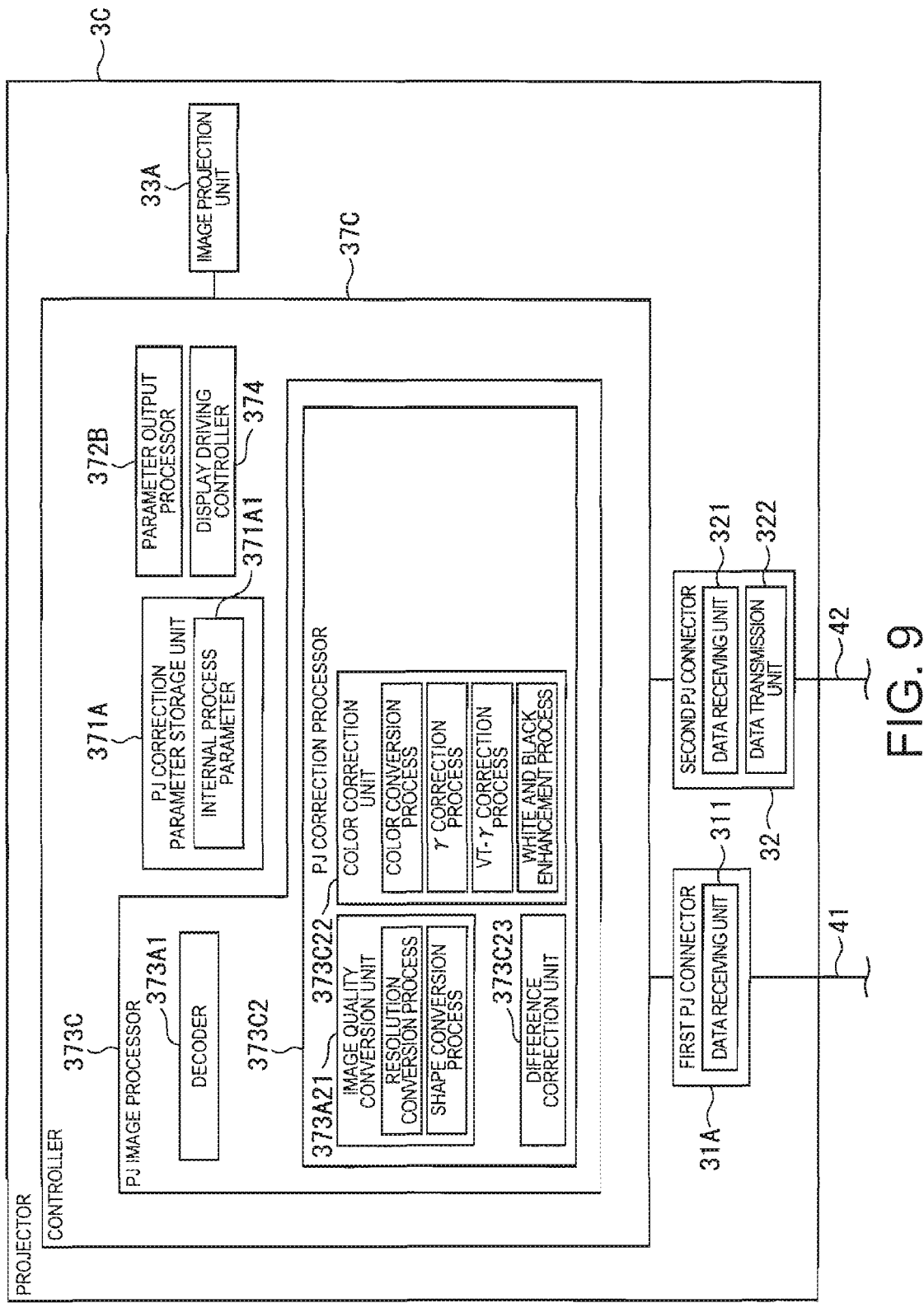
FIG. 9 is a schematic block diagram showing a configuration of the projector according to a third embodiment.

FIG. 9 is a schematic block diagram showing a configuration of the projector 3C.

In the projector 3C, a PJ image processor 373C of a controller 37C is different from the first and second embodiments. In addition, in the PJ image processor 373C, a color correction unit 373C22 (projector correction unit) and a difference correction unit 373C23 of a PJ correction processor 373C2 are different from the first and second embodiments of the invention.

When the color correction unit 373C22 acquires image data on which a common image quality conversion process has been performed from the image quality conversion unit 373A21, the color correction unit 373C22 performs a common color correction process on the acquired image data. In addition, when the color correction unit 373C22 is connected to the PC 2C through the correction data cable 42, the color correction unit 373C22 outputs the image data to the difference correction unit 373C23. On the other hand, when the color correction unit 373C22 is not connected through the correction data cable 42 to the PC 2C, the color correction unit 373C22 outputs the image data to the display driving controller 374 as common image data. Here, the image data which has been processed by the color correction unit 373C22 becomes the same as the common intermediate data generated in the PC 2B. In other words, the common image based on the common image data becomes an image on which a common shading correction process is not performed.

When the difference correction unit 373C23 acquires the image data on which a common color correction process has been performed from the color correction unit 373C22 and a third difference data from the decoder 373A1, the difference correction unit 373C23 performs a difference correction process based on the third difference data and outputs the processed image data to the display driving controller 374 as third high-quality image data. By performing the difference correction process based on the third difference data, the color tone of the image data for each pixel is corrected from a status in which a common image quality conversion process and a common color correction process are performed to a status in which a high-quality image quality conversion process, a high-quality color correction process, and a high-quality shading correction process are performed.

When the display driving controller 374 acquires the third high-quality image data from the PJ image processor 373C, the display driving controller 374 outputs a control signal for displaying the third high-quality image based on the third high-quality image data. The third high-quality image becomes an image on which a high-quality image quality conversion process, at high-quality correction process and a common shading correction process are performed, that is an image which is the same as the second high-quality image and a high quality correction process is performed on.

Operation of Projection System

Figure 10:
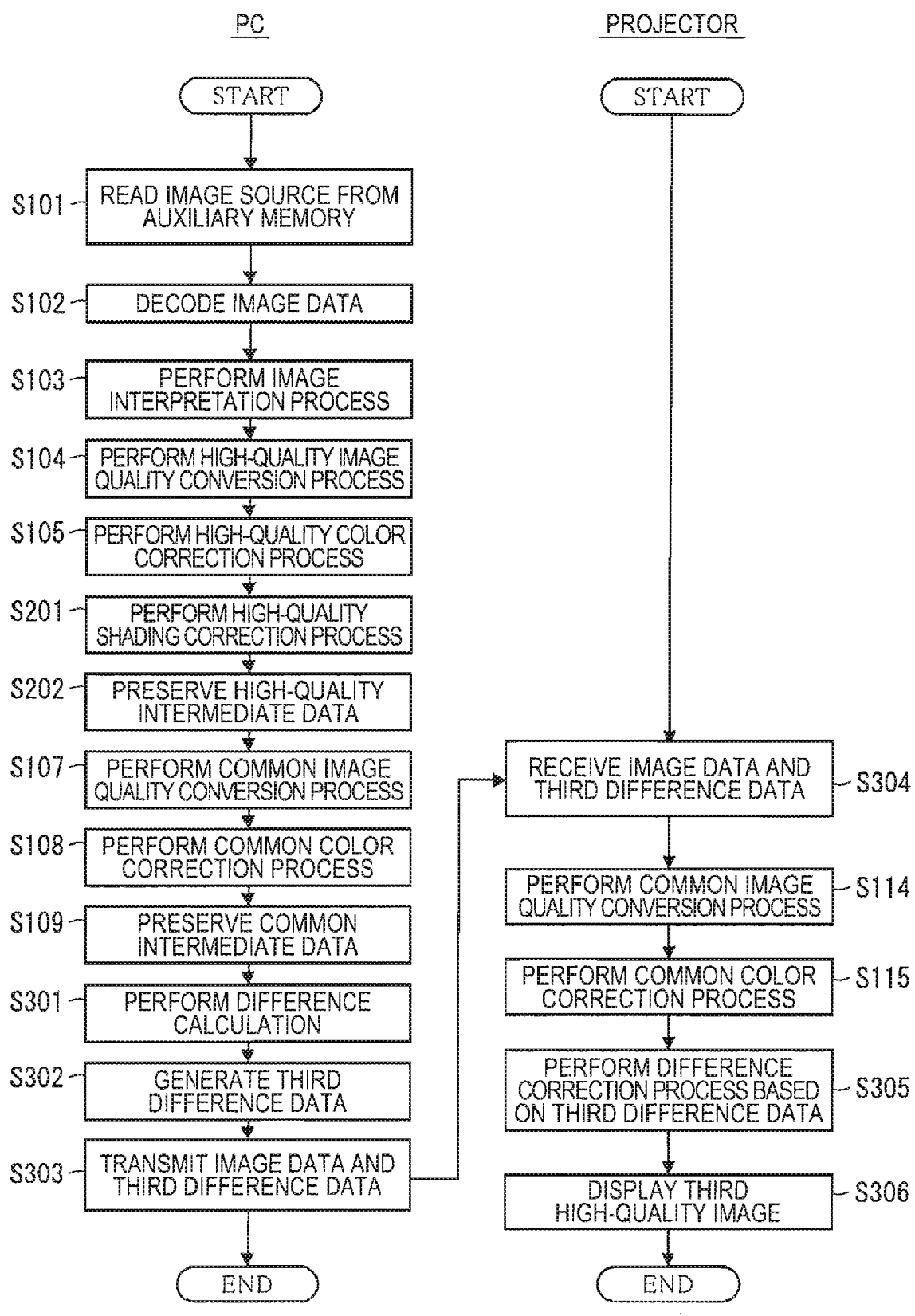
FIG. 10 is a flowchart showing a high-quality display process according to the third embodiment.

As an operation of the above-mentioned projection system 1C, a high-quality display process will now be described. FIG. 10 is a flowchart showing the high-quality display process.

At first, the PC 2C, as shown in FIG. 1, performs a difference calculation process (step S301), a generation process of the third difference data (step S302: difference data generation step), and a transmission process of the image data and the third difference data to the projector 3C (step S303: difference data transmission step), after the above-mentioned processes of the steps S101 to S105, S201, S202, and S107 to S109 are performed.

When the projector 3C receives the image data and the third difference data (step S304), the projector 3C performs the processes of the steps S114 and S115. Next, the projector 3C performs a difference correction process based on the third difference data (step S305) to display the third high-quality image (step S306).

Advantage of Third Embodiment

In the above-described third embodiment, the following advantages can be acquired in addition to the same advantages as (1) to (5) in the first and second embodiments.

(6) The PC 2C generates third difference data for correcting image data on which a common image quality conversion process and a common color correction process have been performed into a status that a high-quality image quality conversion process, a high-quality color correction process, and a high quality shading correction process are performed. The projector 3C performs a difference correction process based on the third difference data on image data on which a common image quality conversion process and a common color correction process have been performed to display a third high-quality image.

Accordingly, a third high-quality image of which color shading and brightness shading have been corrected can be displayed without performing the correction for the color shading and the brightness shading in the projector 3C. Accordingly, the load of the projector 3C for processes can be reduced, thereby saving of the power can be achieved.

Fourth Embodiment

Hereinafter, a fourth embodiment of the invention will be described with reference to the accompanying drawings.

Configuration of Projection System

FIG. 1 is a diagram showing an appearance of a projection system 1D according to a fourth embodiment of the invention.

The projection system 1D includes a PC 2D (image processing apparatus), a projector 3D, and a data transmission unit 4A.

Configuration of PC

FIG. 6 is a schematic block diagram showing a configuration of the PC 2D.

In the PC 2D, a PC correction parameter storage unit 253D, a parameter preservation processor 254D, and a PC image processor 256D of a controller 25D are different from the first to third embodiments. In addition, in a PC correction processor 256D2 (first and second processing apparatus correction unit) of the PC image processor 256D, an image quality conversion unit 256D22, a color correction unit 256D23, and a shading correction unit 256D24 are different from the first to third embodiments of the invention.

The PC correction parameter storage unit 253D stores a PJ parameter 253D1 and a high-quality parameter 253A2. In the PJ parameter 253D1, all the parameters of the PJ parameter 253B1 in the second embodiment except for the parameter for color correction process are recorded.

The parameter preservation processor 254D acquires an output parameter from the projector 3D and preserves the acquired output parameter as a PJ parameter 253D1.

When the image conversion unit 256D22 acquires image data from an image data decoder 256A1, the image conversion unit 256D22 performs a high-quality image quality conversion process on the image data and transmits the processed image data to the color correction unit 256D23. In addition, the image conversion unit 256D22 performs a common image quality conversion process and preserves the converted image data as a common intermediate data.

When the color correction unit 256D23 acquires the image data on which the high-quality image quality conversion process has been performed from the image quality conversion unit 256D22, the color correction unit 256D23 performs a high-quality color correction process.

When the shading correction unit 256D24 acquires the image data on which the high-quality color correction process has been performed from the color correction unit 256D23, the shading correction unit 256D24 performs a high-quality shading correction process and preserves the processed image data as a high quality intermediate data. Here, in the fourth embodiment, an image interpretation process, a high-quality image quality conversion process, a high-quality color correction process, and a high-quality shading correction process correspond to the original display correction process, and a common image quality conversion process corresponds to the projector correction process of the invention.

The difference data generation unit 256A3 calculates a difference between the high-quality intermediate data and the common intermediate data, generates a fourth difference data, and outputs the fourth difference data to the encoder 256A4. The fourth difference data becomes data for correcting the image data on which a common image quality conversion process is performed into a status that a high-quality image quality conversion process, a high-quality color correction process, and a high-quality shading correction process are performed.

Configuration of Projector

Figure 11:
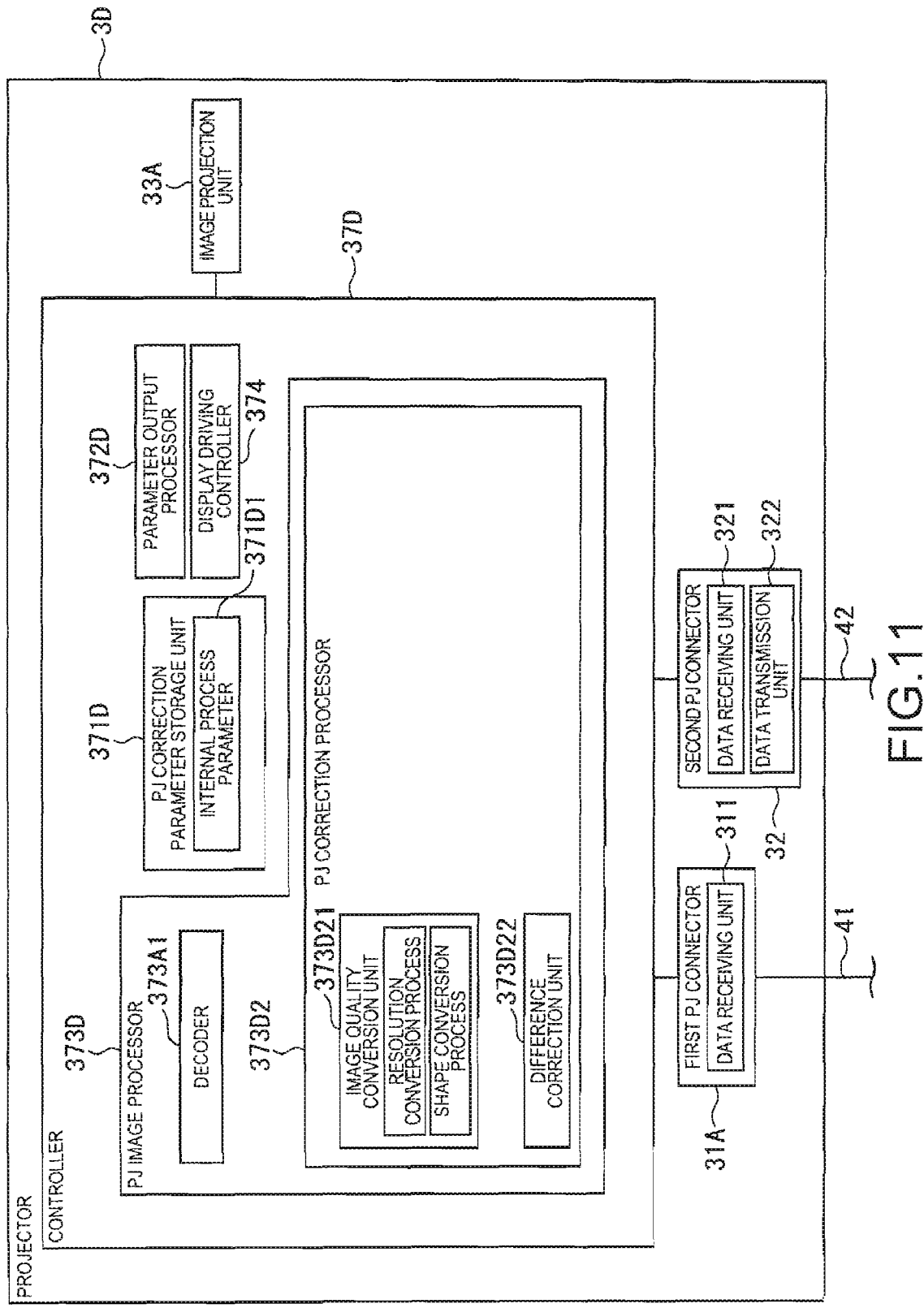
FIG. 11 is a schematic block diagram showing a configuration of a projector according to the fourth embodiment.

FIG. 11 is a schematic block diagram showing a configuration of the projector 3D.

In the projector 3D, a PJ correction parameter storage unit 371D (projector correction data storage unit) a parameter output process unit 372D (projector correction data acquisition unit), and a PJ image processor 373D of a controller 37D are different from the first to third embodiments. In addition, in a PJ image processor 373D, an image quality conversion unit 373D21 projector correction unit) and a difference correction unit 373D22 of the PJ correction processor 373D2 are different from the first to third embodiments of the invention.

The PJ correction parameter storage unit 371D stores an internal process parameter 371D1 (projector correction data).

In the internal process parameter 371D1, all the parameters of the internal process parameter 371A1 of one of the first to third embodiments of the invention except for the color correction process parameter is recorded.

When the parameter output processor 372D acquires a parameter request signal, the parameter output processor 372D reads each parameter which is output as a PJ parameter 253D1 and transmits each parameter to the PC 2D.

When the image quality conversion unit 373D21 acquires the image data, the image quality conversion unit 373D21 performs a common image quality conversion process on the acquired image data. When the image quality conversion unit 373D21 is connected to the PC 2D through the correction data cable 42, the image quality conversion unit 373D21 outputs the image data to the difference correction unit 373D22. On the other hand, when the image quality conversion unit 373D21 is not connected to the PC 2D through the correction data cable 42, the image quality conversion unit 373D21 outputs the image data to the display driving controller 374 as a common image data.

When the difference correction unit 373D22 acquires the image data on which a common image quality conversion process has been performed from the image quality conversion unit 373D21 and a fourth difference data from the decoder 373A1, the difference correction unit 373D22 performs a difference correction process based on the fourth difference data and outputs the processed image data to the display driving controller 374 as fourth high-quality image data. By performing the difference correction process based on the fourth difference data, the color tone of the image data for each pixel is corrected from a status in which a common image quality conversion process is performed to a status in which a high-quality Image quality conversion process, a high-quality color correction process, and a high-quality shading correction process are performed.

When the display driving controller 374 acquires the fourth high-quality image data from the PJ image processor 373D, the display driving controller 374 outputs a control signal for displaying a fourth high-quality image based on the fourth high-quality image data. The fourth high-quality image becomes an image which a high quality correction process is performed on and is the same as the second and third high-quality images.

Operation of Projection System

Figure 12:
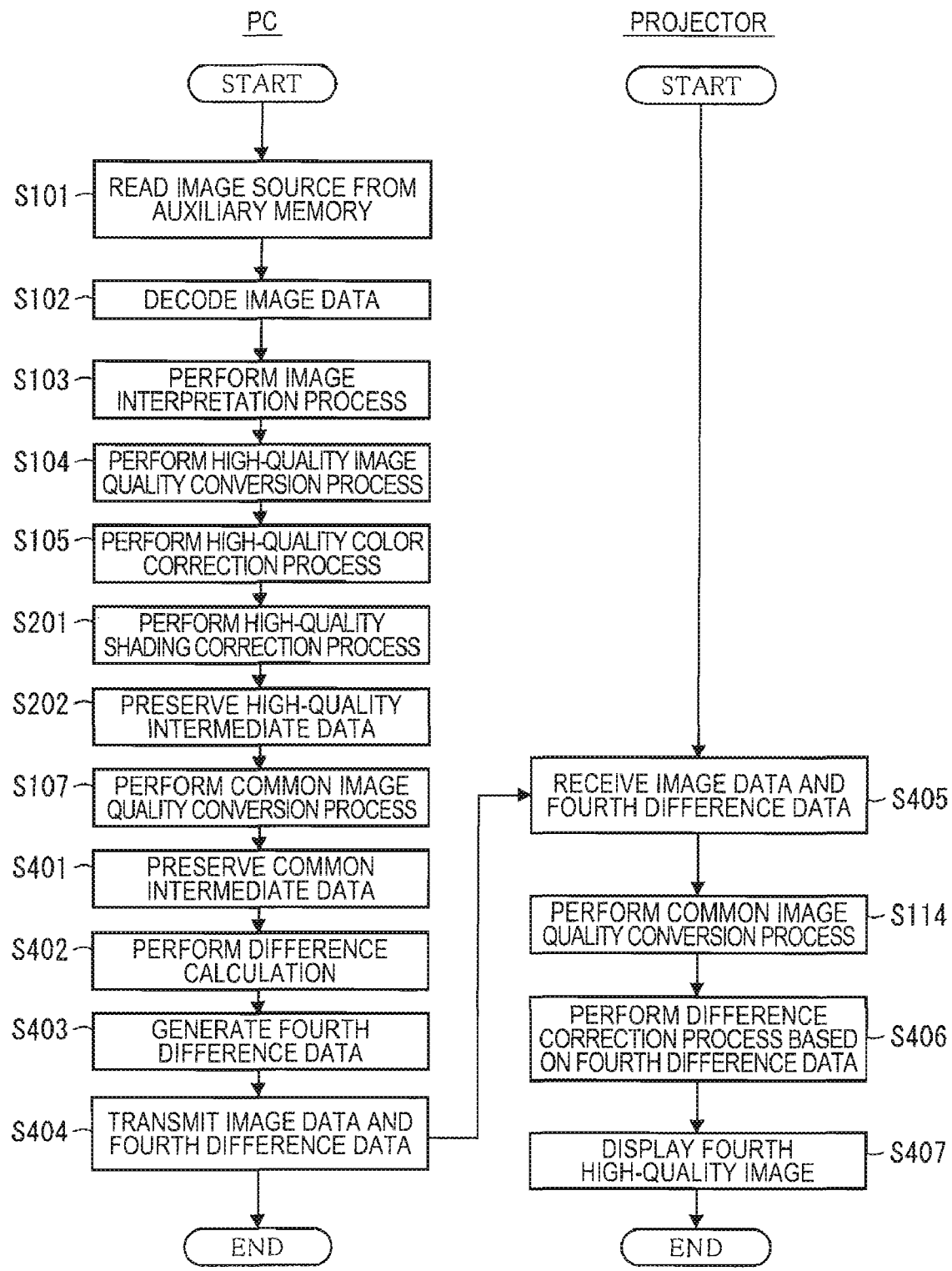
FIG. 12 is a flowchart showing a sign-guilty display process according to the fourth embodiment.

As an operation of the above-mentioned projection system 1D, a high-quality display process will now be described FIG. 12 is a flowchart showing the high-quality display process.

At first, the PC 2D, as shown in FIG. 12, preserves the image data on which a common image quality conversion process has been performed as common intermediate data (step S401) after the above-mentioned processes of the steps S101 to S105, S201, S202, and S107 are performed. Next, the PC 2D performs a difference calculation process (step S402), a generation process of the fourth difference data (step S403: difference data generation step) and a transmission process of the image data and the fourth difference data to the projector 3D (step S404: difference data transmission step).

When the projector 3D receives the image data and the fourth difference data (step S405), the projector 3D performs the process of the step S114 and a difference correction process based on the fourth difference data (step S406) to display the fourth high-quality image (step S407).

Advantage of Fourth Embodiment

In the above-described fourth embodiment, the following advantages can be acquired in addition to the same advantages as (1) to (5) in the first and second embodiments.

(7) The PC 2D generates fourth difference data for correcting image data on which a common image quality conversion process has been performed into a status that a high-quality image quality conversion process, a high-quality color correction process, and a high-quality shading correction process are performed. The projector 3D performs a difference correction process based on the fourth difference data on image data on which a common image quality conversion process has been performed to display a fourth high-quality image.

Accordingly, a fourth high-quality image of which color shading, brightness shading, and γ have been corrected can be displayed without performing the γ correction in the projector 3D in addition to the correction processes for the color shading and the brightness shading. Accordingly, since the load of the projector 3C for processes can be reduced more than in the projector 3C of the third embodiment of the invention, thereby saving of the power can be achieved further.

Fifth Embodiment

Hereinafter, a fifth embodiment of the invention will be described with reference to the accompanying drawings.

Configuration of Projection System

FIG. 1 is a diagram showing an appearance of a projection system 1E according to a fifth embodiment of the invention.

The projection system 1E includes a PC 2E (image processing apparatus), a projector 3E, and a data transmission unit 4A.

Configuration of PC

Figure 13:
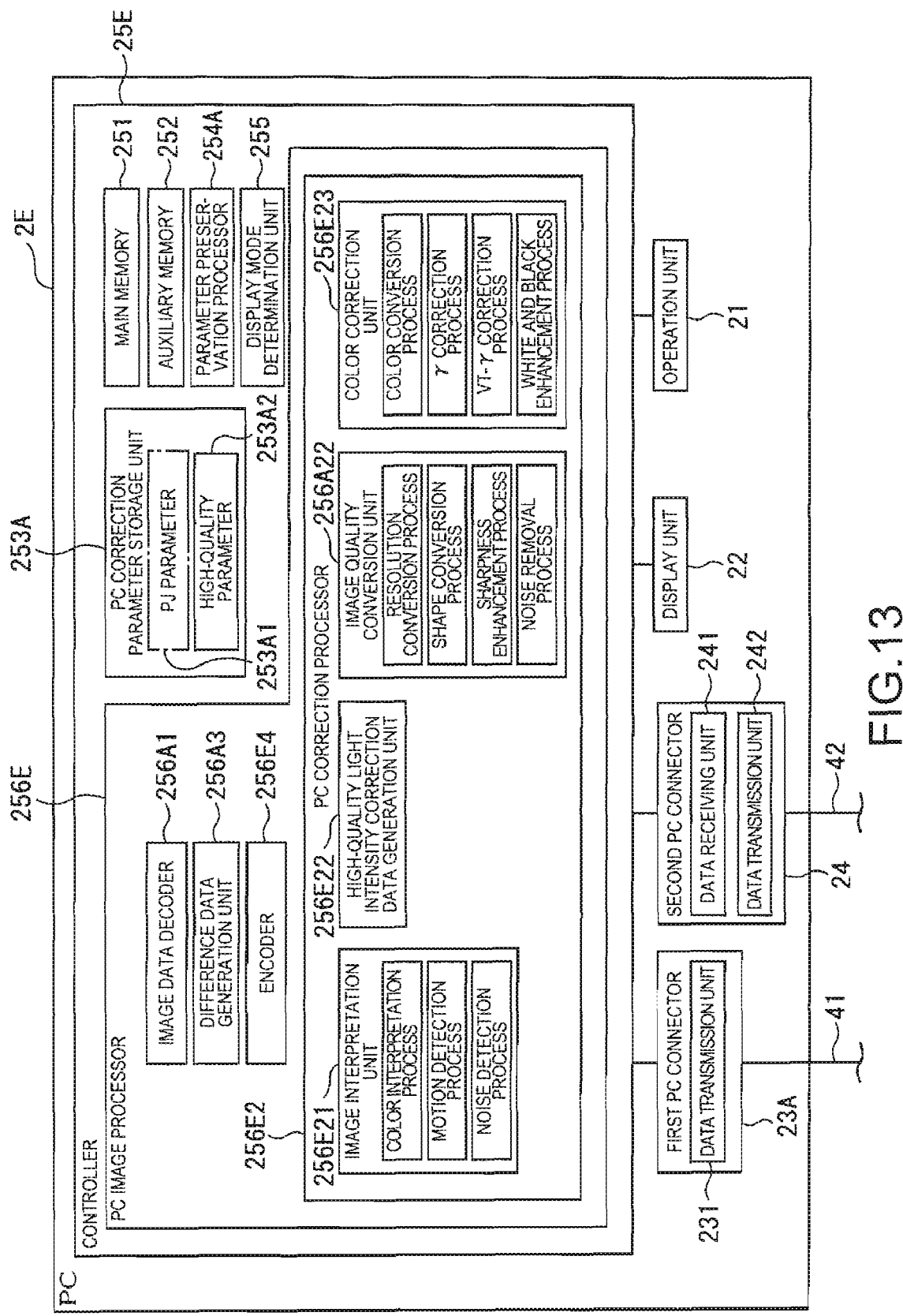
FIG. 13 is a schematic block diagram showing configuration of a PC according to a fifth embodiment.

FIG. 13 is a schematic block diagram showing a configuration of the PC 2E.

In the PC 2E, a PC Image processor 256E of a controller 25E is different from the first to fourth embodiments of the invention. In addition, in the PC image processor 256E, an image interpretation unit 256E21, a high-quality light intensity correction data generation unit 256E22 (light intensity generation unit), and a color correction unit 256E23 of a PC correction processor 256E2 (first and second processing apparatus correction unit) is different from the first to fourth embodiments of the invention. In addition, in the fifth embodiment and a sixth embodiment to be described later of the invention, a data transmission unit 242 of a second PC connector 24 also serves as a light intensity data transmission unit of the present invention.

The image interpretation unit 256E21 performs an image interpretation process and outputs the image quality conversion data and the color correction data to the image quality conversion unit 256E22 and the color correction unit 256E23, respectively. In addition, the image interpretation unit 256E21 outputs various data which can be used for setting light intensity for properly displaying a high-quality image in the projector 3E including data for brightness to a high-quality light intensity correction data generation unit 256E22 as light intensity setting data.

When the high-quality light intensity correction data generation unit 256E22 acquires the light intensity setting data from the image interpretation unit 256E21, the high-quality light intensity correction data generation unit 256E22 sets light intensity in illumination for properly displaying a high-quality image based on the light intensity setting data In the setting the light intensity in illumination, for example, the following techniques can be used.

A histogram of the RGB values for the whole image of a predetermined frame is acquired and any of the RGB data which is in the range within 1% from a maximal value is set as a reference value. Then, the RGB values for all the pixels are enhanced, so that the reference value becomes the maximal value (for example, 255). A technique of setting the light intensity may be used, so that the intensity of illumination or the brightness on the screen Sc does not change from a case where the maximal value of the enhanced pixel value is the maximal light intensity before the enhancement for maximal radiation and to a case where the enhanced pixel value is light-intensity controlled, that is, lowered for irradiation after the enhancement.

The high-quality light intensity correction data generation unit 256E22 outputs the high-quality light intensity correction data (light intensity data) for this light intensity to the color correction unit 256E23 and the encoder 256E4.

When the color correction unit 256E23 acquires image data on which a high-quality image quality conversion process has been performed from the image quality conversion unit 256A22 and high-quality light intensity correction data from the high-quality light intensity correction data generation unit 256E22, the color correction unit 256E23 performs a high-quality color correction process based on the high-quality light intensity correction data and preserves the processed image data as high-quality intermediate data. In addition, when the color correction unit 256E23 acquires image data on which a common image quality conversion process has been performed from the image quality conversion unit 256A22, the color correction unit 256E23 performs a common color correction process based on the high-quality light intensity correction data and preserves the processed image data as common intermediate data. Here, in the fifth embodiment and a sixth embodiment to be described later, an image interpretation process, a high-quality image quality conversion process, and a high-quality color correction process correspond to the original correction process for displaying, and a common image quality conversion process and a common color correction process correspond to a projector correction process of the invention.

The difference data generation unit 256A3 calculates a difference between the high-quality intermediate data and the common intermediate data, generates a fifth difference data, and outputs the fifth difference data to the encoder 256E4. The fifth difference data becomes data for correcting the image data on which a common color correction process based on a common image quality conversion process and a high-quality light intensity correction data is performed into a status that a high-quality image quality conversion process and a high-quality color correction process based on a high-quality light intensity correction data.

The encoder 256E4 encodes the fifth difference data generated by the difference data generation unit 256A3 and the high-quality light intensity correction data generated by the high-quality light intensity correction data generation unit 256E22 and outputs the encoded data to the projector 3E through the correction data cable 42.

Configuration of Projector

Figure 14:
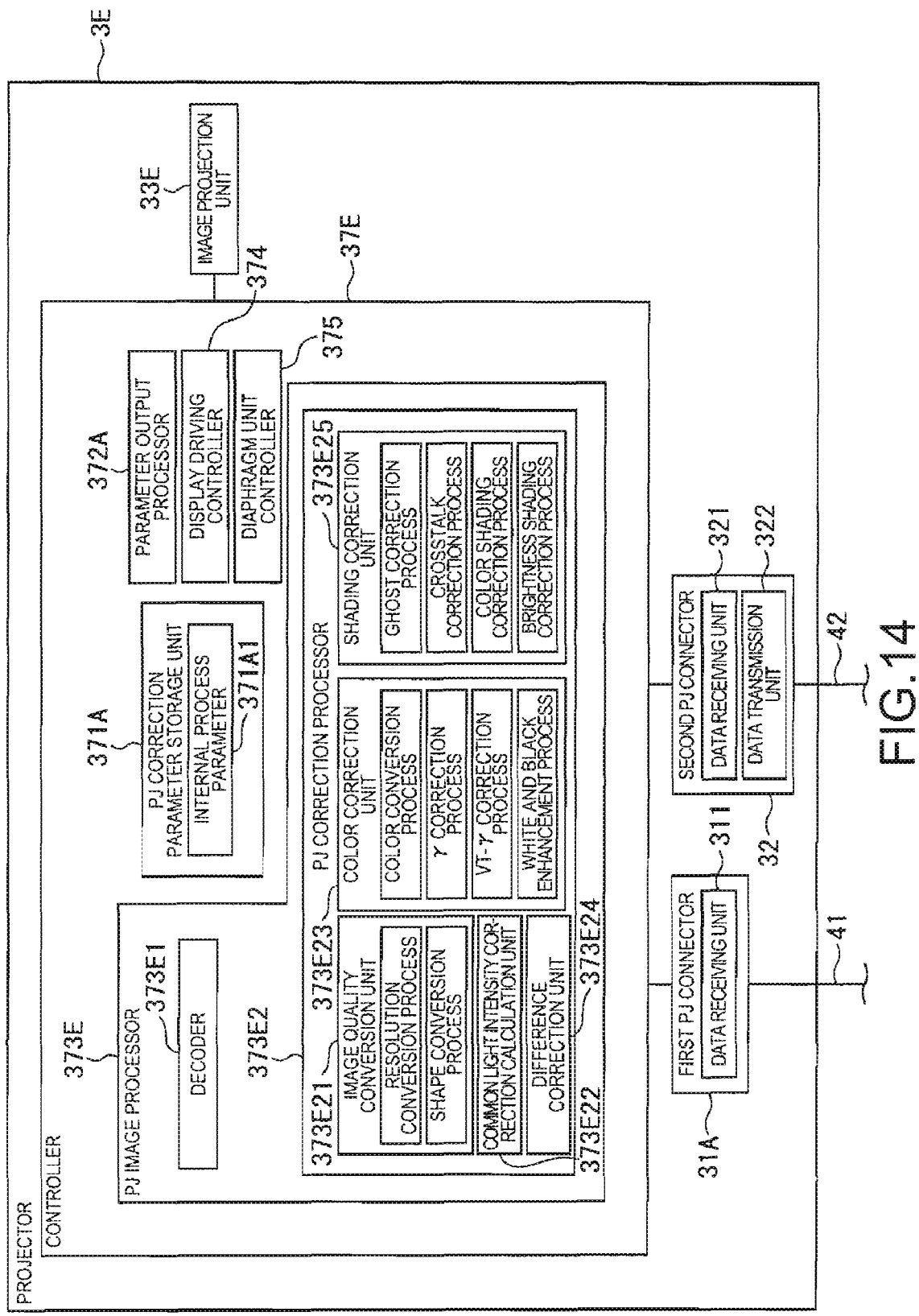
FIG. 14 is a schematic block diagram showing a configuration of a projector according to the fifth embodiment.
Figure 15:
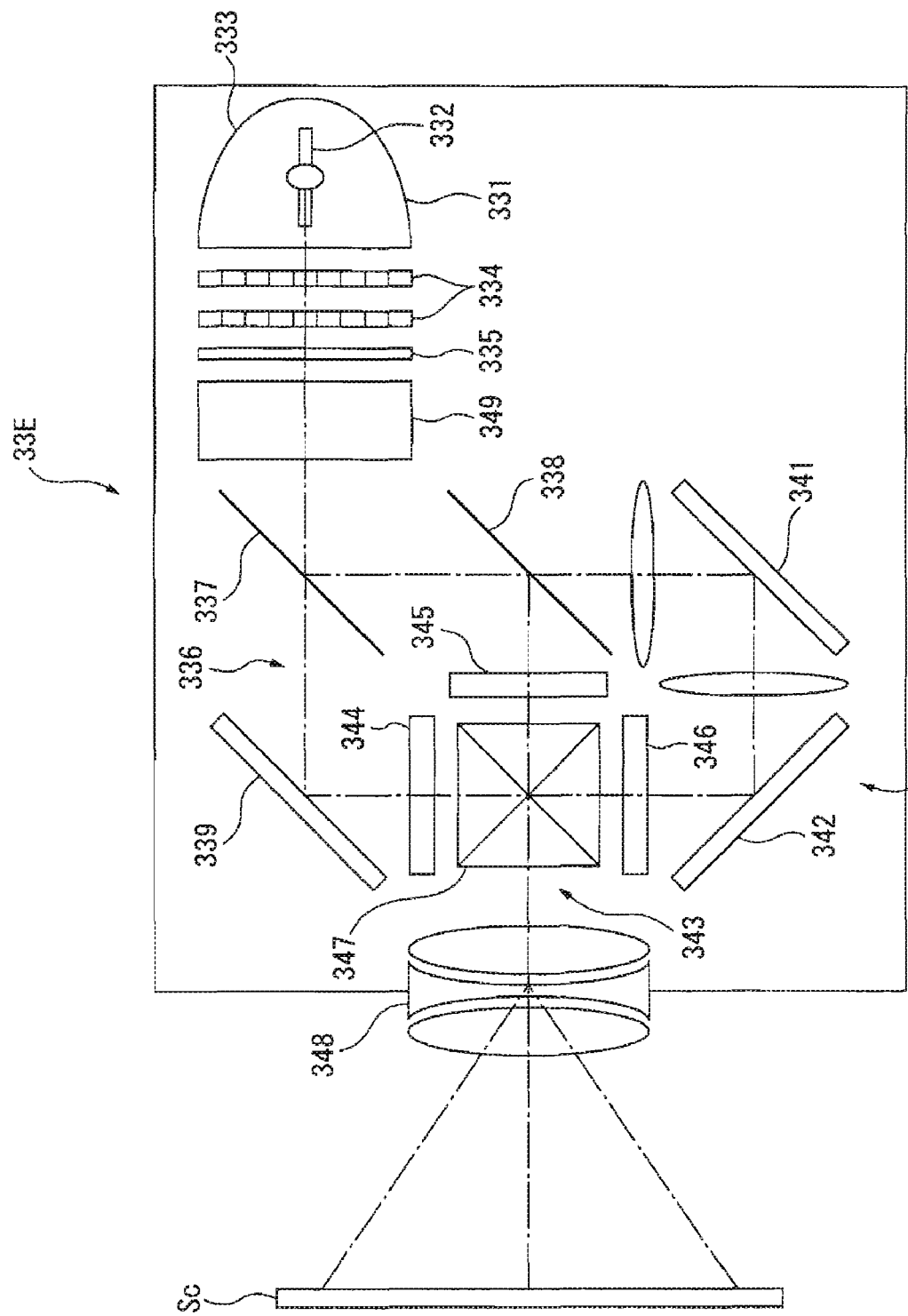
FIG. 15 is a schematic diagram showing a configuration of an image projector of a projector according to the fifth embodiment.

FIG. 14 is a schematic block diagram showing a configuration of the projector 3E. FIG. 15 is a schematic diagram showing a configuration of an image projector 33E of a projector 3E.

In the projector 3E, an image projector 33E and a controller 37E are different from the first to fourth embodiments. In addition, in the controller 37F, a PJ image processor 373E, and a diaphragm unit controller 375 (light intensity controller) are different from the first to fourth embodiments of the invention. In addition, in the PJ image processor 373E, a decoder 373E1 and a PJ correction processor 373E2 are different from the first to fourth embodiments of the invention. In the PJ correct on processor 373E2, an image quality conversion unit 373E1 (projector correction unit), a common light intensity correction calculation unit 373E22, a color correction unit 373E23 (projector correction unit), a difference correction unit 373E24, and a shading correction unit 373E25 are different from the first to fourth embodiments of the invention.

The image projector 33E, as shown in FIG. 15, on a light-irradiation side of a polarization conversion element 335, a diaphragm 349 is arranged for controlling the intensity of light from the polarization conversion element 335 in the image projector 33A. The diaphragm 349 is driven properly by the control of a controller 37E.

The decoder 373E1 acquires the fifth difference data and the high-quality light-intensity correction data which have been transmitted from the PC 2E through the correction data cable 42 and decodes the data. The decoder 373E1 transmits the fifth difference data to the PJ correction processor 373E2 and the high-quality light-intensity correction data to the PJ correction processor 373E2 and the diaphragm unit controller 375, respectively.

When the image quality conversion unit 373E21 acquires the image data, the image quality conversion unit 373E21 performs a common image quality conversion process. When the image quality conversion unit 373E21 is connected to the PC 2E through the correction data cable 42, the image quality conversion unit 373E21 outputs the image data to the color correction unit 373E23. On the other hand, when the image quality conversion unit 373E21 is not connected to the PC 2E through the correction data cable 42, the image quality conversion unit 373E21 outputs the image data to the color correction unit 373E23 and the common light intensity correction calculation unit 373E22.

When the common light intensity correction calculation unit 373E22 acquires the image data from the image quality conversion unit 373E21, the common light intensity correction calculation unit 373E22 calculates the light intensity for properly displaying the common image based on the image data. Thereafter, the common light intensity correction calculation unit 373E22 outputs the common light intensity correction data for the light intensity to the color correction unit 373E23 and the diaphragm unit controller 375.

When the color correction unit 373E23 acquires the image data on which a common image quality conversion process has been performed from the image quality conversion unit 373E21 and the high-quality light intensity correction data from the decoder 373E1, the color correction unit 373E23 performs a common color correction process on the image data based on the high-quality light intensity correction data. Next, the color correction unit 373E23 outputs the image data to the difference correction unit 373E24. When the color correction unit 373E23 acquires the image data on which a common image quality conversion process has been performed from the image quality conversion unit 373E21 and common light intensity correction data from the common light intensity correction calculation unit 373E22, the color correction unit 373E23 performs a common color correction process on the image data based on the common light intensity correction data. Next, the color correction unit 373E23 outputs the processed image data to the shading correction unit 373E25.

When the difference correction unit 373E24 acquires the image data on which a common color correction process has been performed based on the high-quality light intensity correction data from the color correction unit 373E23 and a fifth difference data from the decoder 373E1, the difference correction unit 373E24 performs a difference correction process based on the fifth difference data and outputs the processed image data to the shading correction unit 373E25. By performing the difference correction process based on the fifth difference data, the color tone of the image data for each pixel is corrected from a status that a common image quality conversion process and a common color correction process based on the high-quality light intensity correction data are performed to a status that a high-quality image quality conversion process and a high-quality color correction process based on the high-quality light intensity correction data are performed.

When the shading correction unit 373E25 acquires the image data on which a difference correction process has been performed from the difference correction unit 373E24, the shading correction unit 373E25 performs a common shading correction process and outputs the processed image data to the display driving controller 374 as the fifth high-quality image data. When the shading correction unit 373E25 acquires the image data on which a common color correction process has been performed from the color correction unit 373E23, the shading correction unit 373E25 performs a common shading correction process and outputs the processed data to the display driving controller 374 as common image data.

When the display driving controller 374 acquires the fifth high-quality image data from the PJ image processor 373E, display driving controller 374 outputs a control signal for displaying the fifth high-quality image based on the fifth high-quality image data. The fifth high-quality image becomes an image on which a high-quality correction process the same as the first high-quality image has been performed.

When the diaphragm unit controller 375 acquires high-quality light intensity correction data or common light intensity correction data from the PJ image processor 373E, diaphragm unit controller 375 outputs a control signal for driving the diaphragm 349 Into a status that the light intensity is corrected based on the data.

Operation of Projection System

Figure 16:
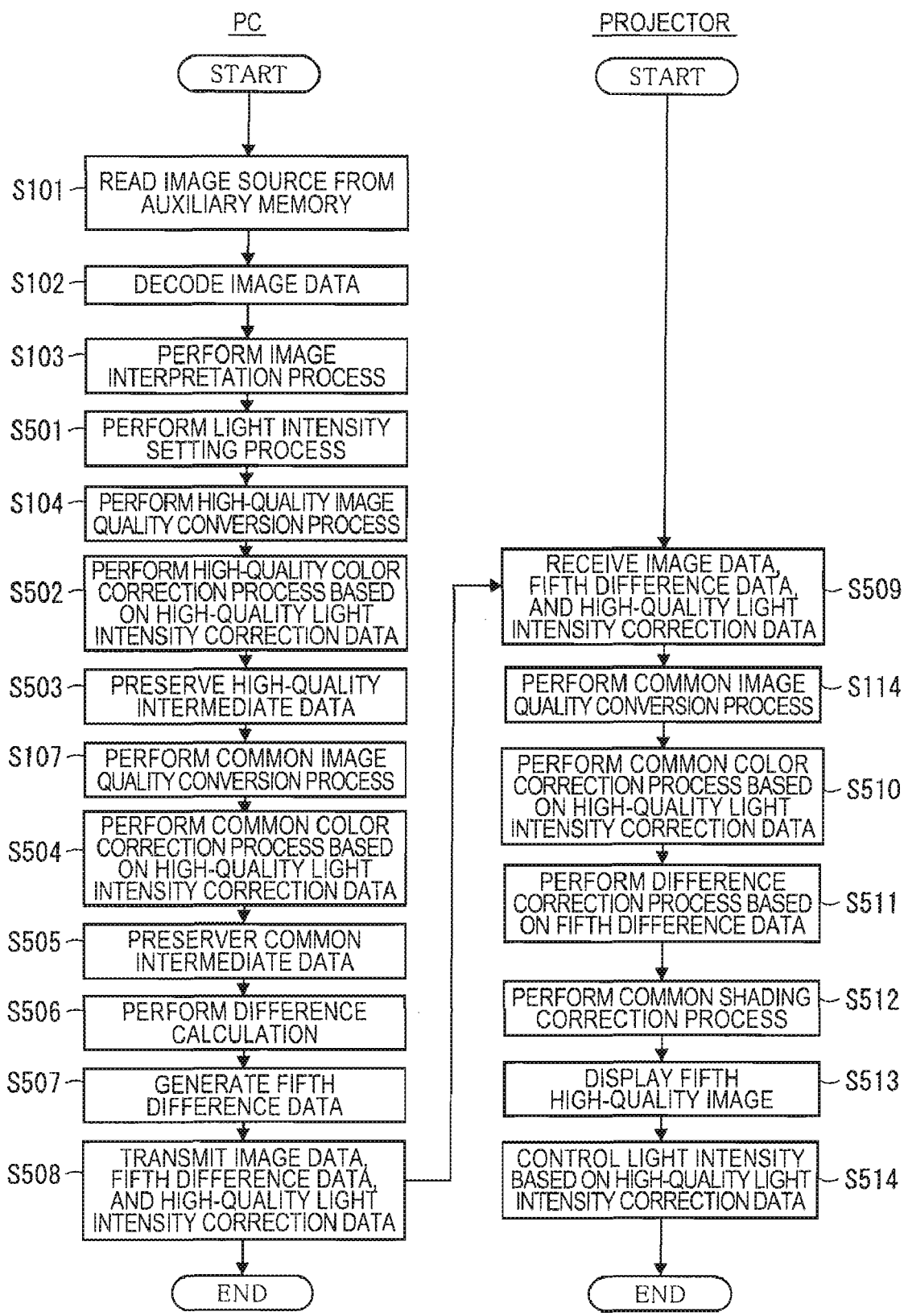
FIG. 16 is a flowchart showing a high-quality display process according to the fifth embodiment.

As an operation of the above-mentioned projection system 1E, a high-quality display process will now be described. FIG. 16 is a flowchart showing the high-quality display process.

At first, the PC 2E, as shown in FIG. 16, performs a light intensity setting process (step S501) after the above-described processes of the steps S101 to S103 are performed. Thereafter, the PC As performs a process of the step S104, performs a high-quality color correction process (step S502: second processing apparatus correction step) based on the high-quality light intensity correction data, and preserves the processed image data as high-quality intermediate data (step S503). In addition, after the process of the step S107 is performed, the PC 2E performs a common color correction process (step S504: first processing apparatus correction step) based on the high-quality light intensity correction data and preserves the processed image data as common intermediate data (step S505) Thereafter, the PC 2E performs a difference calculation process (step S506) a generation process of the fifth difference data (step S507: difference data generation step) and a transmission process of the image data, the fifth difference data, and the high-quality light intensity correction data to the projector 3E (step S508: difference data transmission step).

When the projector 3E receives the image data, the fifth difference data, and the high-quality light intensity correction data (step S509), the projector 3E performs the process of the step S114. Thereafter, the projector 3E performs a common color correction process based on the high-quality light intensity correction data (step S510), a difference correction process based on the fifth difference data (step S511), and a common shading correction process (step S512) to display the fifth high-quality image (step S513) Thereafter, the projector 3E controls the diaphragm 349 based on the high-quality light intensity correction data to adjust the light intensity into a status that the fifth high-quality image is properly displayed (step S514).

Advantage of Fifth Embodiment

In the above-described fifth embodiment, the following advantages can be acquired in addition to the same advantages as (1) to (4) in the first embodiment of the invention.

(8) The PC 2E outputs high-quality light intensity correction data regarding the light intensity of illumination for properly displaying a high-quality image to the projector 3E. The projector 3E adjusts the light intensity based on the high-quality light intensity correction data.

Accordingly, the projector 3E can display a dark image with enhancing its resolution by adjusting the light intensity. In addition, by lowering the light intensity, a dark part can be displayed without any floatation. As a result, the projector 3E can display an image with more excellent quality.

Sixth Embodiment

Hereinafter, a sixth embodiment of the invention will be described with reference to the accompanying drawings.

Configuration of Projection System

FIG. 1 is a diagram showing an appearance of a projection system 1F according to a sixth embodiment of the invention.

The projection system 1F includes a PC 2E (image processing apparatus), a projector 3F, and a data transmission unit 4A. In other words, the projection system 1F of the sixth embodiment has the same configuration as the fifth embodiment except for the projector 3F.

Configuration of Projector

Figure 17:
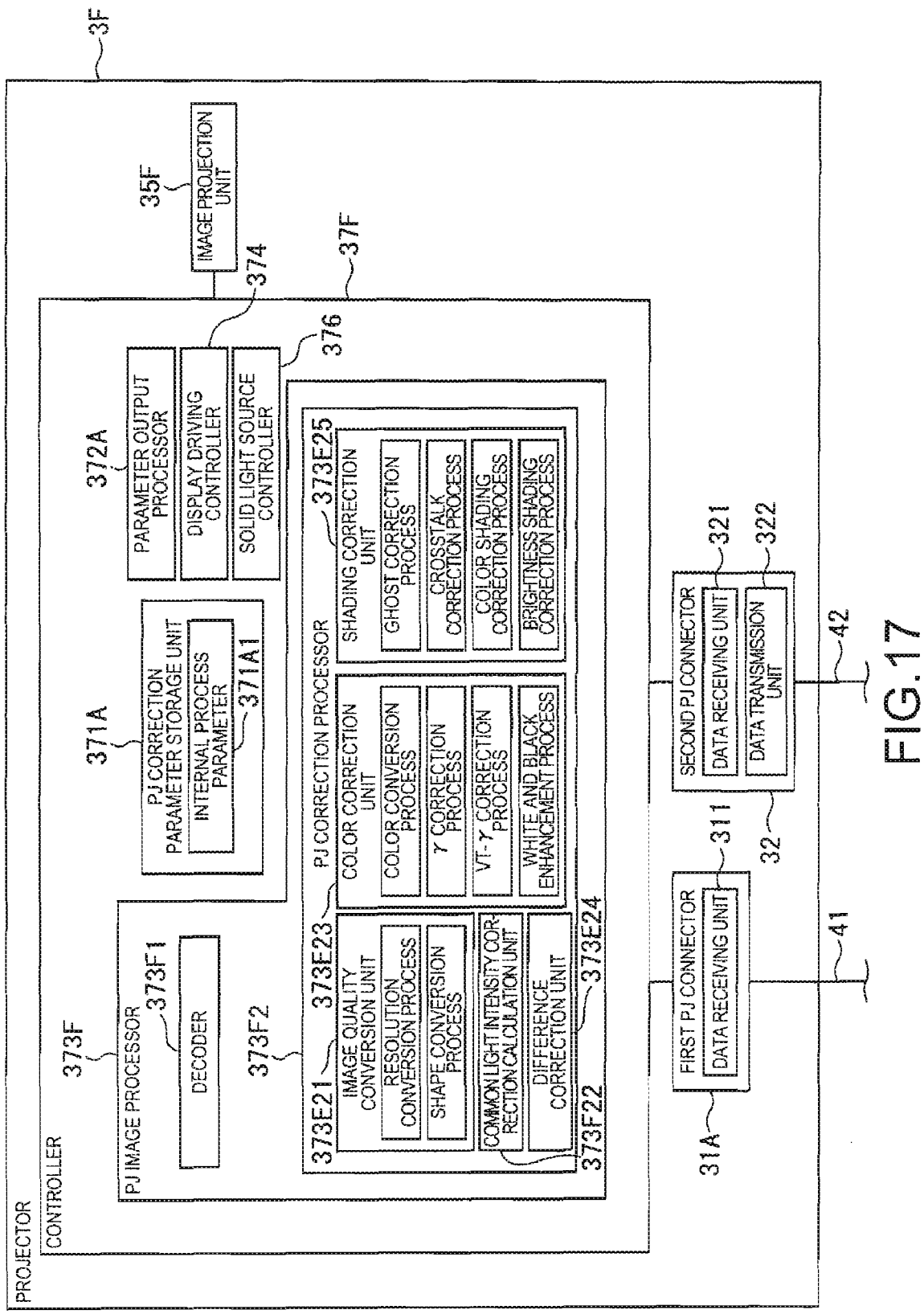
FIG. 17 is a schematic block diagram showing a configuration of a projector according to the sixth embodiment.
Figure 18:
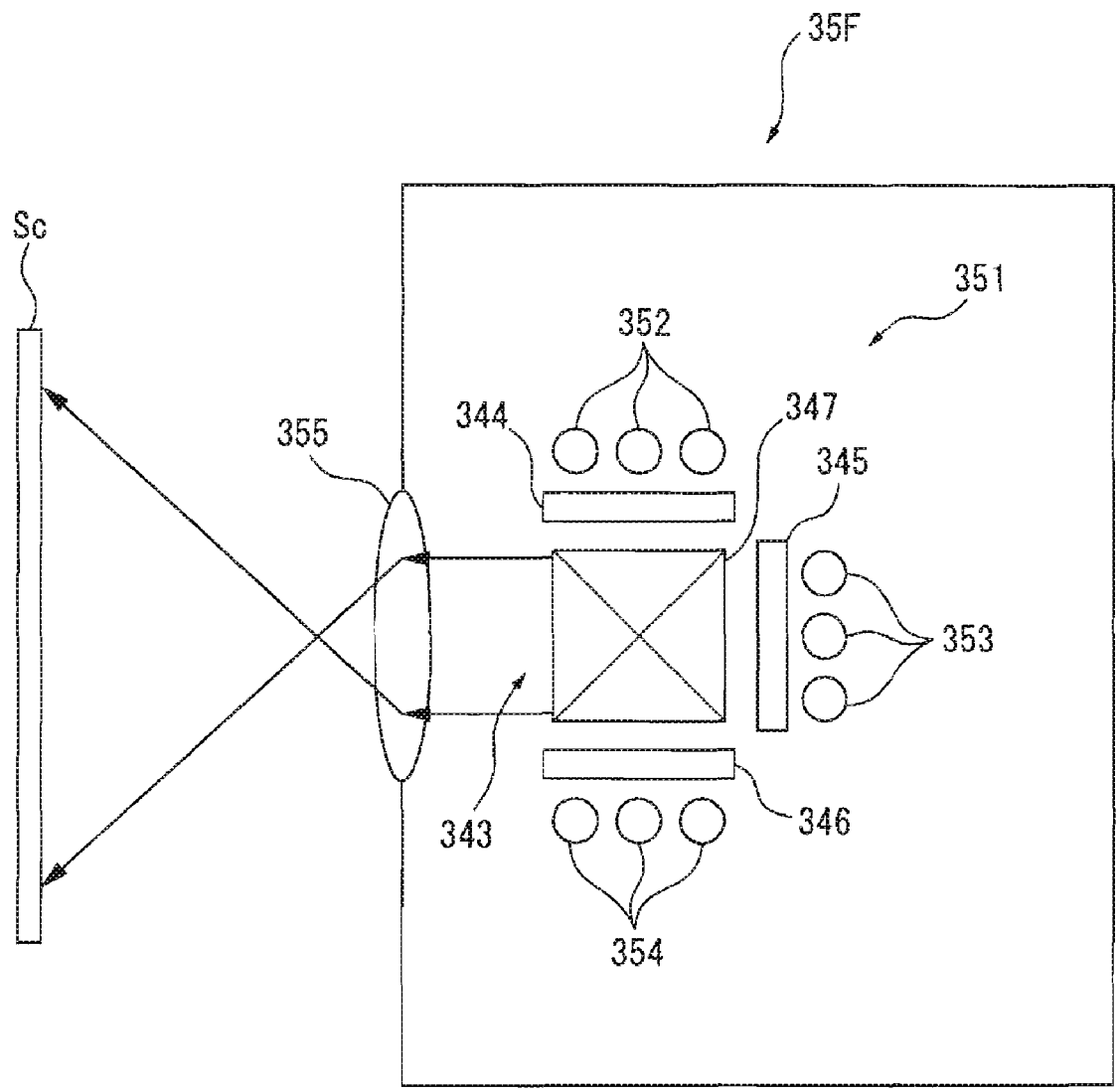
FIG. 18 is a schematic diagram showing a configuration of an image projector of a projector according to the sixth embodiment.

FIG. 17 is a schematic block diagram showing a configuration of the projector 3F. FIG. 18 is a schematic diagram showing a configuration of an image projector 35F of the projector 35F.

In the projector 3F, the image projector 35F and a controller 37F are different from the first to fifth embodiments of the invention. In the controller 37F, a PJ image processor 373F and a solid light source controller 376 (light intensity adjustment unit) is different from the first to fifth embodiments. In addition, in the PJ image processor 373F, a decoder 373F1 and a common light intensity correction calculation unit 373F22 of a PJ correction processor 373F2 are different from the first to fifth embodiments.

The image projector 35F, as shown in FIG. 18, includes a light source unit 351 (light source device) which includes three light sources including a red solid light source 352 (predetermined color light source, red light source), a green solid light source 353 (predetermined color light source, green light source), and a blue solid light source 354 (predetermined color light source, blue light source). Each color light from each one of the solid light sources 352 to 354 is controlled to have predetermined light intensity by the controller 37F and is incident on one of a red liquid crystal light valve 344, a green liquid crystal light valve 345, and a blue liquid crystal light valve 346 of an electric optical device 343. Each color light is modulated in each liquid crystal light valve 344, 345, or 346 by the control of the controller 37F and synthesized in a prism 347. The synthesized image is irradiated from a projection optical system 355 (projection optical device) and projected on a screen SC on an enlarged scale.

The decoder 373F1 decodes the fifth difference data and the high-quality light intensity correction data and outputs the decoded fifth difference data to the PJ correction processor 373F2 and the decoded high-quality light intensity correction data to the solid light source controller 376.

When the common light intensity correction calculation unit 373F22 acquires the image data from the image quality conversion unit 373E21, the common light intensity correction calculation unit 373E22 outputs the common light intensity correction data to the color correction unit 373E23 and the solid light source controller 376.

When the solid light source controller 376 acquires the high-quality light intensity correction data or common light intensity correction data from the PJ image processor 373F, the solid light source controller 376 outputs control signals for independently driving the solid light sources 352 to 354 to correct the light intensity based on the light correction data, respectively.

The solid light source controller 376 may control the solid light sources 352 to 354 using independent parameters or a same parameter. For example, in the high-quality light intensity correction data, a different parameter for each solid light source 352, 353, or 354 may be used, and in the common light intensity correction data, a same parameter may be used for each solid light source 352, 353, or 354.

Operation of Projection System

As an operation of the above-mentioned projection system 1F, a high-quality display process will now be described. The high-quality display process of the projection system 1F is the same as that of the projection system 1E of the fifth embodiment shown in FIG. 16 except for the process of the step S513 in the high-quality display process.

In other words, after the projector 3F of the projection system 1F performs the process of the step S512, the projector 3F performs the process of adjusting the light intensity so that the fifth high-quality image is properly displayed by controlling the solid light sources 352 to 354 independently based on the common light intensity correction data and the high-quality light intensity correction data using the solid light source controller 376 as the process of the step S513.

Advantage of Sixth Embodiment

In the above-described sixth embodiment, the following advantages can be acquired in addition to the same advantages as (1) to (4) and (8) in the first and fifth embodiments of the invention.

(9) The projector 3F independently adjusts the intensity of light which is irradiated from the solid light sources 352 to 354.

Accordingly, the projector 3F can adjust the color delicately and display an excellent image.

(10) As predetermined color light sources to be used in the invention, a red solid light source 352, a green solid light source 353, and a blue solid light source 354 are used.

Accordingly, the color can be easily controlled only by controlling the irradiated three primary colors of light.

(11) In the projector 3F, a color separation optical system 336 which Is used In the fifth embodiment is not provided.

Accordingly, the projection system 1F can be configured economically.

Seventh Embodiment

Hereinafter, a seventh embodiment of the invention will be described with reference to the accompanying drawings.

Configuration of Projection System

Figure 19:
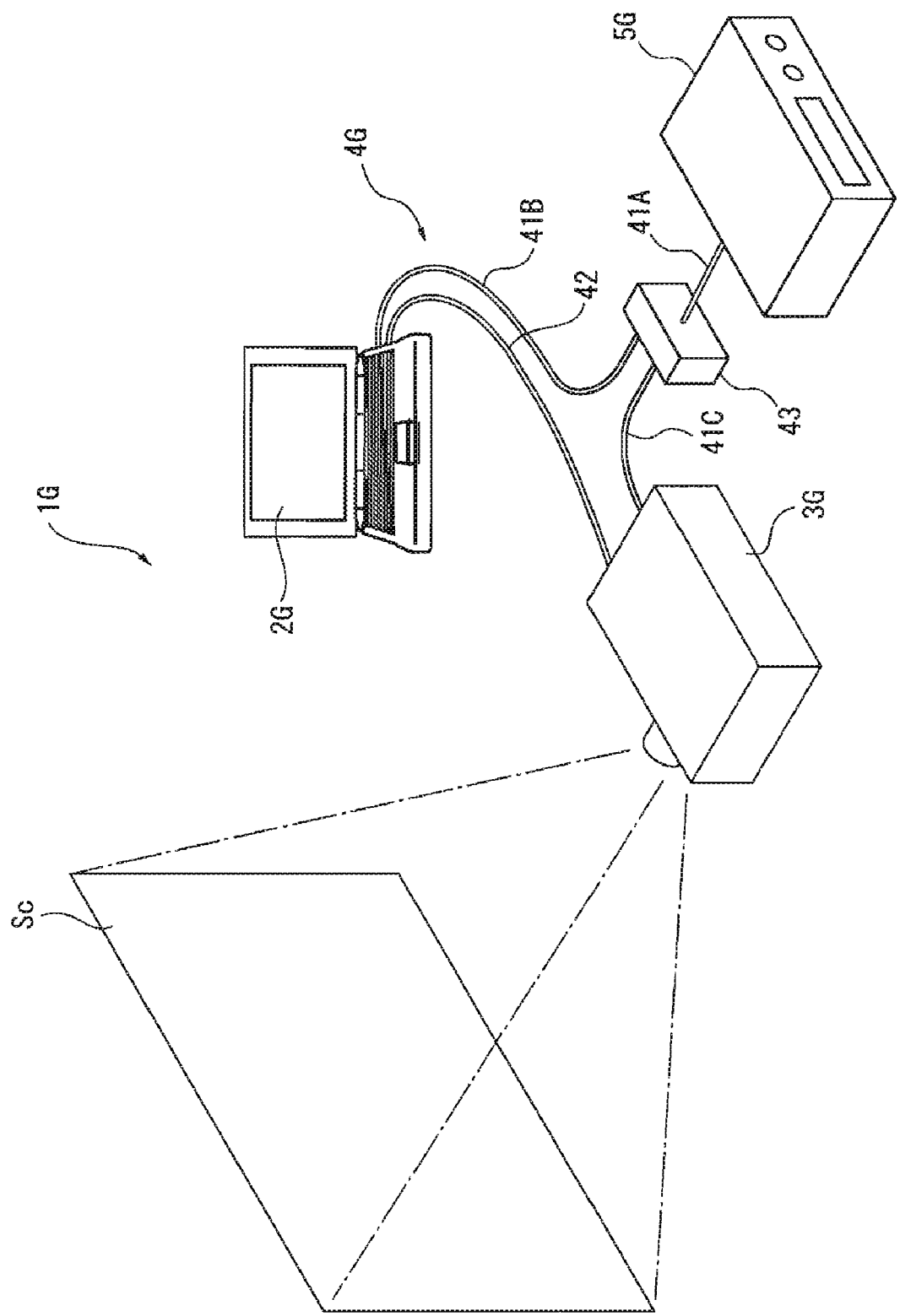
FIG. 19 is a diagram showing an appearance of a projection system according to the seventh embodiment of the invention.

FIG. 19 is a diagram showing an appearance of a projection system 1G according to a seventh embodiment of the invention.

The projection system 1G includes a PC 2G (image processing apparatus), a projector 3G, a data transmission unit 4G, and an image reproduction apparatus 5G.

Configuration of Data Transmission Unit

The data transmission unit 4G connects the PC 2G, the projector 3G, and the image reproduction apparatus 5G, so that various data can be transmitted and received therebetween. The data transmission unit 4G includes a first image data cable 41A (first and second image data transmission unit), a second image data cable 41B (first image data transmission unit), a third image data cable 41O (second image data transmission unit), a correction data cable 42, and a distributor 43 (first and second image data transmission unit).

The first to third image data cables 41A to 41C have the same configuration as the image data cable 41 of the first to sixth embodiments of the invention.

The first image data cable 41A connects the image reproduction apparatus 5G and the distributor 43. The second image data cable 41B connects the distributor 43 and the PC 2G. The third image data cable 41C connects the distributor 43 and the projector 3G.

The distributor 43 transmits an image source which is transmitted from the image reproduction apparatus 5G through the first image data cable 41A to the PC 2G and the projector 3G through the second and third image data cables 41B and 41C, respectively.

Configuration of Image Reproduction Apparatus

The image reproduction apparatus 5G, although not shown in detail, reproduces an image source recorded, for example, in a DVD and displays an image in a display device (not shown). In addition, the image reproduction apparatus 5G transmits the image source to the PC 2D and the projector 3G through the data transmission unit 4G.

Configuration of PC

Figure 20:
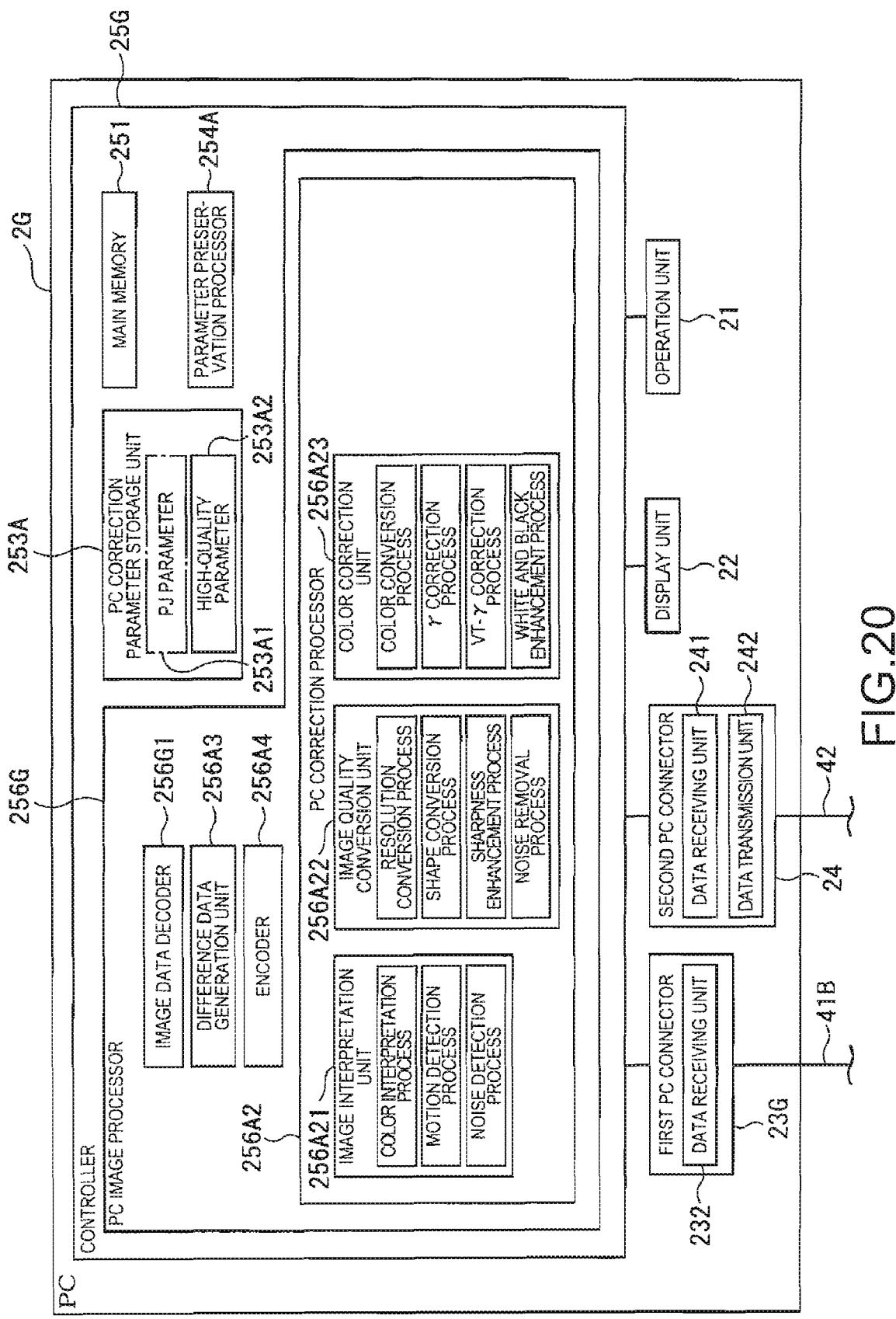
FIG. 20 is a schematic block diagram showing a configuration of a PC according to the seventh embodiment.

FIG. 20 is a schematic block diagram showing a configuration of the PC 2G.

In the PC 2G, a first PC connector 23G and a controller 25G are different from the first to sixth embodiments. In the controller 25G, an image data decoder 256G1 of a PC image processor 256G is different from the first to sixth embodiments.

To the first PC connector 23G, the second image data cable 41B is connected. The first PC connector 23G outputs an image source which is transmitted from the image reproduction apparatus 5G through the second image data cable 41B by using a data receiving unit 232 which is connected to the controller 25G to the controller 25G.

The image data decoder 256G1, decodes an image source transmitted from the image reproduction apparatus 5G and outputs image data to the PC correction processor 256A2.

Configuration of Projector

Figure 21:
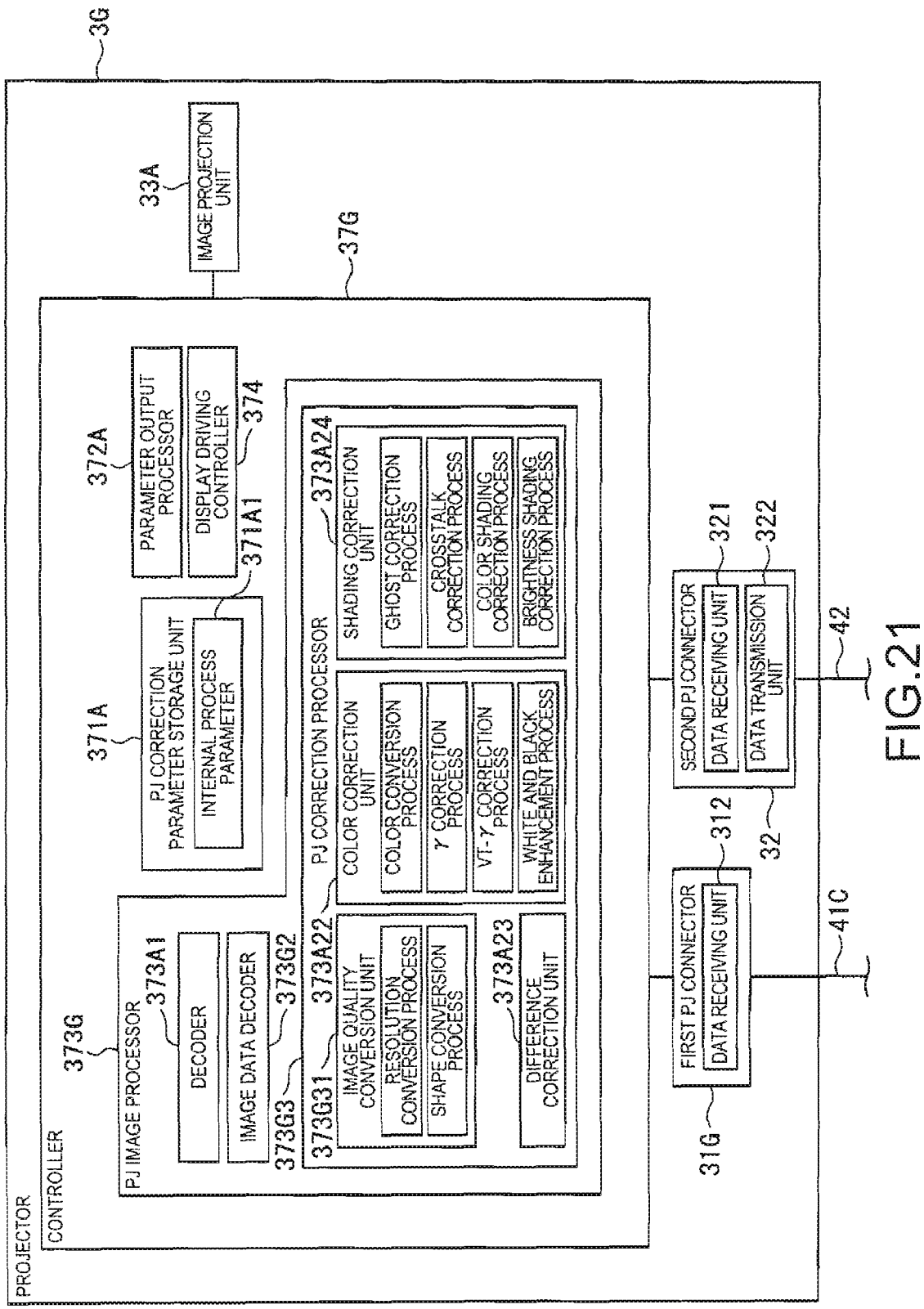
FIG. 21 is a schematic block diagram showing a configuration of a projector according to the seventh embodiment.

FIG. 21 is a schematic block diagram showing a configuration of the projector 3G.

In the projector 3G, a first PJ connector 31G and the controller 37G are different from the first to sixth embodiments. In the controller 37G, an image data decoder 373G2 of PJ image processor 373G and a PJ correction processor 373G3 are different from the first to sixth embodiments. In the PJ correction processor 373G3, an image conversion unit 373G31 (projector correction unit,) are different from the first to sixth embodiments.

To the first PJ connector 31G, the third image data cable 41C is connected. The first PJ connector 31G outputs an image source which is transmitted from the image reproduction apparatus 5G through the third image data cable 41C by a data receiving unit 312 which is connected to the controller 37G to the controller 37G.

The image data decoder 373G2 decodes the image source transmitted from the image reproduction apparatus 5G and outputs the image data to the PJ correction processor 373G3.

When the image quality conversion unit 373G31 acquires the image data from the image data decoder 373G2, the image quality conversion unit 373G31 performs a common image quality conversion process and outputs the processed image data to the color correction unit 373A22.

Operation of Projection System

Figure 22:
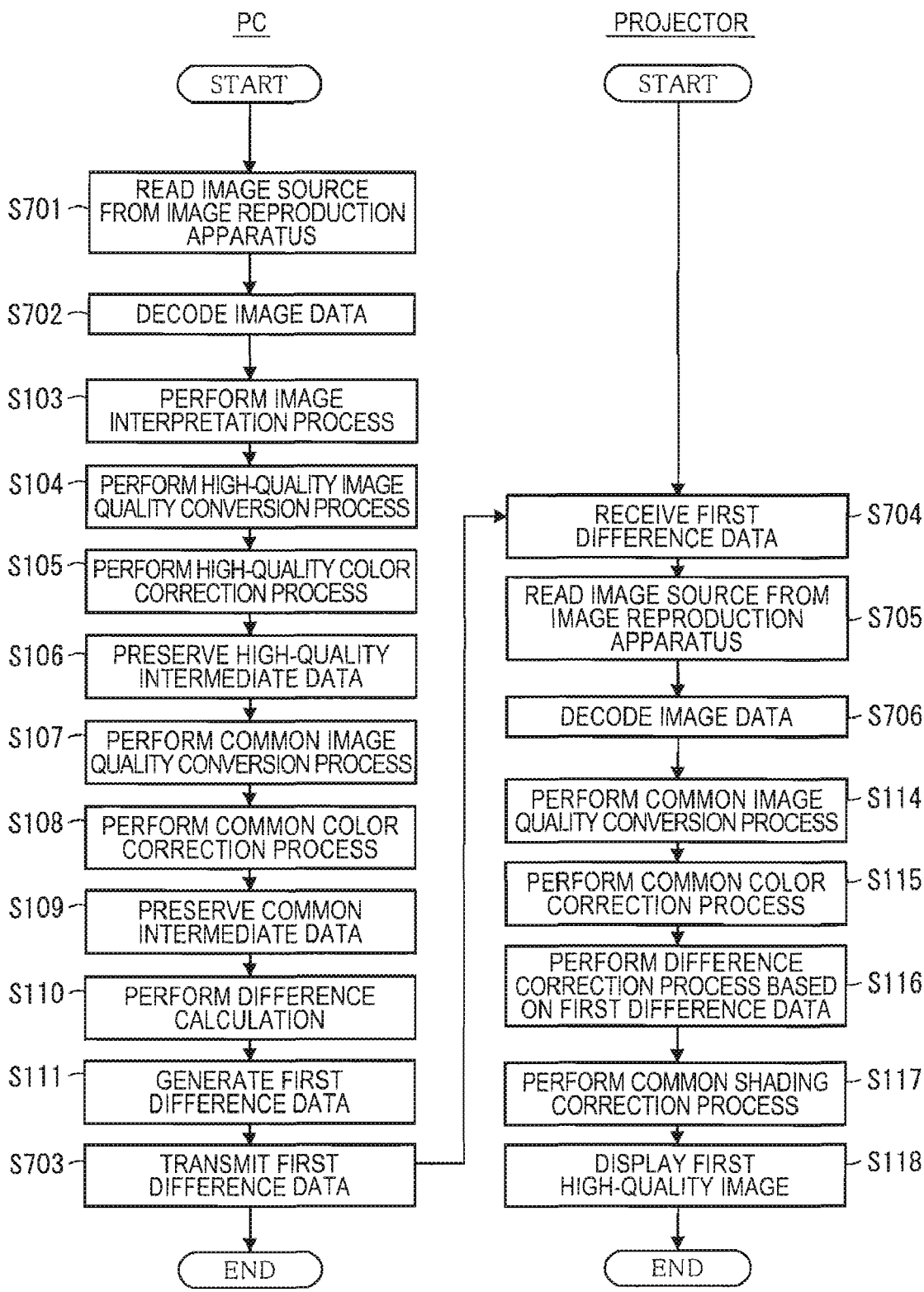
FIG. 22 is a flowchart showing a high-quality display process according to the seventh embodiment.

As an operation of the above-mentioned projection system 1G, a high-quality display process will now be described. FIG. 22 is a flowchart showing the high-quality display process.

At first, the PC 2G, as shown in FIG. 22, acquires an image source from the image reproduction apparatus 5G (step S701) and decodes the image data (step S702). Thereafter, the PC 2G performs the above-described processes of steps S103 to S111 and transmits only the first difference data to the projector 3G (step 703).

When the projector 3G receives the first difference data from the PC 2G (step S704), the projector 3G acquires the same image source as the image source which is transmitted from the image reproduction apparatus 5G to the PC 2G (step S705) and decodes the image data (step S706). Then, the projector 3G performs the above-described processes of the steps S114 to S118 to display the first high-quality image.

Advantage of Seventh Embodiment

In the above-described seventh embodiment of the invention, the following advantages can be acquired in addition to the same advantages as (1) to (4), in the first embodiment of the invention.

(12) In the projection system 1G, an image reproduction apparatus 5G is arranged. The PC 2G and the projector 3G perform various processes on the image data output from the image reproduction apparatus 5G.

Accordingly, the projection system 1G can display an excellent image based on the image data which can be reproduced by the image reproduction apparatus 5G while the decrease in the speed of the data transmission and receiving is suppressed. In addition, since it is not necessary to output image data from the PC 2G, the processing load of the PC 2G can be reduced.

Eighth Embodiment

Hereinafter, an eighth embodiment of the invention will be described with reference to the accompanying drawings.

Configuration of Projection System

Figure 23:
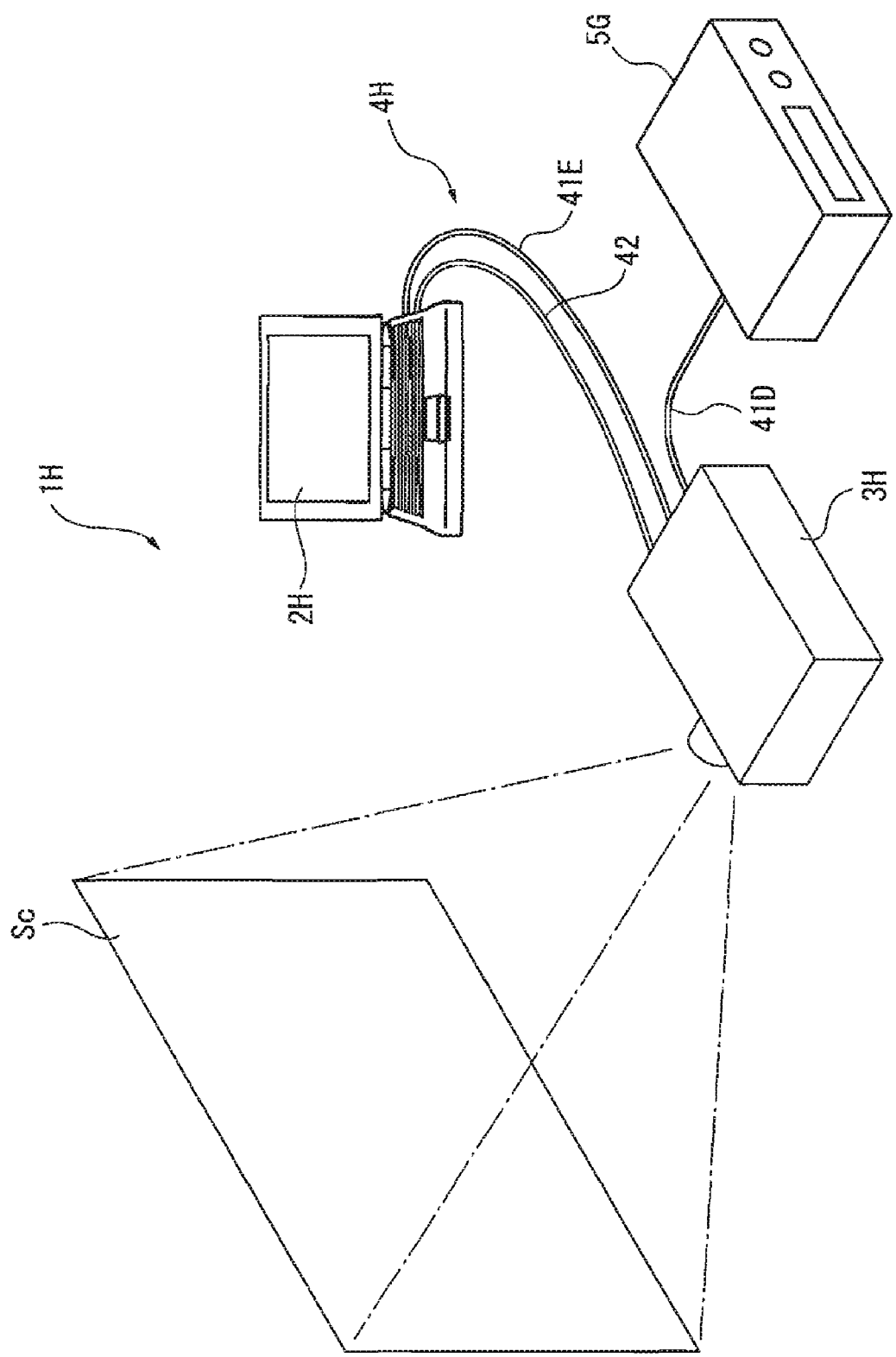
FIG. 23 is a diagram showing an appearance of a projection system according to the eighth embodiment of the invention.

FIG. 23 is a diagram showing an appearance of a projection system 1H according to an eighth embodiment of the invention.

The projection system 1H includes a PC 2H (image processing apparatus), a projector 3H, a data transmission unit 4H, and an image reproduction apparatus 5G.

Configuration of Data Transmission Unit

The data transmission unit 4H connects the PC 2H, the projector 3H, and the image reproduction apparatus 5G, so that various data can be transmitted and received therebetween. The data transmission unit 4H includes a first image data cable 41D (first image data transmission unit), a second image data cable 41E (second data transmission unit), and a correction data cable 42.

The first and second image data cables 41D and 41E have the same configuration as the image data cable 41 of the first to sixth embodiments of the invention. The first image data cable 41D connects the image reproduction apparatus 5G and the projector 3H. The second image data cable 41E connects the PC 2H and the projector 3H.

Configuration of Image Reproduction Apparatus

The image reproduction apparatus 5G transmits the image source only to the projector 3H through the data transmission unit 4H.

Configuration of PC

Figure 24:
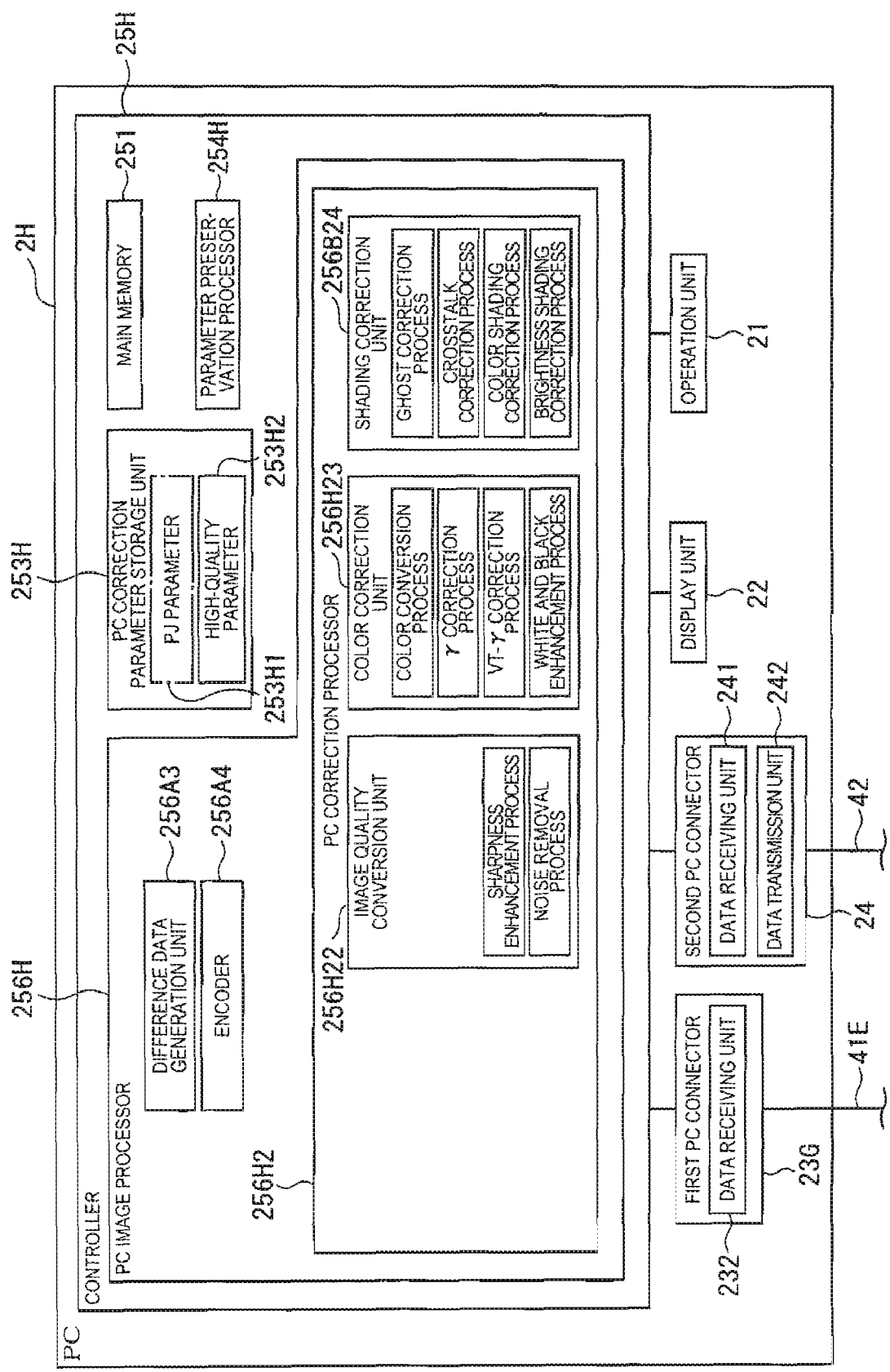
FIG. 24 is a schematic block diagram showing a configuration of the PC according to the eighth embodiment.

FIG. 24 is a schematic block diagram showing a configuration of the PC 2h.

In the PC 2H, a PC correction parameter storage unit 253H, a parameter preservation processor 254H, and a PC image processor 256H of a controller 25H are different from the first to seventh embodiments. In the PC image processor 256H, an image quality conversion unit 256H22 and a color correction unit 256H23 of the PC correction processor 256H2 (first and second processing apparatus correction unit) are different from the first to seventh embodiments of the invention.

To the first PC connector 23G, the second image data cable 41E is connected. The data receiving unit 232 of the first PC connector 23G is connected to the controller 25H and outputs the data (partial correction processed image data) which an image quality conversion to be described later has been performed on and is transmitted through the second image data cable 41E from the projector to the controller 25H. The data on which the image quality conversion has been performed is generated by performing a common image quality conversion process on the image data The PC correction parameter storage unit 253H stores the PJ parameter 253H1 and the high-quality parameter 253H2. In the PJ parameter 253H1, the parameters 253B1 of the PJ parameter of the second embodiment except for parameters for a resolution conversion process and a shape conversion process are recorded. The high-quality parameter 253H2 has a configuration of the high-quality parameter 253A2 of the first embodiment except for the parameters for a resolution conversion process and a shape conversion process.

The parameter preservation processor 254H acquires an output parameter from the projector 3H and preserves the acquired output parameter in the PC correction parameter storage unit 253H as a PJ parameter 253H1.

When the image quality conversion unit 256H22 acquires data on which the image quality conversion has been processed from the projector 3H, the image quality conversion unit 256H22 performs a sharpness enhancement process and a noise removal process on the acquired image-quality converted data and outputs the processed data to the color correction unit 256H23.

When the color correction unit 256H23 acquires the image quality converted data on which the sharpness enhancement process and the noise removal process have been performed from the image quality conversion unit 256H22, the color correction unit 256H23 performs a high-quality color correction process and outputs the processed data to the shading correction unit 256B24. When the color correction unit 256H23 acquires an image quality converted data from the projector 3H not through the image quality conversion unit 256H22, the color correction unit 256H23 performs a common color correction process and outputs the processed data to the shading correction unit 256B24. Here, in the eighth embodiment of the invention, a common image quality conversion process, a sharpness enhancement process, a noise removal process, a high-quality color correction process, and a high-quality shading correction process correspond to the original display correction process in the invention, and a common image quality conversion process, a common color correction process, and a common shading correction process correspond to the projector correction process in the invention.

The difference data generation unit 256A3 calculates a difference between high-quality intermediate data and common intermediate data to generate eighth difference data and outputs the eighth difference data to the encoder 256A4. The eighth difference data becomes data for correcting the image data on which a common image quality conversion process, a common color correction process, and a common shading correction process have been performed into a status that a sharpness enhancement process, a noise removal process, a high-quality color correction process, and a high-quality shading correction process have been performed.

Configuration of Projector

Figure 25:
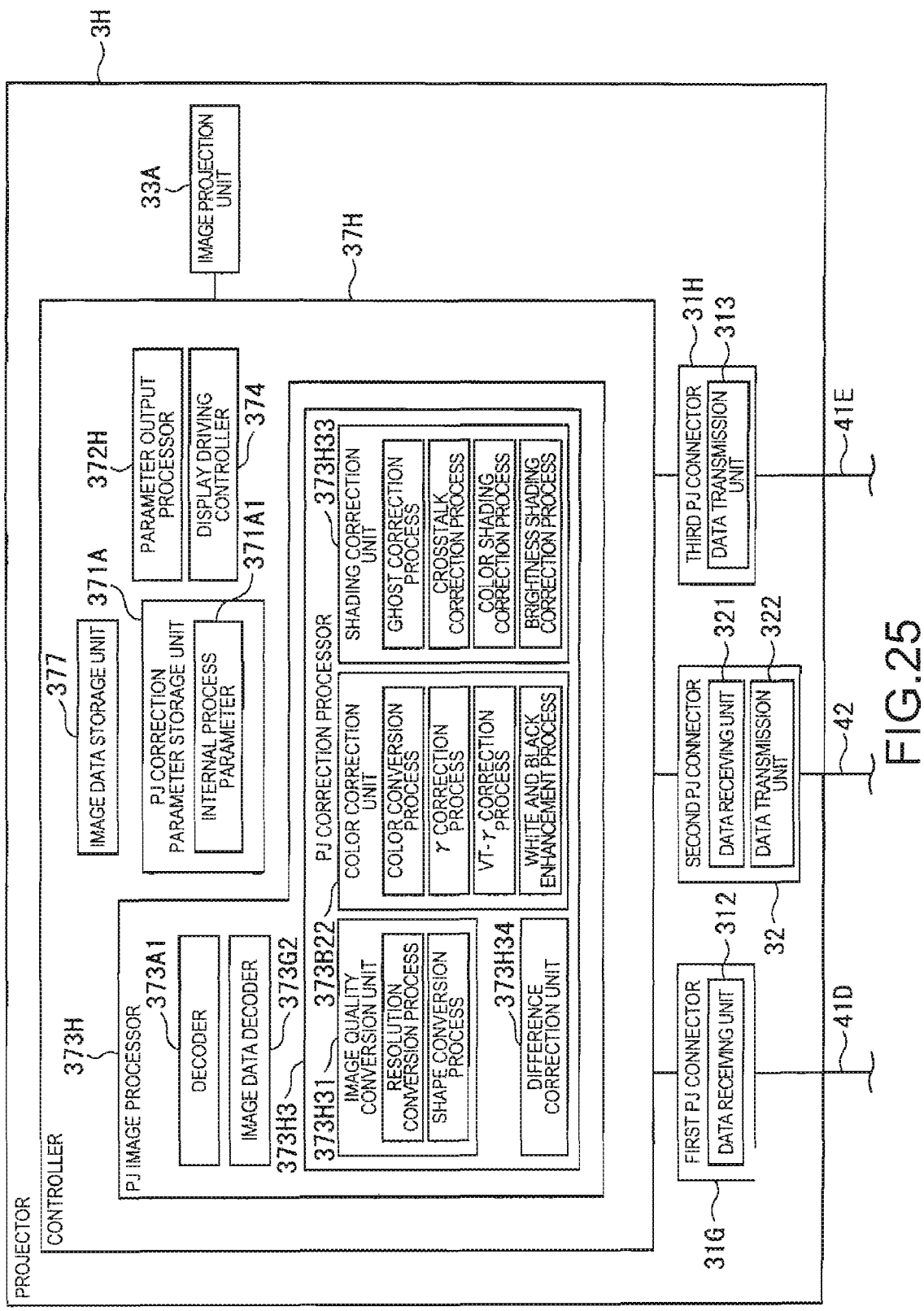
FIG. 25 is a schematic block diagram showing a configuration of a projector according to the eighth embodiment.

FIG. 25 is a schematic block diagram showing a configuration of the projector 3H.

In the projector 3H, a third PJ connector 31H and a controller 37H are different from the first to seventh embodiments. In the controller 37H, a parameter output processor 372H (projector correction data acquisition unit), a PJ image processor 373H, and an image data storage unit 377 are different from the first to seventh embodiments. In the PJ image processor 373H, an image quality conversion unit 373H31 (partial correction processed image data generation unit and projector correction unit), a shading correction unit 373H33 (projector correction unit) and a difference correction unit 373H34 of a PJ correction processor 373H3 are different from the first to seventh embodiments.

To the data receiving unit 312 of the first PJ connector 31G, a first image data cable 41D is connected. The data receiving unit 312 is connected to the controller 37H and outputs an image source which is transmitted from the image reproduction apparatus 5G through the first image data cable 41D to the controller 37H.

To the data transmission unit 313 (partial correction processed image data transmission unit) of a third PJ connector 31G, a second image data cable 41E is connected. The data transmission unit 313 is connected to the controller 37H and transmits data which an image conversion has been processed on and is transmitted from the controller 37H to the PC 2H.

When the parameter output processor 372H acquires a parameter request signal, the parameter output processor 372H reads each parameter, which is output as a PJ parameter 253H1, as an output parameter and transmits each read output parameter to the PC 2H.

The image data storage unit 377 stores the image data processed in the PJ image processor 373H.

When the image quality conversion unit 373H31 acquires image data from the image data decoder 373G2, the image quality conversion unit 373H31 performs a common image quality conversion process and outputs the processed image data to the color correction unit 373B22 In addition, the image quality conversion unit 373H31 transmits the image data output to the color correction unit 373B22 to the PC 2H as image quality converted data.

When the shading correction unit 373H33 acquires the image data on which a common color correction process has been performed from the color correction unit 373B22, the shading correction unit 373H33 performs a common shading correction process and stores the processed image data in the image data storage unit 377. The image data which is stored in the image data storage unit 377 is the same as the common intermediate data generated in the PC 2H.

When the difference correction unit 373H34 acquires the eighth difference data from the decoder 373A1, the difference correction unit 373H34 acquires image data on which a common shading correction process has been performed in response to the eighth difference data from the image data storage unit 377. Then, the difference correction unit 373H34 performs a difference correction process based on the eighth difference data on the acquired image data and outputs the processed image data to the display driving controller 374 as an eighth high-quality difference data. By performing a difference correction process based on the eighth difference data, the color tone of the image data for each pixel is corrected from a status in which a common image quality conversion process, a common color correction process, and a common shading correction process are performed to a status in which a sharpness enhancement process, a noise removal process, a high-quality color correction process, and a high-quality shading correction process are performed.

Operation of Projection System

Figure 26:
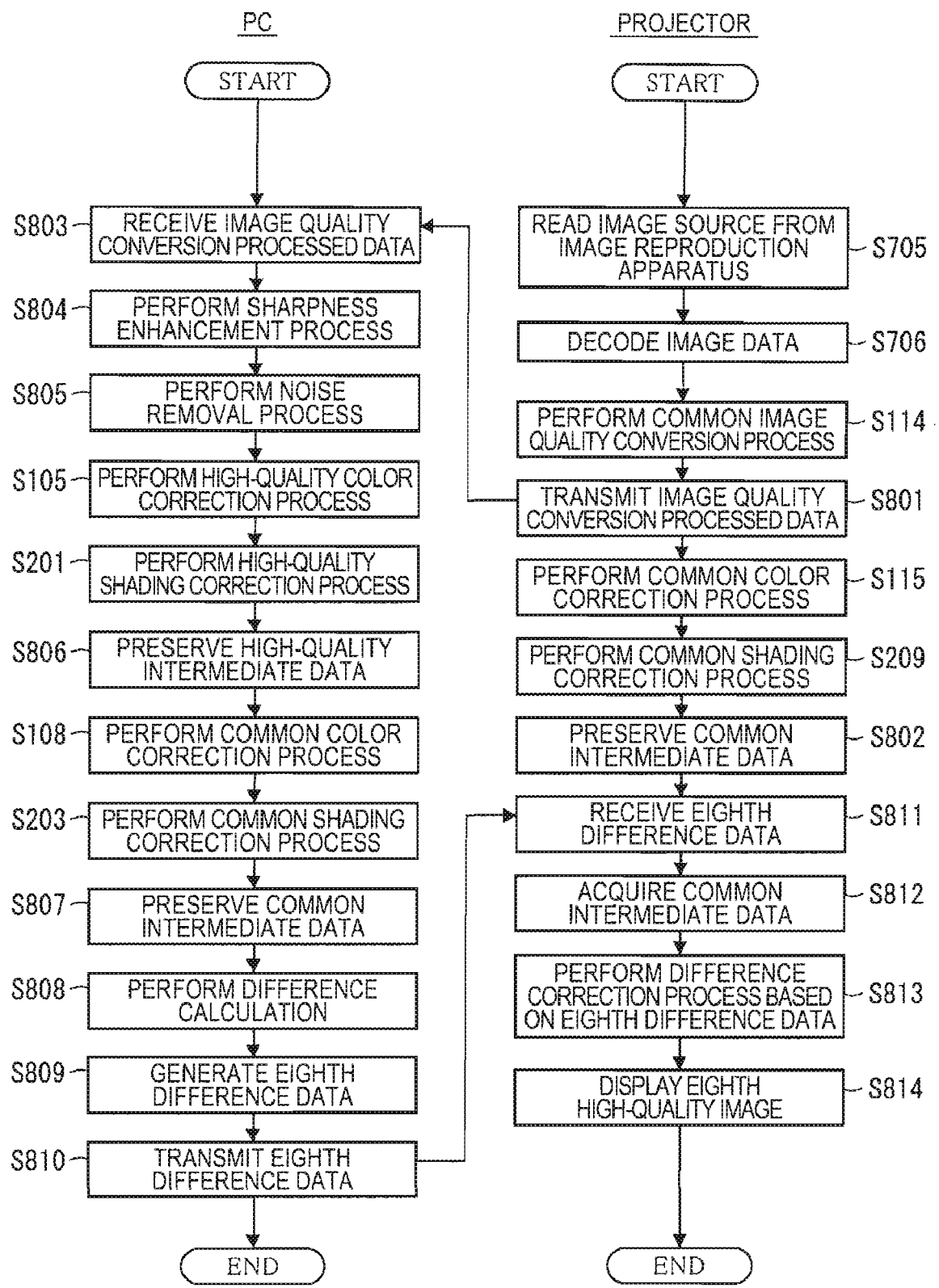
FIG. 26 is a flowchart showing a high-quality display process according to the eighth embodiment.

As an operation of the above-mentioned projection system 1H, a high-quality display process will now be described. FIG. 26 is a flowchart showing the high-quality display process.

At first, as shown in FIG. 26, after the projector 3H performs the processes of the steps S705, S706, and S114, the projector 3H transmits data on which an image quality conversion process has been performed to the PC 2H (step S801). Then, the projector 3H performs the processes of the steps S115 and S209 and stores common intermediate data in the image data storage unit 377 (step S802).

When the PC 2H receives data on which an image quality conversion process has been performed (step S803), the PC 2H performs a sharpness enhancement process (step S804: second process apparatus correction step) and a noise removal process (step S805: second processing apparatus correction step) Then, the PC 2H performs the processes of the steps S105 and S201 and stores the processed data as high-quality intermediate data (step S806). Then, the PC 2H performs the processes of the steps S108 and S203 on the image quality converted data and preserves the processed data as common intermediate data (step S807). Then, the PC 2H calculates a difference (step S808) and performs the process of generation of the eighth difference data (step S809: difference data generation step) and the process of the transmission of only the eighth difference data to the projector 3H (step S810: difference data transmission step).

When the projector 3H receives the eighth difference data (step S811), the projector acquires common intermediate data corresponding to the eighth difference data from the data storage unit 377 (step S812). Then, the projector 3H performs a difference correction process based on the eighth difference data (step S813) and displays an eighth high-quality image (step S814).

Advantage of Eighth Embodiment

In the above-described eighth embodiment of the invention, the following advantages can be acquired in addition to the same advantages as (1) to (4) and (12) in the first and seventh embodiments of the invention.

(13) The projector 3H performs only the common image quality conversion process among the common correction processes on the image data acquired from the image reproduction apparatus 5G and outputs the processed image data to the PC 2H. In addition, the PC 2H performs common correction processes other than the common image quality conversion process on the image quality converted data to generate common intermediate data and performs high-quality correction processes other than a high-quality image quality conversion process on the image quality converted data to generate high-quality intermediate data.

Accordingly, when the PC 2H generates the common intermediate data, it becomes needless to perform the common image quality conversion process, and thereby the processing load of the PC 2H can be reduced.

Ninth Embodiment

Hereinafter, a ninth embodiment of the invention will be described with reference to the accompanying drawings.

Configuration of Projection System

FIG. 1 is a diagram showing an appearance of a projection system 1K according to a ninth embodiment of the invention.

The projection system 1K includes a PC 2K (image processing apparatus), a projector 3K, and a data transmission unit 4A.

Configuration of PC

Figure 27:
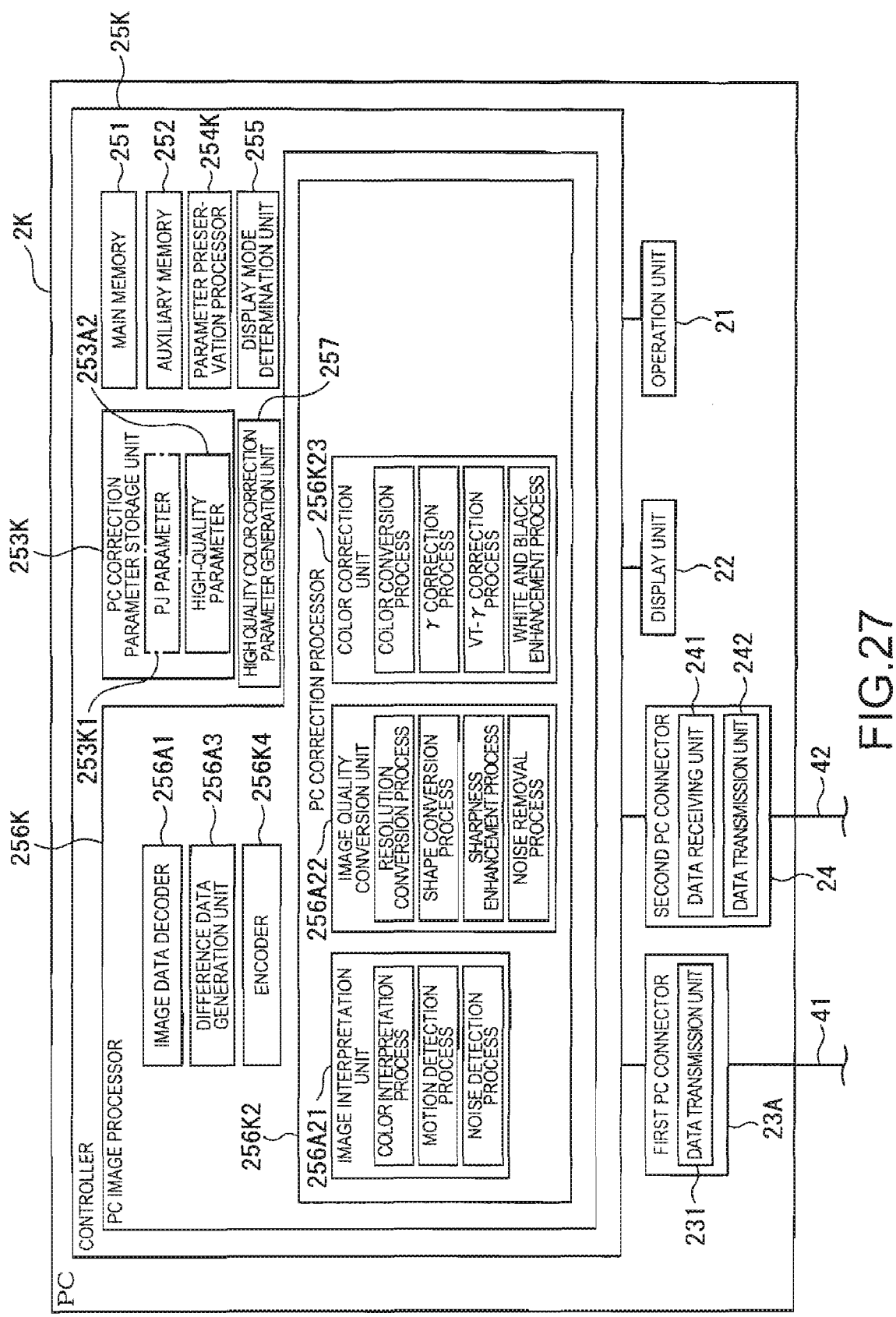
FIG. 27 is a schematic block diagram showing a configuration of a PC according to the ninth embodiment.

FIG. 27 is a schematic block diagram showing a configuration of the PC 2K.

In the PC 2K, a PC correction parameter storage unit 253K (processing apparatus correction data storage unit), a parameter preservation processor 254K, a PC image processor 256K, and a high-quality color correction parameter generation unit 257 (partial correction data generation unit) of a controller 25K are different from the first to eighth embodiments. In the PC image processor 256K, a color correction unit 256K23 and an encoder 256K4 of a PC correction processor 256K2 (first and second processing apparatus correction units) are different from the first to eighth embodiments. In addition, in the ninth embodiment, a data transmission unit 242 of the second PC connector 24 serves also as a partial correction data transmission unit of the invention.

The PC correction parameter storage unit 253K stores the PJ parameter 253K1 and the high-quality parameter 253A2 (original display correction data). In the PJ parameter 253K1, the parameters of the PJ parameter 253A1 of the first embodiment except for the parameter for a color correction process are recorded.

The parameter preservation processor 254K acquires an output parameter from the projector 3K and preserves the acquired output parameter in the PC correction parameter storage unit 253K as a PJ parameter 253K1.

The high-quality color correction parameter generation unit 257 acquires a parameter for the color correction process from the high-quality parameter 253A2, generates a high-quality color correction parameter (partial correction data), and outputs the color correction parameter to the PC image processor 256K.

When the color correction unit 256K23 acquires the image data on which a high-quality image quality conversion process has been performed from the image quality conversion unit 256A22, the color correction unit 256K23 performs a high-quality color correction process and preserves the processed image data as high-quality intermediate data. In addition, when the color correction unit 256K23 acquires the image data on which a common image conversion process has been performed from the image quality conversion unit 256A22, the color correction unit 256K23 performs a high-quality color correction process and preserves the processed image data as common intermediate data.

Here, in the ninth embodiment of the invention, an image interpretation process, a high-quality image quality conversion process, and a high-quality color correction process correspond to the original display correction process of the invention, and a common image quality conversion process and a high-quality color correction process correspond to the projector correction process of the invention.

The difference data generation unit 256A3 calculates a difference between high-quality intermediate data and common intermediate data to generate ninth difference data and outputs the ninth difference data to the encoder 256K4. The ninth difference data becomes data for correcting the image data on which a common image quality conversion process and a high-quality color correction process have bee performed into a status that a high-quality image quality conversion process and a high-quality color correction process have been performed.

The encoder 256K4 encodes the ninth difference data generated in the difference data generation unit 256A3 and a high-quality color correction parameter transmitted from a high-quality color correction parameter generation unit 257 and transmits the encoded data and parameter to the projector 3K through a correction data cable 42.

Configuration of Projector

Figure 28:
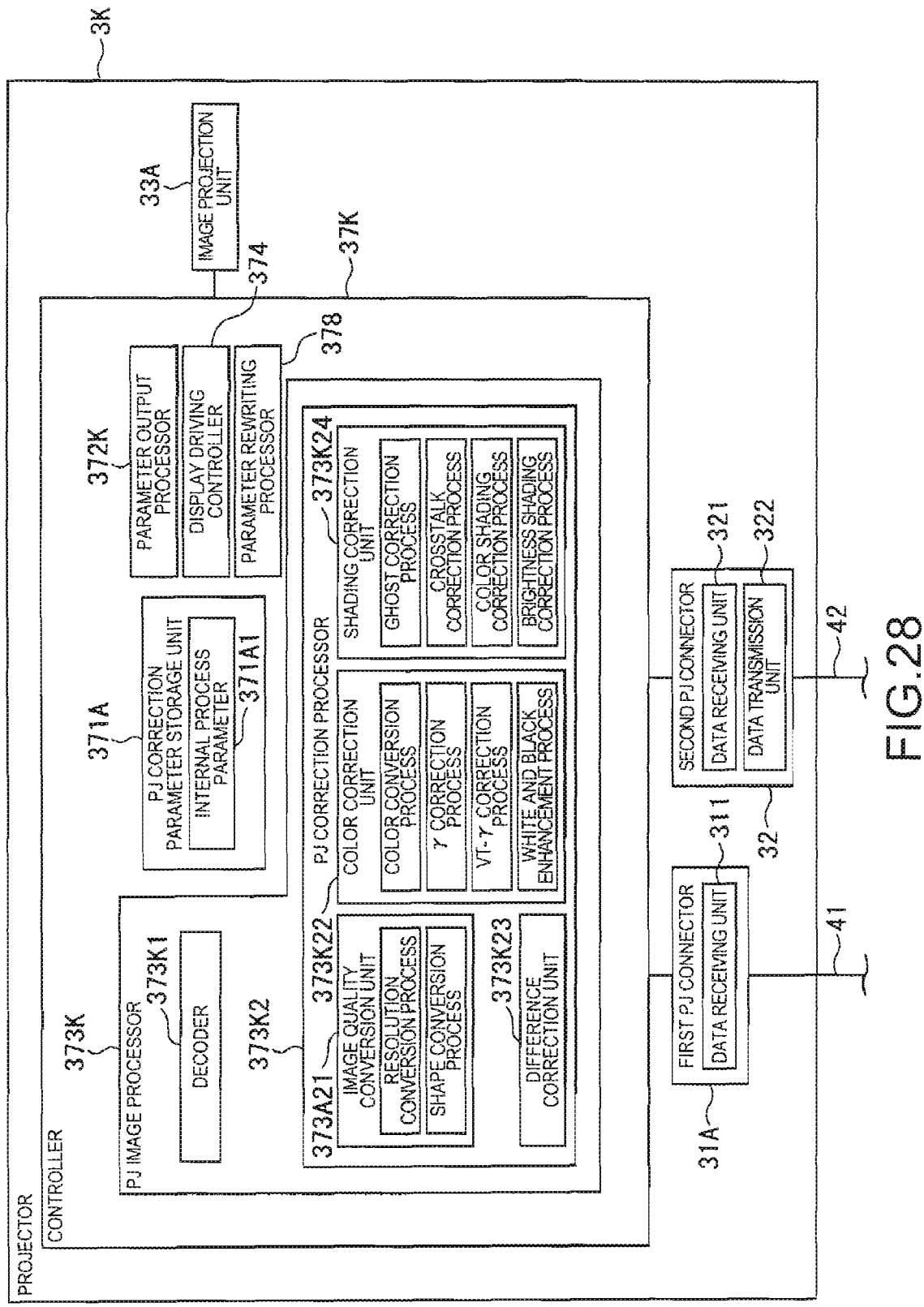
FIG. 28 is a schematic block diagram showing a configuration of a projector according to the ninth embodiment.

FIG. 28 is a schematic block diagram showing a configuration of the projector 3K.

In the projector 3K, a parameter output processor 372K (projector correction data acquisition unit), a PJ image processor 373K of a controller 37K and a parameter rewriting processor 378 (partial correction data storage processor) are different from the first to eighth embodiments of the invention. In the PJ image processor 373K, a decoder 373K1 and a color correction unit 373K22 (projector correction unit), a difference correction unit 373K23, and a shading correction unit 373K24 of a PJ correction processor 373K2 are different from the first to eighth embodiments of the invention.

When the parameter output processor 372K acquires a parameter request signal, the parameter output processor 372K reads each parameter, which is output as a PJ parameter 253K1, as an output parameter and transmits each read output parameter to the PC 2K.

When the parameter rewriting processor 378 acquires a high-quality color correction parameter from a decoder 373K1 to be described later, parameter rewriting processor 378 performs a process of rewriting an internal process parameter 371A1 of the PJ correction parameter storage unit 371A. More specifically, the parameter rewriting processor 378 rewrites parameters for a color conversion process, a γ correction process, a VT-γ correction process, and a black and white enhancement correction process of the internal process parameter 371A1 to a high-quality color correction parameter.

The decoder 373K1 acquires the ninth difference data and the high-quality color correction parameter which have been transmitted from the PC 2K and decodes the ninth difference data and the high-quality color correction parameter The decoder 373K1 outputs the ninth difference data and the high-quality color correction parameter to the PJ correction processor 373K2 and the parameter rewriting processor 378, respectively.

When the color correction unit 373K22 acquires the image data on which a common image quality conversion process has been performed from the image quality conversion unit 2373A21, the color correction unit 373K22 performs a high-quality color correction process based on the high-quality color correction parameter of the internal process parameter 371A1 and outputs the processed image data to the difference PJ correction processor 373K23.

When the difference correction unit 373K23 acquires image data on which a high-quality color correction process has been performed from the color correction unit 373K22 and the ninth difference data from the decoder 373K1, the difference correction unit 373K23 performs a difference correction process based on the ninth difference data and output the processed image data to the shading correction unit 373K24. By performing the process of difference correction based on the ninth difference data, the color tone of the image data for each pixel is changed from a status in which a common image quality conversion process and a high-quality correction process have been processed to a status in which a high-quality image quality conversion process and a high-quality color correction process have been processed.

When the shading correction unit 373K24 acquires the image data on which the difference correction process has been performed from the difference correction unit 373K23, the shading correction unit 373KA24 performs a common shading correction process and outputs the processed image data to the display driving controller 374 as ninth high-quality image data.

When the display driving controller 374 acquires the ninth high-quality image data from the PJ image processor 373K, the display driving controller 374 outputs a control signal for displaying the ninth high-quality image based on the ninth high-quality image data.

Operation of Projection System

Figure 29:
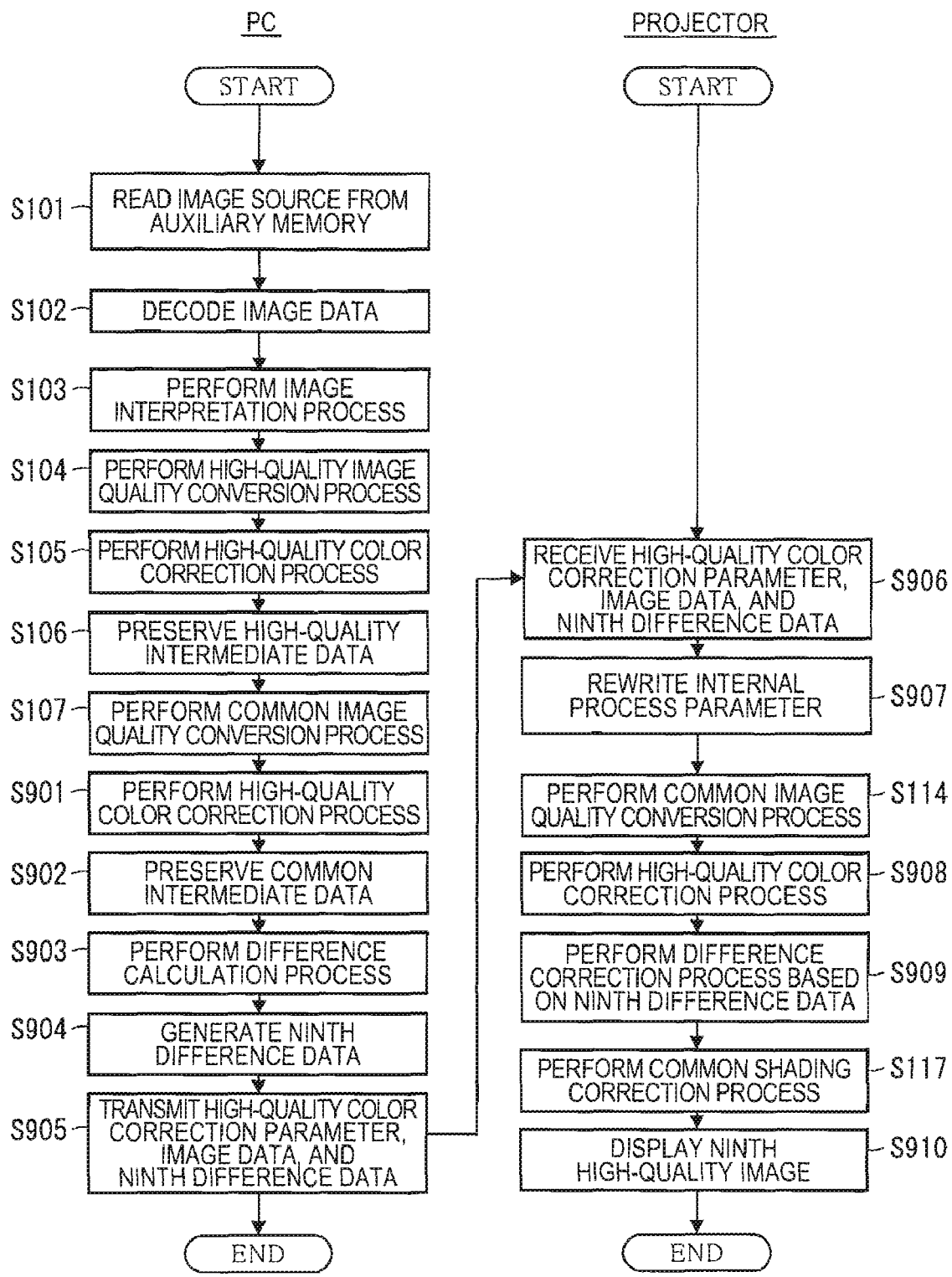
FIG. 29 is a flowchart showing a high-quality display process according to the ninth embodiment.

As an operation of the above-described projection system a high-quality display process will now be described. FIG. 29 is a flowchart showing the high-quality display process.

At first, as shown in FIG. 29, after the PC 2K performs the above-described processes of the steps S101 to S107, the PC 2K performs a high-quality correction process on the image data on which a common image quality conversion process has been performed (step S901: first processing apparatus correction step) and preserves the image data as common intermediate data (step S902). Thereafter, the PC 2K performs a difference calculation process (step S903) to generate a ninth difference data (step S904: difference data generation step) and performs a process of transmission of the high-quality color correction parameter, the image data and the ninth difference data to the projector 3K (step S905: difference data transmission step)

When the projector 3K receives the high-quality color correction parameter, the image data, and the ninth difference data (step S906), the projector 3K rewrites the internal process parameter 37A1 based on the high-quality color correction parameter (step S907). Thereafter, the projector 3K performs the process of step S114 and a high-quality color correction process (step S908). Then, the projector 3K performs a difference correction process of the step S117 based on the ninth difference data (step S909) and displays the ninth high-quality image (step S910)

Advantage of Ninth Embodiment

In the above-described ninth embodiment of the invention, the following advantages can be acquired in addition to the same advantages as (1) to (4) in the first embodiment of the invention.

(14) The PC 2K acquires a parameter for a color correction process from a high-quality parameter 253A2 and outputs the acquired parameter to the projector 3K as a high-quality color correction parameter. In addition, the PC 2K performs a common image quality conversion process and a high-quality color correction process on the image data to generate common intermediate data. The projector 3K rewrites an internal process parameter 371A1 based on the high-quality color correction parameter. Then, the PC 2K performs a common image quality conversion process and a high-quality color correction process based on the high-quality color correction parameter and performs a difference correction process.

Accordingly, by calculating a difference between common intermediate data on which only a high-quality color correction process among the high-quality correction processes has been performed and high-quality intermediate data on which all the high-quality color correction processes have been performed, the PC 2K can decrease the difference compared to a configuration that a difference from common intermediate data on which any high-quality color correction process has not been performed is calculated. Accordingly, the number of bits of the difference data can be decreased to be able to further suppress the decrease in the speed of data transmission and receiving.

MODIFIED EXAMPLES

The present invention is not limited to one of the above-described embodiments and includes the following changes within the scope the advantage of the invention can be achieved.

In the first embodiment, a memory card or a CD-ROM in which the PJ parameter 253A1 is recorded may be inserted into the PC 2A for being installed in the PC correction parameter storage unit 253A.

In the first embodiment, the PC 2A may transmit the first difference data to the projector 3A without encoding the first difference data.

In the first embodiment, as a correction process which is performed in the PC correction processor 256A2 and the PJ correction processor 373A2, a process other than the above-described processes may be performed, and any one of the above-described processes may not be performed.

In the first embodiment, an output parameter may be stored in the PJ correction parameter storage unit 371A in addition to the internal process parameter 371A1, and the output parameter may be read and transmitted to the PC 2A.

In the first embodiment, the high-quality intermediate data is generated before the common intermediate data, but the common intermediate data may be generated before the high-quality intermediate data.

Alternatively, the common intermediate data and the high-quality intermediate data may be generated by a parallel processing. In other words, the processes of the steps S104 to S106 and the steps S107 to S109 shown in FIG. 5 may be performed parallel.

Moreover, the above-described changes may be applied to a corresponding embodiment of the invention.

In the sixth embodiment, an optical system which uses four or more light sources and a plurality of projection-type optical modulation elements (projection-type liquid crystal elements) or reflection-type optical modulation elements (reflection-type liquid crystal elements) corresponding to the light sources, may be used.

In the seventh embodiment, a cable which connects the PC 2G and the image reproduction apparatus 5G and a cable which connects the PC 2G and the projector 3G may be provided and a configuration in which the projector 3G acquires image data from the PC 2G for processing may be used. By using this configuration, it is not necessary to arrange a distributor 43, and thereby the configuration of the projection system 1G can be simplified.

Although the preferred embodiments of the present invention are disclosed as above, the present invention is not limited thereto. In other words, while the present invention has been particularly shown and described with reference to exemplary embodiments thereof, it will be understood that various changes in form, amount, and details may be made therein without departing from the technical spirit and scope of the present invention as defined by the following claims.

The present invention may be used n a projection system.

The entire disclosure of Japanese Patent Application No.2006-31987, filed Feb. 9, 2006 is expressly incorporated by reference herein.

What is claimed is:

1. A projection system comprising:
   an image processing apparatus for processing image data;
   a projector having a light source device, an optical modulation element for modulating light beams irradiated from the light source device based on the image data to form an optical image and a projection optical apparatus for projecting light modulated by the optical modulation element; and
   a digital communication unit which connects the image processing apparatus and the projector for enabling the image processing apparatus and the projector to perform digital communication therebetween,
   wherein the image processing apparatus includes:
   a first processing apparatus correction unit that performs a projector correction process, which can be performed in the projector, on the image data to generate first correction processed image data;
   a second processing apparatus correction unit that performs an original display correction process for displaying an image desired to be displayed in the projector on the image data to generate a second correction processed image data;
   a difference data generation unit that generates difference data for a difference between the first correction processed image data and the second correction processed image data; and
   a difference data transmission unit that transmits the difference data to the projector through the digital communication unit, and
   wherein the projector includes:
   a projector correction unit that performs the projector correction process on the image data to generate the first correction processed image data;
   a difference correction unit that acquires the difference data transmitted from the image processing apparatus and performs a correction process based on the difference data on the first correction processed image data to generate the second correction processed image data; and
   a display controller which controls the optical modulation element to display an image based on the second correction processed image data.

2. The projection system according to claim 1, further comprising:
   an image data transmission unit that connects the image processing apparatus and the projector for enabling the image processing apparatus and the projector to transmit and receive the image data therebetween in addition to the digital communication unit, and wherein the image processing apparatus further includes:
a processing apparatus image data storage unit that stores the image data;
an image data acquisition unit that acquires the image data stored in the processing apparatus image data storage unit; and
an image data transmission unit that transmits the image data to the projector, and
wherein the first processing apparatus correction unit and the second processing apparatus correction unit acquire the image data from the processing apparatus image data storage unit, and
wherein the projector correction unit acquires the image data transmitted from the image processing apparatus.

3. The projection system according to claim 1, further comprising:
an image reproduction apparatus that reproduces the image data;
a first image data transmission unit that connects the image reproduction apparatus and the image processing apparatus for enabling the image reproduction apparatus and the image processing apparatus to transmit and receive the image data therebetween; and
a second image data transmission unit that connects the image reproduction apparatus and the projector for enabling the image reproduction apparatus and the projector to transmit and receive the image data therebetween, and
wherein the image reproduction apparatus transmits the image data to the image processing apparatus and the projector through the first image data transmission unit and the second image data transmission unit, and
wherein the first processing apparatus correction unit, the second processing apparatus correction unit, and the projector correction unit acquire the image data transmitted from the image reproduction apparatus.

4. The projection system according to claim 1, further comprises:
an image reproduction apparatus that reproduces the image data;
a first image data transmission unit that connects the image reproduction apparatus and the projector for enabling the image reproduction apparatus and the projector to transmit and receive the image data therebetween; and
a second image data transmission unit that connects the image processing apparatus and the projector for enabling the image processing apparatus and the projector to transmit and receive the image data therebetween, and
wherein the projector correction process includes a plurality of correction processes,
wherein the image reproduction apparatus transmits the image data to the projector through the first image data transmission unit,
wherein the projector further includes:
a partial correction processed image data generation unit that acquires the image data transmitted from the image reproduction apparatus, performs a plurality of correction processes included in the projector correction process except for at least one correction process on the partial correction processed image data to generate partial correction processed image data; and
a partial correction processed image data transmission unit that transmits the partial correction processed image data to the image processing apparatus through the second image data transmission unit,
wherein the first processing apparatus correction unit acquires the partial correction processed image data transmitted from the projector and performs an undone correction process among the plurality of correction processes included in the projector correction process on the partial correction processed image data to generate the first correction processed image data, and
wherein the second processing apparatus correction unit acquires the partial correction processed image data transmitted from the projector and performs the original display correction process on the partial correction processed image data to generate the second correction processed image data.

5. The projection system according to claim 1,
wherein the digital communication unit can perform two-way communication,
wherein the projector further includes:
a projector correction data storage unit that stores projector correction data for the projector correction process;
a projector correction data acquisition unit that acquires the projector correction data from the projector correction data storage unit; and
a projector correction data transmission unit that transmits the projector correction data to the image processing apparatus through the digital communication unit,
wherein the first processing apparatus correction unit acquires the projector correction data transmitted from the projector and performs the projector correction process based on the projector correction data, and
wherein the projector correction unit performs the projector correction process based on the projector correction data which is stored in the projector correction data storage unit.

6. The projection system according to claim 1,
wherein the original display correction process includes a plurality of correction processes,
wherein the image processing apparatus further includes:
a processing apparatus correction data storage unit that stores the original display correction data for the original display correction process;
a partial correction data generation unit that generates a partial correction data for the plurality of correction processes included in the original display correction process except for at least one correction process based on the original display correction data; and
a partial correction data transmission unit that transmits the partial correction data to the projector through the digital communication unit,
wherein the projector further includes:
a projector correction data storage unit that stores projector correction data for the projector correction process;
a partial correction data storage processor that acquires the partial correction data transmitted from the image processing apparatus and stores the acquired data in the projector correction data storage unit, and
wherein the first processing apparatus correction unit performs the projector correction process and the correction process based on the partial correction data on the image data to generate the first correction processed image data, and
wherein the projector correction unit performs the projector correction process based on the projector correction data which is stored in the projector correction data storage unit and the correction process based on the partial correction data on the image data to generate the first correction processed image data.

7. The projection system according to claim 1,
wherein the original display correction process includes at least one among a color conversion process, a g correction process, and a black and white enhancement process.

8. The projection system according to claim 1,
wherein the original display correction process includes a process for correcting the deterioration of an image due to the characteristics of the optical modulation element.

9. The projection system according to claim 1,
wherein the image processing apparatus further includes:
a light intensity data generation unit that sets the intensity of light incident on the optical modulation element for properly displaying an image based on the image data and generates light intensity data for the set light intensity; and
a light intensity data transmission unit that transmits the light intensity data to the projector through the digital communication unit, and
wherein the projector further includes a light intensity controller that acquires the light intensity data transmitted from the image processing apparatus and controls the intensity of the light incident on the optical modulation element based on the light intensity data.

10. The projection system according to claim 9,
wherein the light source device includes a plurality of predetermined color light source units which irradiate different predetermined colors of light, and
wherein the light intensity controller performs a process of independently controlling the light intensity irradiated from each of the predetermined color light source units by controlling the intensity of light incident on the optical modulation element.

11. The projection system according to claim 10,
wherein the light source device includes a red light source unit, a green light source unit, and a blue light source unit as the predetermined color light source units.

12. A projector comprising:
a light source device;
an optical modulation element for modulating light beams irradiated from the light source device to form an optical image based on an image data;
a projection optical device for projecting light modulated by the optical modulation element;
a projector correction unit that is connected through a digital communication unit to an image processing apparatus for processing the image data and generates a first correction processed image data by performing a projector correction process which can be applied to the image data;
a difference correction unit that acquires difference data for a difference between a second correction processed image data generated by performing an original display correction process on the image data for displaying an image originally desired to be displayed and the first correction processed image data from the image processing apparatus through the digital communication unit and generates the second correction processed image data by performing a correction process based on the difference data on the first correction processed image data; and
a display controller that controls the optical modulation element to display an image based on the second correction processed image data.

13. The projector according to claim 12, further comprising:
a partial correction processed image data generation unit that is connected to the image processing apparatus through the image data transmission unit for transmitting and receiving the image data, includes a plurality of the projector correction processes, and performs the plurality of correction processes included in the projector correction process except for at least one correction process on the image data to generate a partial correction processed image data;
a partial correction processed image data transmission unit that transmits the partial correction processed image data to the image processing apparatus through the image data transmission unit, and
wherein the difference correction unit acquires the difference data for a difference between the first correction processed image data which is generated by performing the undone correction process among the plurality of correction processes included in the projector correction process on the partial correction processed image data and the second correction processed image data which is generated by performing the original display correction process on the partial correction processed image data.

14. The projector according to claim 12,
wherein the original display correction process includes a plurality of correction processes, and
the projector further comprises:
a projector correction data storage unit that stores the projector correction data for the projector correction process; and
a partial correction data storage unit that acquires partial correction data for the plurality of correction processes included in the original display correction process except for at least one correction process from the image processing apparatus through the digital communication unit and stores the partial correction data in the projector correction data storage unit, and
wherein the projector correction unit performs the projector correction process based on the projector correction data which is stored in the projector correction data storage unit on the image data and the correction process based on the partial correction data to generate the first correction processed image data.

15. The projector according to claim 12, further comprising a light intensity controller that acquires the light intensity data for the intensity of the light incident on the optical modulation element for properly displaying an image based on the image data from the image processing apparatus through the digital communication unit and controls the intensity of the light incident on the optical modulation element based on the light intensity data.

16. The projector according to claim 15, wherein the light source device includes a plurality of predetermined color light source units which irradiate different predetermined colors of light, and wherein the light intensity controller performs a process of independently controlling the light intensity irradiated from each of the predetermined color light source units by controlling the intensity of light incident on the optical modulation element.

17. The projector according to claim 16, wherein the light source device includes a red light source unit, a green light source unit, and a blue light source unit as the predetermined color light source units.

18. A computer readable recording medium storing an image processing program which is executed in an image processing apparatus connected to a projector through a digital communication unit, the image processing program allowing the image processing apparatus to execute the steps of:
- performing a projector correction process which can be performed in the projector on the image data using the image processing apparatus to generate a first correction processed image data;
- performing an original display correction process on the image data for displaying an image originally desired to be displayed in the projector to generate a second correction processed image data;
- generating difference data for a difference between the first correction processed image data and the second correction processed image data; and
- transmitting the difference data to the projector through the digital communication unit.

19. The process according to claim 18, further comprising the steps:
- preserving the first correction processed image data as common intermediate data;
- preserving the second correction processed image data as high-quality intermediate data;
- generating the difference data based on a difference between the high-quality and the common intermediate data; and wherein
- the computer readable recording medium is a non-transient computer readable recording medium.

20. The process according to claim 19, wherein the projector correction process includes a common color correction process, and the original display correction process includes a high-quality image quality conversion process and a high-quality color correction process.

* * * * *